United States Patent
Tsukada

(10) Patent No.: US 12,539,039 B2
(45) Date of Patent: Feb. 3, 2026

(54) SLIT LAMP MICROSCOPE

(71) Applicant: Topcon Corporation, Tokyo (JP)

(72) Inventor: Hisashi Tsukada, Hachioji (JP)

(73) Assignee: TOPCON CORPORATION, Tokyo (JP)

( * ) Notice: Subject to any disclaimer, the term of this patent is extended or adjusted under 35 U.S.C. 154(b) by 435 days.

(21) Appl. No.: 18/018,582

(22) PCT Filed: Jul. 29, 2021

(86) PCT No.: PCT/JP2021/028178
§ 371 (c)(1),
(2) Date: Jan. 30, 2023

(87) PCT Pub. No.: WO2022/030364
PCT Pub. Date: Feb. 10, 2022

(65) Prior Publication Data
US 2023/0301511 A1    Sep. 28, 2023

(30) Foreign Application Priority Data
Aug. 3, 2020   (JP) .................. 2020-131465

(51) Int. Cl.
*A61B 3/135* (2006.01)
*A61B 3/12* (2006.01)
(Continued)

(52) U.S. Cl.
CPC ............... *A61B 3/135* (2013.01); *A61B 3/12* (2013.01); *A61B 3/145* (2013.01); *G02B 21/36* (2013.01)

(58) Field of Classification Search
CPC ........... A61B 3/135; A61B 3/12; A61B 3/145; G02B 21/36
(Continued)

(56) References Cited

U.S. PATENT DOCUMENTS

| 6,454,410 B1 | 9/2002 | Berger et al. |
| 2007/0019158 A1 | 1/2007 | Allred |

(Continued)

FOREIGN PATENT DOCUMENTS

| JP | 2000-116732 A | 4/2000 |
| JP | 2008-284273 A | 11/2008 |

(Continued)

OTHER PUBLICATIONS

Japanese Office Action issued Oct. 1, 2024, in corresponding Japanese Patent Application No. 2020-131465, 8pp.

(Continued)

*Primary Examiner* — Stephone B Allen
*Assistant Examiner* — Boutsikaris Leonidas
(74) *Attorney, Agent, or Firm* — XSENSUS LLP

(57) ABSTRACT

A slit lamp microscope of an embodiment includes an image acquiring unit, a memory, and a misalignment information acquiring processor. The image acquiring unit is configured to acquire an image by applying a scan with slit light to an anterior segment of a subject's eye. The memory stores a first image of the anterior segment and a second image that is acquired by follow-up photography performed by the image acquiring unit with reference to the first image. The misalignment information acquiring processor is configured to acquire misalignment information between the first image and the second image by analyzing the first image and the second image after the follow-up photography.

26 Claims, 28 Drawing Sheets

(51) Int. Cl.
*A61B 3/14* (2006.01)
*G02B 21/36* (2006.01)

(58) Field of Classification Search
USPC .......................................................... 351/206
See application file for complete search history.

(56) References Cited

U.S. PATENT DOCUMENTS

| | | |
|---|---|---|
| 2013/0021577 A1 | 1/2013 | Suzuki et al. |
| 2014/0320815 A1 | 10/2014 | Steinmueller |
| 2015/0085252 A1 | 3/2015 | Fujimura et al. |
| 2016/0345822 A1 | 12/2016 | Fujimura et al. |
| 2017/0156591 A1 | 6/2017 | Berestka et al. |
| 2019/0053703 A1 | 2/2019 | Berestka et al. |
| 2019/0059721 A1* | 2/2019 | Ono ..................... A61B 3/0025 |
| 2020/0196863 A1 | 6/2020 | Anderson et al. |
| 2020/0315451 A1 | 10/2020 | Berestka et al. |
| 2021/0153740 A1 | 5/2021 | Domori et al. |
| 2022/0400950 A1 | 12/2022 | Berestka et al. |

FOREIGN PATENT DOCUMENTS

| | | | |
|---|---|---|---|
| JP | 2011-50430 A | 3/2011 | |
| JP | 2011-115507 A | 6/2011 | |
| JP | 2011-212213 A | 10/2011 | |
| JP | 2012-249768 A | 12/2012 | |
| JP | 2013-248376 A | 12/2013 | |
| JP | 2014-217749 A | 11/2014 | |
| JP | 2016-159073 A | 9/2016 | |
| JP | 2016-179004 A | 10/2016 | |
| JP | 2016-209453 A | 12/2016 | |
| JP | 2017-526507 A | 9/2017 | |
| JP | 2019037655 A | 3/2019 | |
| JP | 2019213729 A * | 12/2019 | ........... A61B 3/0008 |
| WO | 01/28405 A2 | 4/2001 | |
| WO | 2019/030375 A2 | 2/2019 | |
| WO | 2019/240151 A1 | 12/2019 | |

OTHER PUBLICATIONS

International Search Report and Written Opinion mailed on Oct. 5, 2021, received for PCT Application PCT/JP2021/028178, filed on Jul. 29, 2021, 10 pages including English Translation.
Extended European Search Report issued Jul. 1, 2024, in corresponding European Patent Application 21853895.7, 8pp.
Japanese Office Action issued Jan. 28, 2025, in corresponding Japanese Patent Application No. 2020-131465, 6pp.
European Office Action issued May 6, 2025, in corresponding European Patent Application No. 21 853 895.7, 7pp.

* cited by examiner

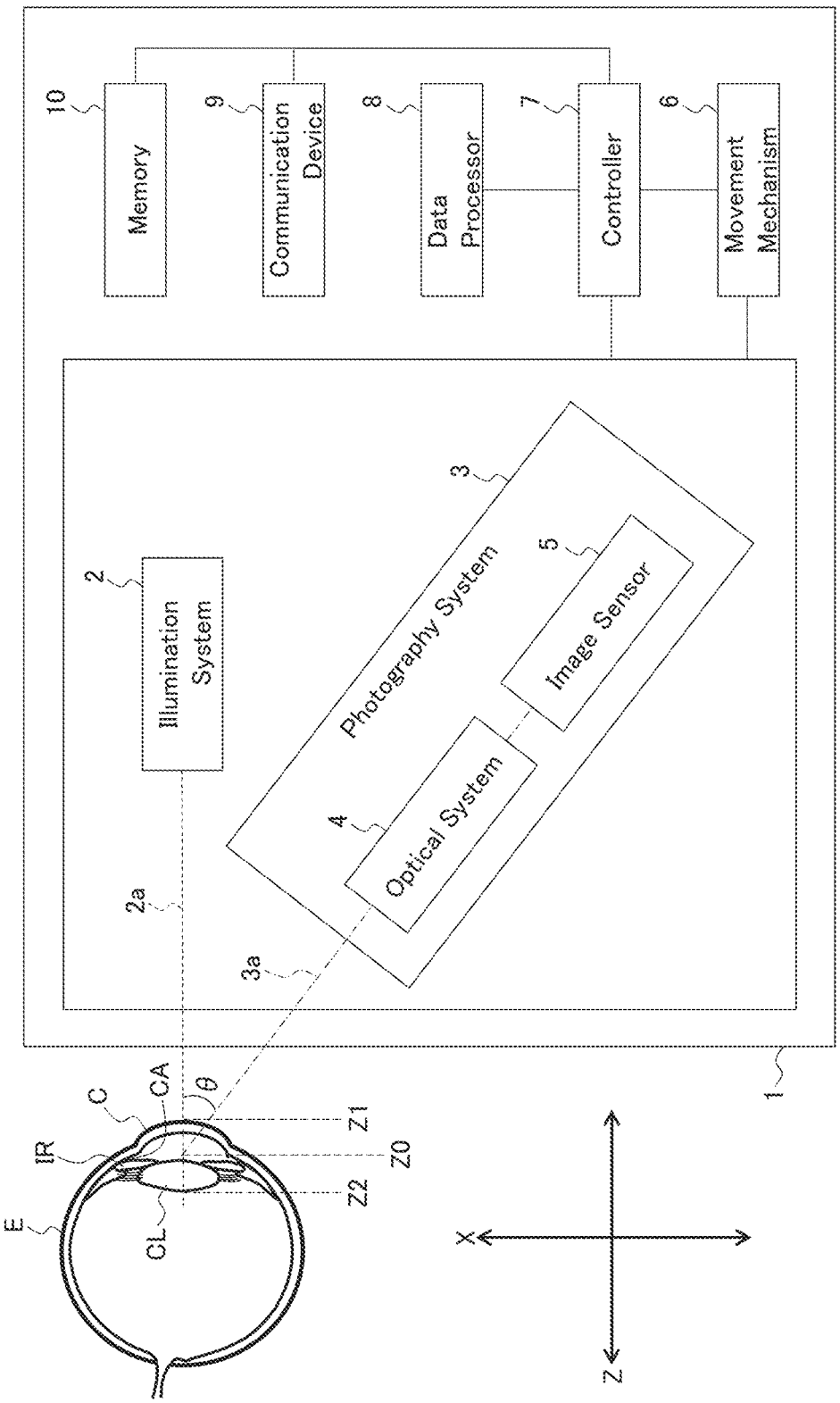

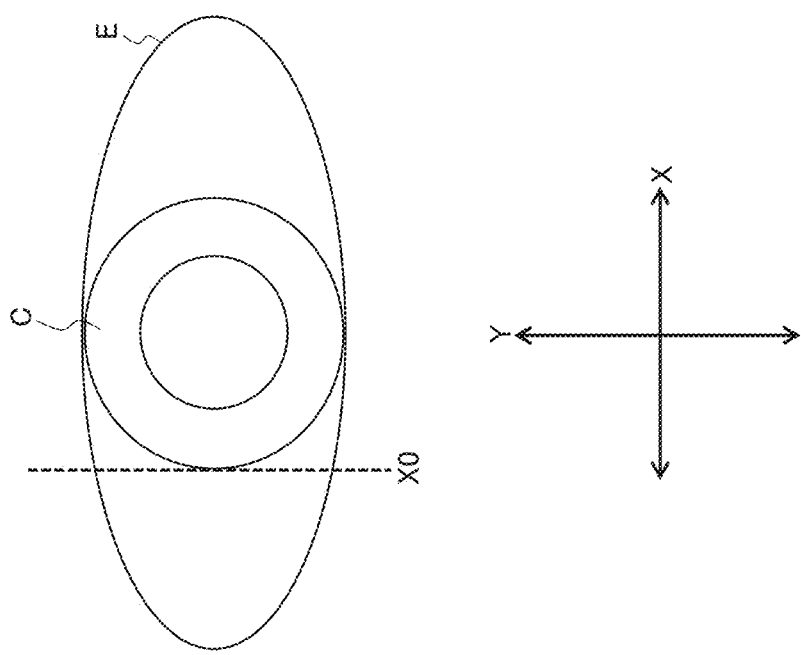

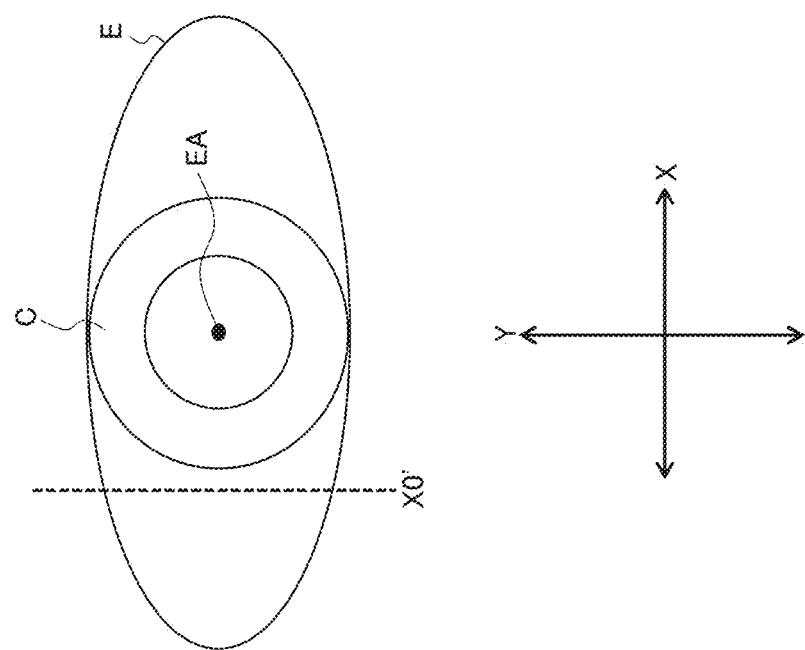

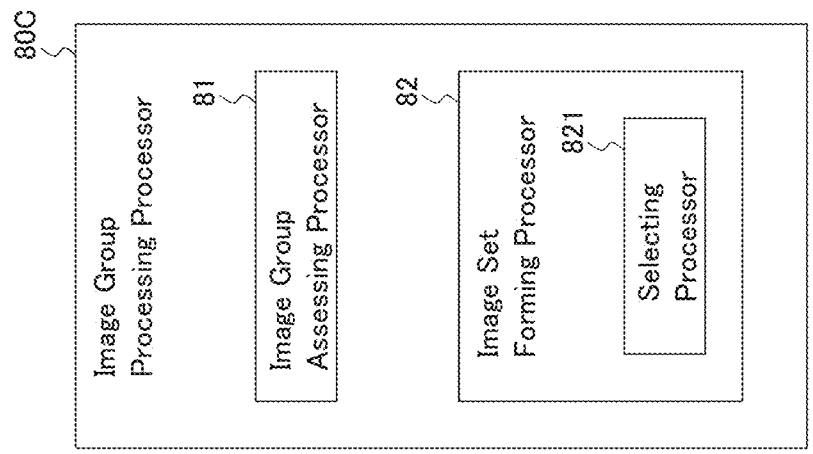

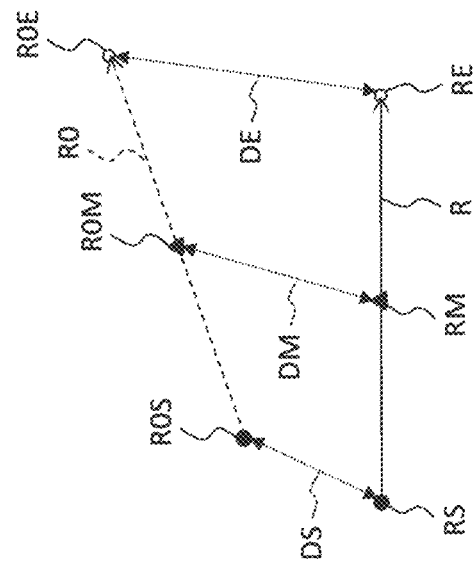

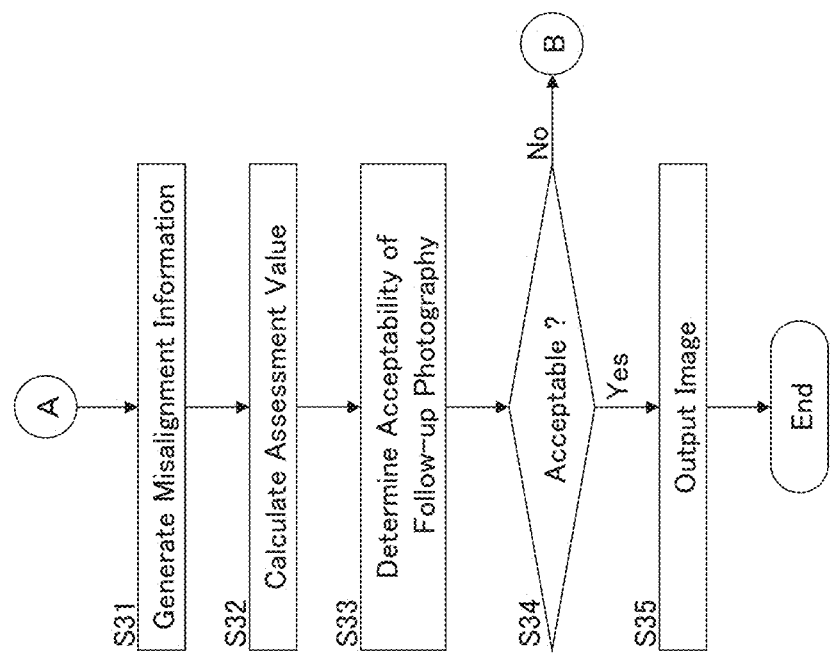

SLIT LAMP MICROSCOPE

CROSS-REFERENCE TO RELATED APPLICATIONS

This application is a national stage (under 35 U.S.C. 371) of International Patent Application No. PCT/JP2021/028178, filed Jul. 29, 2021, claiming priority to Japanese Patent Application No. 2020-131465, filed Aug. 3, 2020, both of which are herein incorporated by reference in their entirety.

FIELD

The present disclosure relates to a slit lamp microscope.

BACKGROUND

Diagnostic imaging serves an important role in the field of ophthalmology. Diagnostic imaging uses various kinds of ophthalmic imaging apparatuses. Types of examples of ophthalmic imaging apparatuses include a slit lamp microscope, a fundus camera, a scanning laser ophthalmoscope (SLO), an optical coherence tomography (OCT) apparatus, and so forth.

A slit lamp microscope is the most widely and frequently utilized apparatuses among such various kinds of ophthalmic apparatuses. A slit lamp microscope is used for illuminating a subject's eye with slit light and observing and/or photographing the illuminated cross section from an oblique or side position with a microscope (see, for example, following Patent Documents 1 and 2).

One of the main uses of a slit lamp microscope is observation of anterior eye segments. When observing an anterior eye segment, a doctor observes an entire anterior eye segment while moving the focal position and the area illuminated by slit light, thereby determining the presence or absence of abnormality. Further, a slit lamp microscope may also be used for prescription of vision correction devices such as for checking of a fitting state of a contact lens. In addition, a slit lamp microscope may also be used by a person, such as an optometrist, allied health professional, or a clerk in an optician's store, who is not a medical doctor in order to conduct screening and follow-ups (follow-up observations) for eye diseases or the like.

Recent advances in information and communication technology have been enhancing the progress of research and development related to telemedicine. Telemedicine is the act of using communication networks such as the Internet to provide medical care (diagnosis, treatment) to patients in remote locations. Techniques for operating a slit lamp microscope from a remote location are disclosed in the following Patent Documents 3 and 4.

Acquisition of an appropriate image using a slit lamp microscope requires fine and complicated operations such as illumination angle adjustment and photographing angle adjustment. The techniques disclosed in Patent Documents 3 and 4 require an examiner, who is at a remote location, to conduct operations that are difficult even in the case where the examiner is observing the eyes of a subject face to face. This causes problems such as prolongation of examination time length and impossibility of acquisition of good images.

While slit lamp microscopes are useful and effective for screening, follow-ups, and other examinations as described above, a current problem is that shortage of persons who are skilled in operating slit lamp microscopes makes it impossible for high quality slit lamp microscope examinations to be provided to many people.

Furthermore, in telemedicine and screening, it is often the case that the doctor who conducts image interpretation (image diagnosis) is not present at the location where photography is performed. If this is the case, there is a possibility (risk) that the doctor may be provided with an image that is not suitable for image interpretation. Considering the difficulty of operation and the long length of time required for photographing, it is supposed that this problem is more likely to occur with slit lamp microscopes.

In a follow-up, the same site (part, portion, area, region, etc.) of the subject's eye is repeatedly examined. Follow-ups in the field of ophthalmology present a unique problem in that it is difficult to examine the same site due to the effects of eye movements. The techniques described in Patent Documents 5 to 7 are known as techniques that can be used to address this problem.

The invention described in Patent Document 5 is intended to smoothly detect misalignment between images including rotational movement, and is configured to detect the amount of misalignment between images by performing position matching between a plurality of small area images cut out from these images.

The invention described in Patent Document 6 is intended to continuously measure the same site of the subject's eye, and is configured to detect the shift in the scan position by projecting an auxiliary light beam onto the subject's eye and detecting the auxiliary light beam returning from the subject's eye while scanning the subject's eye with a measurement light beam, and to correct the scan position of the measurement light beam as necessary based on the result of the detection of the scan position shift. Furthermore, the invention described in Patent Document 6 is also capable of using template matching on the basis of a characteristic region (feature region) in a front image in order to perform detection of the scan position shift.

The invention described in Patent Document 7 is intended to achieve accurate projection of a light beam onto a target position regardless of eye movements, and is configured to perform detection of angle of view information of the scan light and misalignment information (positional shift information, positional deviation information, positional error information, or the like) of the subject's eye based on a front image, and correction of the scan position on the basis of these pieces of information detected.

It can be said that it is very important to know the accuracy and precision of follow-up photography, that is, to obtain information on the error in the photographing position (imaging area) in a follow-up. In other words, it can be said that it is very important, in order to make a correct diagnosis, to consider whether or not follow-up photography has been conducted in a proper manner, and further to what degree of accuracy and precision the follow-up photography has been conducted. However, conventional techniques have not been able to provide an assessment of the degree of the error in follow-up photography in a way that is useful to a user.

For example, the technique described in Patent Document 5 is only capable of detecting the amount of misalignment between images, but cannot provide a user with the meaning of the detected misalignment and whether or not the follow-up photography has been performed appropriately. Therefore, this user has no choice but to make his/her own judgment of the meaning of the misalignment and the appropriateness of the follow-up photography based on the misalignment detected. However, the error in the scan start point in follow-up photography is usually on the order of millimeters or less, making it difficult to make a visual judgment on whether or not the follow-up photography has been properly performed. Making such a judgment is not easy, not only for an unskilled person but also for a skilled doctor. In addition, while there are various forms of misalignments, such as parallel misalignments and rotational misalignments, it has been impossible to conduct misalignment assessments at least from the perspective of appropriateness of follow-up photography.

The technique described in Patent Document 6 and the technique described in Patent Document 7 both are configured to correct the scan position by detecting the misalignment while performing photography. Therefore, even if this correction is made, the shift in the scan position (the error in the follow-up photography) still remains. Accordingly, these conventional techniques are unable to provide suitable assessment of the degree of error in follow-up photography.

[PATENT DOCUMENT 1] Japanese Unexamined Patent Application Publication No. 2016-159073
[PATENT DOCUMENT 2] Japanese Unexamined Patent Application Publication No. 2016-179004
[PATENT DOCUMENT 3] Japanese Unexamined Patent Application Publication No. 2000-116732
[PATENT DOCUMENT 4] Japanese Unexamined Patent Application Publication No. 2008-284273
[PATENT DOCUMENT 5] Japanese Unexamined Patent Application Publication No. 2011-50430
[PATENT DOCUMENT 6] Japanese Unexamined Patent Application Publication No. 2011-115507
[PATENT DOCUMENT 7] Japanese Unexamined Patent Application Publication No. 2011-212213

BRIEF SUMMARY

An objective of the present disclosure is to provide a useful assessment of errors in follow-up photography.

A slit lamp microscope of an embodiment example includes an image acquiring unit, a memory, and a misalignment information acquiring processor. The image acquiring unit is configured to acquire an image by applying a scan with slit light to an anterior segment of a subject's eye. The memory stores a first image of the anterior segment, and a second image that is acquired by follow-up photography performed by the image acquiring unit with reference to the first image. The misalignment information acquiring processor is configured to acquire misalignment information between the first image and the second image by analyzing the first image and the second image after the follow-up photography.

The embodiment example according to the present disclosure is capable of providing a useful assessment of errors in follow-up photography.

BRIEF DESCRIPTION OF THE SEVERAL VIEWS OF THE DRAWING

FIG. 1A is a schematic diagram illustrating a configuration of a slit lamp microscope according to an aspect example.

FIG. 2A is a schematic diagram for describing an operation of a slit lamp microscope according to an aspect example.

FIG. 2B is a schematic diagram for describing an operation of a slit lamp microscope according to an aspect example.

FIG. 4C is a schematic diagram illustrating a configuration of a slit lamp microscope according to an aspect example.

FIG. 9 is a schematic diagram for describing an operation of a slit lamp microscope according to an aspect example.

FIG. 14 is a flowchart illustrating an operation of a slit lamp microscope according to an aspect example.

DETAILED DESCRIPTION

Figure 1B:
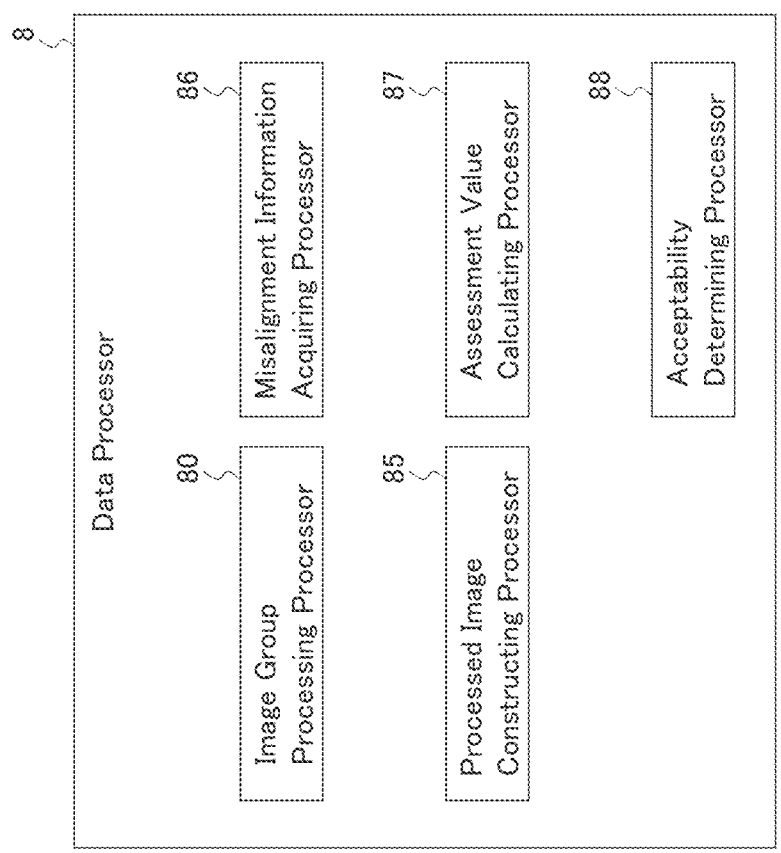
FIG. 1B is a schematic diagram illustrating a configuration of a slit lamp microscope according to an aspect example.

Some aspect examples will be described in detail with referring to the drawings. It should be noted that any known techniques or technologies such as any of the matters or items disclosed in the documents cited herein may be combined with the aspect examples. In addition, the entire disclosures of any of other patent applications filed by the present applicant may be incorporated into the present disclosure. For example, at least part of the disclosures of the patent applications relating to a slit lamp microscope filed by the present applicant, at least part of the disclosures of the patent applications relating to a system that includes a slit lamp microscope filed by the present applicant, or at least part of the disclosures of the applications relating to a system connectable to a slit lamp microscope filed by the present applicant, may be incorporated into the present disclosure.

The slit lamp microscope according to some aspect examples may be a stationary type or a portable type. The slit lamp microscope according to some aspect examples may be used in situations and/or environments where no technical experts (skilled persons) relating to the concerned apparatus and/or the concerned examination are present in that location. The slit lamp microscope according to some aspect examples may also be used in situations and/or environments where a skilled person is present in that location, or in situations and/or environments where a skilled person can provide monitoring, give instructions, and/or conduct an apparatus operation, from a remote location. Examples of the facility in which the slit lamp microscope according to some aspect examples is installed include an optician's store, an optometrist's office, a health facility, a medical institution, a health check and screening venue, a patient's home, a welfare facility, a public facility, a medical examination vehicle, and so forth.

The apparatus or system according to some aspect examples has at least the function of a slit lamp microscope, and may further have optional functions such as a photographing or imaging function (modality function) with an apparatus other than a slit lamp microscope, an ocular characteristic measurement function, and an analysis function.

The ophthalmic system according to some aspect examples (first ophthalmic system) may include one or more slit lamp microscopes, one or more information processing apparatuses, and one or more image interpretation computer terminals, and may be used for telemedicine, for example. The slit lamp microscope may be a slit lamp microscope according to any aspect example, or may be a slit lamp microscope including at least part of a slit lamp microscope according to any aspect example. The information processing apparatus is configured to receive an image acquired by the slit lamp microscope and transmit the image to the image interpretation computer terminal. In addition, the information processing apparatus may have a function of managing images acquired by the slit lamp microscope(s). Note that the first ophthalmic system may not include any information processing apparatus and an image may be transmitted from the slit lamp microscope to the image interpretation computer terminal. The image interpretation computer terminal is a computer used by a doctor (typically, a specialist such as an ophthalmologist or a medical image interpreter) to conduct interpretation of an image acquired by the slit lamp microscope. Here, the interpretation is an act of observing an image to obtain medical findings. Information entered into the image interpretation computer terminal by the person who has conducted the image interpretation may, for example, be converted by the image interpretation computer terminal or another computer into an image interpretation report or electronic medical record information and then transmitted to the information processing apparatus. Another aspect example may be configured in such a manner that information entered by a person who has conducted image interpretation is received by the image interpretation computer terminal and the information received is transmitted to the information processing apparatus by the image interpretation computer terminal. Then, the information transmitted from the image interpretation computer terminal is received by the information processing apparatus and an image interpretation report or electronic medical record information are generated from the received information by the information processing apparatus or another computer. The information processing apparatus may include a function of managing image interpretation reports or electronic medical record information. In addition, the information processing apparatus may include a function of transferring image interpretation reports or electronic medical record information to another apparatus or another medical system (e.g., an electronic medical record system).

An ophthalmic system according to another aspect example (second ophthalmic system) may include one or more slit lamp microscopes, one or more information processing apparatuses, and one or more image interpretation apparatuses. At least one of the slit lamp microscope and the information processing apparatus may be the same as or similar to that (those) of the first ophthalmic system. The second ophthalmic system may not include any information processing apparatus and an image may be transmitted from the slit lamp microscope to the image interpretation apparatus. The image interpretation apparatus is a computer configured to perform interpretation processing of an image acquired by the slit lamp microscope, using an artificial intelligence engine (inference engine, inference model, trained model (learned model), etc.) and/or an image processing processor configured to operate according to a predetermined program. The image interpretation apparatus or another computer is capable of generating an image interpretation report or electronic medical record information from information derived from the image by the image interpretation apparatus. The image interpretation report or electronic medical record information generated may be transmitted to the information processing apparatus. In another example, information derived from the image by the image interpretation apparatus may be transmitted to the information processing apparatus. In this case, the information processing apparatus or another computer may generate an image interpretation report or electronic medical record information from the information derived from the image by the image interpretation apparatus. In yet another example, information derived from the image by the image interpretation apparatus and/or information generated based on this information (e.g., image interpretation report, electronic medical record information, etc.) may be provided to a doctor as diagnosis support information.

An ophthalmic system according to yet another aspect example (third ophthalmic system) may include one or more slit lamp microscopes and one or more information processing apparatuses. The slit lamp microscope may be the same as or similar to that of the first ophthalmic system. The information processing apparatus may be the same as or similar to that of the first ophthalmic system and/or that of the second ophthalmic system. In other words, the information processing apparatus may be configured to be capable of performing data communication with the image interpretation computer terminal of the first ophthalmic system or a computer similar to this image interpretation computer terminal, and/or, may be configured to be capable of performing data communication with the image interpretation apparatus of the second ophthalmic system or a computer similar to this image interpretation apparatus.

The slit lamp microscopes and the ophthalmic systems according to some aspect examples can be used for telemedicine. As mentioned above, acquisition of an eligible image (good image, satisfactory image) using a slit lamp microscope is not an easy task. In addition, effective image interpretation and diagnosis require acquisition of an image of a wide area of an anterior eye segment "in advance". For these reasons, it can be said that effective telemedicine using slit lamp microscopes has not been achieved. Some aspect examples can provide technologies and techniques that contribute to the achievement (realization, implementation) of effective telemedicine with slit lamp microscopes. However, the use of some aspect examples is not limited to telemedicine, and some aspect examples may also be applied to other uses. In particular, intended uses of the present disclosure include follow-ups using a slit lamp microscope.

The slit lamp microscope according to some aspect examples can be used to acquire a series of images (image group, image set) that represents a wide area of an anterior eye segment with satisfactory image quality.

Some aspect examples are also focused on the following problems. Some application modes or implementation modes (e.g., telemedicine) of some aspect examples are operated to provide a series of images (image group, image set) acquired from a sufficiently wide area of an anterior eye segment by a slit lamp microscope directly or indirectly to a person who conducts image interpretation. Therefore, performing re-photographing is difficult even when the quality of a series of images provided is low, thus there is a risk of yielding, as a result, problematic cases such as the following events: image interpretation cannot be conducted at all; or only inadequate image interpretation can be conducted. Accordingly, acquisition of images with "satisfactory" quality "in advance" is required. More specifically, it is desired to collectively acquire a series of images having a quality that enables effective diagnosis (e.g., effective image interpretation) before providing the series of images to a person who conducts image interpretation. However, considering the occurrence of blinking and eye movements during photographing in addition to difficulty of operating slit lamp microscopes, it is extremely difficult to obtain a series of images that represents an entire target area for observation and image interpretation with satisfactory image quality. The present disclosure also considers addressing these issues.

Hereinafter, some aspect examples will be described. Any two or more of these aspect examples may be combined at least in part. Further, any known technique or technology may further be combined with such a combination. In addition, any modifications (e.g., replacements, omissions, etc.) on the basis of any known technique or technology may be applied to such a combination.

At least one or more of the functions of the elements described in the present disclosure are implemented by using a circuit configuration (circuitry) or a processing circuit configuration (processing circuitry). The circuitry or the processing circuitry includes any of the following options, all of which are configured and/or programmed to execute at least one or more functions disclosed herein: a general purpose processor, a dedicated processor, an integrated circuit, a central processing unit (CPU), a graphics processing unit (GPU), an application specific integrated circuit (ASIC), a programmable logic device (e.g., a simple programmable logic device (SPLD), a complex programmable logic device (CPLD), or a field programmable gate array (FPGA)), an existing or conventional circuit configuration or circuitry, and any combination of these. A processor is considered to be processing circuitry or circuitry that includes a transistor and/or another circuitry. In the present disclosure, circuitry, a unit, a means, or a term similar to these is hardware that executes at least one or more functions disclosed herein, or hardware that is programmed to execute at least one or more functions disclosed herein. Hardware may be the hardware disclosed herein, or alternatively, known hardware that is programmed and/or configured to execute at least one or more functions described herein. In the case in which the hardware is a processor, which may be considered as a certain type of circuitry, then circuitry, a unit, a means, or a term similar to these is a combination of hardware and software. In this case, the software is used to configure the hardware and/or the processor.

<Configuration of Slit Lamp Microscope>

FIG. 1A and FIG. 1B show a configuration of a slit lamp microscope according to one aspect example. FIG. 1A shows an example of the overall configuration of the slit lamp microscope 1, and FIG. 1B shows an example of the configuration of the data processor 8 of the slit lamp microscope 1. The slit lamp microscope 1 may be used for a follow-up of the subject's eye E. In FIG. 1A, the cornea of the subject's eye E is denoted by the reference character C, the crystalline lens is denoted by the reference character CL, the iris is denoted by the reference character IR, and the corner angle is denoted by the reference character CA.

The slit lamp microscope 1 includes the illumination system 2, the photography system 3, the movement mechanism 6, the controller 7, the data processor 8, the communication device 9, and the memory 10. The slit lamp microscope 1 may be a single apparatus, or may also be a system that includes two or more apparatuses. In the case where the slit lamp microscope 1 is configured as a system, the slit lamp microscope 1 may include a main apparatus, a computer, and a communication interface. Here, the main apparatus may include the illumination system 2, the photography system 3, and the movement mechanism 6, the computer may include the controller 7, the data processor 8, and the communication device 9, and the communication interface may perform data communication between the main apparatus and the computer. This computer may be installed together with the main apparatus, for example, or may also be installed on a network. Examples of this computer include the above-described information processing apparatus, image interpretation computer terminal, and image interpretation apparatus.

<Illumination System 2>

The illumination system 2 projects slit light onto the anterior segment of the subject's eye E. The reference character 2a denotes the optical axis of the illumination system 2 that is referred to as the illumination optical axis. The illumination system 2 may have the same or similar configuration as or to the illumination system of a conventional slit lamp microscope. An example of the illumination system 2 includes an illumination light source, a positive lens, a slit forming member, and an objective lens in the order from the side far from the subject's eye E (not shown in the drawings).

The illumination light source outputs (emits) illumination light. The illumination system 2 may include a plurality of illumination light sources. For example, the illumination system 2 may include both an illumination light source that outputs continuous light or steady light, and an illumination light source that outputs flash light. Further, the illumination system 2 may include both an illumination light source for anterior segment illumination and an illumination light source for posterior segment illumination. Furthermore, the illumination system 2 may include two or more illumination light sources with mutually different output wavelengths. A typical example of the illumination system 2 includes a visible light source as an illumination light source. The illumination system 2 may also include an infrared light source. The illumination light output from the illumination light source passes through the positive lens and is projected onto the slit forming member.

The slit forming member passes a part of the illumination light to generate slit light. A typical example of the slit forming member has a pair of slit blades. The width of the region through which the illumination light passes is changed by changing the interval between the slit blades, and the width of the slit light is changed accordingly. The region through which the illumination light passes is referred to as a slit, and the interval between the slit blades is referred to as a slit width. Further, the slit forming member may be configured to be capable of changing the length of the slit light. The length of the slit light is a size of a cross section of the slit light along the direction orthogonal to the cross sectional width direction of the slit light. Here, the cross sectional width direction corresponds to the slit width. The width of the slit light and the length of the slit light of some typical examples are represented as the size (dimensions) of a projected image on the anterior segment formed by the slit light; however, possible representations of the width and length of the slit light are not limited to these examples. For example, the width of the slit light and the length of the slit light may be represented as the size of the cross section of the slit light at a freely selected or determined position, or as the size of the slit formed by the slit forming member.

The slit light generated by the slit forming member is refracted by the objective lens and is projected onto the anterior segment of the subject's eye E.

The illumination system 2 may further include a focus mechanism configured for changing the focal position of the slit light. The focus mechanism may be configured to move the objective lens along the illumination optical axis 2a, for example. The movement of the objective lens may be carried out automatically and/or manually. Another focus mechanism may be configured to change the focal position of the slit light by: preparing and disposing a focusing lens at a position in the illumination optical axis 2a between the objective lens and the slit forming member; and moving the focusing lens along the illumination optical axis 2a.

Note that FIG. 1A is a top view. As shown in FIG. 1A, the direction along the axis of the subject's eye E is defined as the Z direction in the present aspect example. Of the directions orthogonal to the Z direction, the left-right direction (or, the lateral direction) for the subject is defined as the X direction. The direction orthogonal to both the X direction and the Z direction is defined as the Y direction. In some typical examples, the X direction is the direction from one of the left eye and the right eye toward the other, and the Y direction is the direction parallel to the body axis of the subject (body axis direction).

<Photography System 3>

The photography system 3 is configured to perform photography of the anterior segment while the slit light from the illumination system 2 is being projected onto the anterior segment. The reference character 3a denotes the optical axis of the photography system 3 that is referred to as the photography optical axis. The photography system 3 of the present aspect example includes the optical system 4 and the image sensor 5.

The optical system 4 is configured to direct light coming from the anterior segment of the subject's eye E onto which the slit light is being projected, to the image sensor 5. The image sensor 5 includes a light detecting plane that receives the light directed by the optical system 4.

The light directed by the optical system 4, that is, the light coming from the anterior segment of the subject's eye E, contains return light of the slit light being projected onto the anterior segment, and may further contain other kinds of light. Examples of the return light include reflected light of the slit light, scattered light of the slit light, and fluorescence induced by the slit light. Examples of the other kinds of light include light from the environment, such as indoor light (room light) and sunlight. In the case where another illumination system different from the illumination system 2 is provided as an anterior segment illumination system for illuminating the entire anterior segment, return light of the anterior segment illumination light emitted by the anterior segment illumination system is contained in the light directed by the optical system 4.

The optical system 4 may have the same or similar configuration as or to the photography system of a conventional slit lamp microscope. For example, the optical system 4 includes an objective lens, a variable magnification optical system, and an imaging lens in the order from the side closer to the subject's eye E. The light coming from the anterior segment of the subject's eye E onto which the slit light is being projected, passes through the objective lens and the variable magnification optical system, and then forms an image on the light detecting plane of the image sensor 5 by the imaging lens.

The image sensor 5 may be an area sensor that has a two dimensional image detecting area. The image sensor 5 may be, for example, a charge-coupled device (CCD) image sensor or a complementary metal oxide semiconductor (CMOS) image sensor.

The photography system 3 may further include a focus mechanism configured for changing the focal position of the photography system 3. The focus mechanism may be configured to move the objective lens along the photography optical axis 3a, for example. The movement of the objective lens may be carried out automatically and/or manually. Note that a focusing lens may be prepared and disposed at a position in the photography optical axis 3a between the objective lens and the imaging lens, and also the focus mechanism may be configured to be capable of moving the focusing lens along the photography optical axis 3a, thereby changing the focal position of the photography system 3.

The illumination system 2 and the photography system 3 function as a Scheimpflug camera. More specifically, the illumination system 2 and the photography system 3 are configured in such a manner that the subject plane along the illumination optical axis 2a, the optical system 4, and the light detecting plane of the image sensor 5 satisfy what is commonly referred to as the Scheimpflug condition. More specifically, the YZ plane passing through the illumination optical axis 2a (the YZ plane contains the subject plane), the principal plane of the optical system 4, and the light detecting plane of the image sensor 5 intersect on the same straight line. As a result of this, photographing can be performed with all positions in the subject plane in focus. In other words, photographing can be performed with all positions in the direction along the illumination optical axis 2a in focus.

In the present aspect example, photography is performed under the condition in which a three dimensional region that includes at least a part of a predetermined site of the anterior segment is in focus of the photography system 3, for example. As for the z direction, for example, photography may be performed under the condition in which the focus of the photography system 3 is on the entire area from the apex of the anterior surface of the cornea C (Z=Z1) to the apex of the posterior surface of the crystalline lens CL (Z=Z2). Note that the location Z=Z0 corresponds to the Z coordinate of the intersection of the illumination optical axis 2a and the photography optical axis 3a.

The condition described above is typically implemented by the configuration and arrangement of the elements included in the illumination system 2, the configuration and arrangement of the elements included in the photography system 3, and the relative positions between the illumination system 2 and the photography system 3. A parameter indicating the relative positions of the illumination system 2 and the photography system 3 may include the angle θ formed by the illumination optical axis 2a and the photography optical axis 3a, for example. The value of the angle θ may be set to 17.5 degrees, 30 degrees, or 45 degrees, for example. The angle θ may be variable.

<Movement Mechanism 6>

The movement mechanism 6 is configured to move the illumination system 2 and the photography system 3. The movement mechanism 6 includes, for example, a movable stage, an actuator, and a mechanism. The illumination system 2 and the photography system 3 are placed on the movable stage. The actuator is configured to operate in accordance with a control signal input from the controller 7. The mechanism is configured to receive driving force generated by the actuator and move the movable stage. In another example, the movement mechanism 6 may include a movable stage on which the illumination system 2 and the photography system 3 are placed, and a mechanism configured to receive force applied to an operation device (not shown in the drawings) and move the movable stage. The operation device is a lever, for example. The movable stage may be movable at least in the X direction and may be further movable in at least one of the Y direction and the Z direction.

The movement mechanism 6 of the present aspect example is configured to move the illumination system 2 and the photography system 3 together with each other in the X direction, for example. In other words, the movement mechanism 6 moves the illumination system 2 and the photography system 3 in the X direction while maintaining the state in which the above-mentioned Scheimpflug condition is satisfied. In parallel with this movement, the photography system 3 performs moving image photography at a predetermined time interval (photographing rate, acquisition rate), for example. As a result of this, a three dimensional region of the anterior segment of the subject's eye E is scanned with the slit light, and a plurality of images (an image group) corresponding to the plurality of cross sections in the three dimensional region are collected.

In some typical examples, the longitudinal direction (length direction) of the slit light projected onto the anterior segment by the illumination system 2 matches the Y direction, and the lateral direction (width direction) thereof matches the X direction. Further, the movement mechanism 6 is operated to move the illumination system 2 and the photography system 3 together with each other in the X direction. In other words, the movement mechanism 6 moves the illumination system 2 and the photography system 3 in such a manner that the slit light projected onto the anterior segment by the illumination system 2 moves in the width direction of the slit light. This makes it possible to simply and efficiently scan the three dimensional region of the anterior segment. Note that the combination of the orientation of the slit light and the direction of movement may be freely determined.

<Controller 7>

The controller 7 is configured to control each part of the slit lamp microscope 1. For example, the controller 7 controls elements of the illumination system 2 (e.g., illumination light source, slit forming member, focus mechanism, etc.), elements of the photography system 3 (e.g., focus mechanism, image sensor, etc.), the movement mechanism 6, the data processor 8, and the communication device 9, and so forth. Further, the controller 7 may be configured to be capable of executing a control for changing the relative positions of the illumination system 2 and the photography system 3. Further, the controller 7 may be configured to be capable of executing a control of a device included in the slit lamp microscope 1 (e.g., a display device) or a device connected to the slit lamp microscope 1 (e.g., a display device).

The controller 7 includes a processor, a primary storage, a secondary storage, and so forth. The secondary storage retains a control program and so forth. The control program and so forth may be stored in a computer or a storage accessible by the slit lamp microscope 1. The function of the controller 7 is implemented by cooperation of software such as the control program and hardware such as the processor.

The controller 7 may be configured to be capable of applying the controls described in the following to the illumination system 2, the photography system 3 and the movement mechanism 6 in order to scan a three dimensional region of the anterior segment of the subject's eye E with the slit light.

First, the controller 7 executes a control of the movement mechanism 6 to place the illumination system 2 and the photography system 3 at a predetermined scan start position. This control is referred to as an alignment control. The scan start position is, for example, a position corresponding to the edge position (first edge position) of the cornea C in the X direction, or a position further away from the axis of the subject's eye E than the first edge position.

The reference character X0 shown in FIG. 2A denotes an example of a scan start position corresponding to the first edge position of the cornea C in the X direction. Further, the reference character X0' shown in FIG. 2B denotes an example of a scan start position further away from the axis EA of the subject's eye E than the position corresponding to the first edge position of the cornea C in the X direction.

The controller 7 executes a control of the illumination system 2 to start the projection of the slit light onto the anterior segment of subject's eye E. This control is referred to as a slit light projection control. The slit light projection control may be performed before the execution of the alignment control or during the execution of the alignment control. The slit light is typically continuous light, but the slit light may be intermittent light (pulse light). The turning on/off control of the pulse light is synchronized with the photographing rate of the photography system 3. The slit light is typically visible light, but the slit light may be infrared light or a mixture of visible light and infrared light.

The controller 7 executes a control of the photography system 3 to start moving image photography (moving image acquisition) of the anterior segment of the subject's eye E. This control is referred to as a photography control. The photography control may be performed before the execution of the alignment control or during the execution of the alignment control. In some typical examples, the photography control is executed simultaneously with the slit light projection control or after the slit light projection control.

After the executions of the alignment control, the slit light projection control, and the photography control, the controller 7 performs a control of the movement mechanism 6 to start the movement of the illumination system 2 and the photography system 3. This control is referred to as a movement control. The illumination system 2 and the photography system 3 are moved together by the movement control. In other words, the movement mechanism 6 moves the illumination system 2 and the photography system 3 while maintaining the relative positions (e.g., the angle θ) between the illumination system 2 and the photography system 3. In some typical examples, the movement mechanism 6 moves the illumination system 2 and the photography system 3 while maintaining the state in which the aforementioned Scheimpflug condition is satisfied. The movement of the illumination system 2 and the photography system 3 is performed from the aforementioned scan start position to a predetermined scan end position. The scan end position is, for example, a position corresponding to the edge position (second edge position) of the cornea C on the opposite side of the first edge position in the X direction, or a position further away from the axis of the subject's eye E than the second edge position, as in the scan start position. In such a case, the area from the scan start position to the scan end position becomes a scan area.

In some typical examples, the photography system 3 carries out the moving image photography in parallel with the projection of the slit light onto the anterior segment and the movement of the illumination system 2 and the photography system 3 in the X direction. Here, the width direction of the slit light corresponds to the X direction and the longitudinal direction of the slit light corresponds to the Y direction.

Here, the length of the slit light (that is, the size of the slit light in the Y direction) is set to be, for example, equal to or greater than the diameter of the cornea C on the surface of the subject's eye E. In other words, the length of the slit light is set to be equal to or greater than the corneal diameter in the Y direction. Further, the distance of the movement of the illumination system 2 and the photography system 3 carried out by the movement mechanism 6 (that is, scan area) is set to be equal to or greater than the corneal diameter in the X direction, as described above. As a result of setting the slit light length and the movement distance in these manners, an area including the entire cornea C can be scanned with the slit light.

Figure 3:
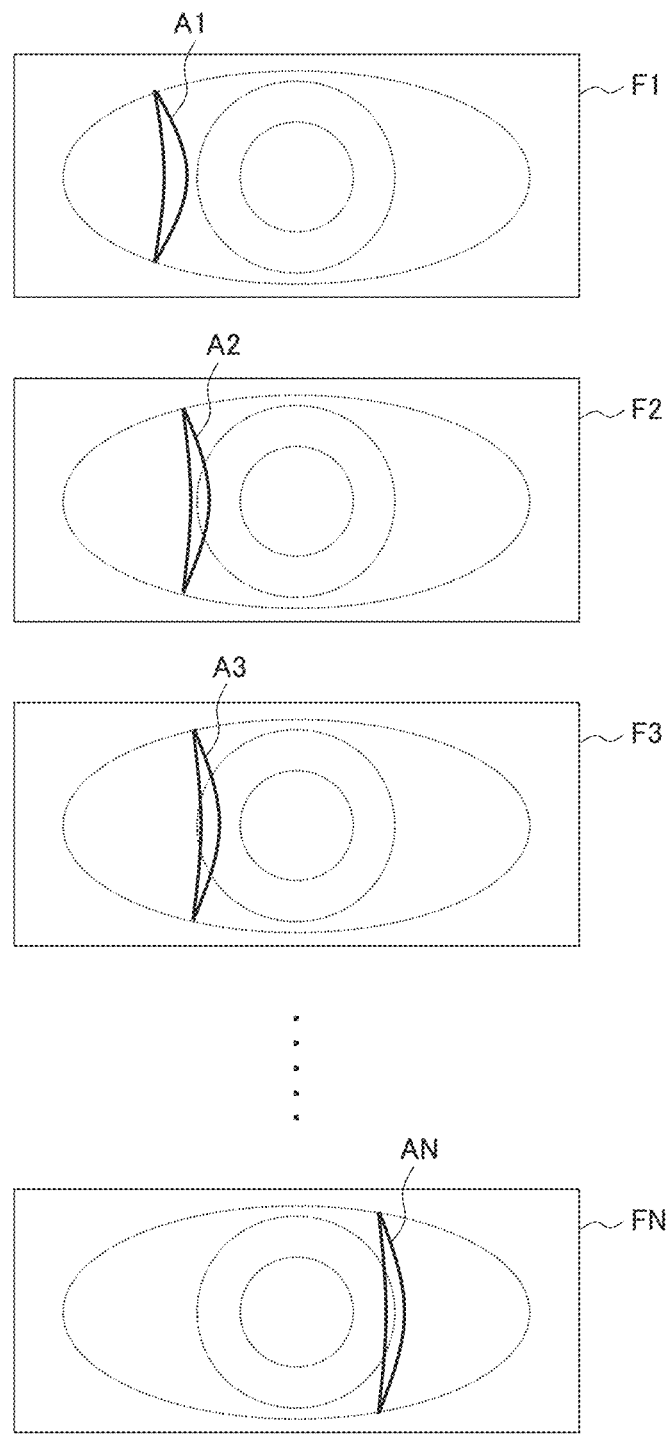
FIG. 3 is a schematic diagram for describing an operation of a slit lamp microscope according to an aspect example.

By performing such a scan, a plurality of anterior segment images corresponding to mutually different slit light projection positions is acquired. In other words, a moving image is obtained in which the state (aspect) of the movement of the slit light projection position in the X direction is depicted. FIG. 3 shows an example of such a plurality of anterior segment images, that is, an example of such a group of frames (a frame group) composing a moving image.

FIG. 3 shows the plurality of anterior segment images (the frame group, the image group) F1, F2, F3, ..., and FN. The subscripts "n" of the anterior segment images Fn (n=1, 2, ..., N) represent a time series order. In other words, the n-th anterior segment image acquired is represented by the reference character "Fn". The anterior segment image Fn includes the region onto which the slit light is being projected (slit light projected region) An. As shown in FIG. 3, the positions of the slit light projected regions A1, A2, A3, ..., and AN shift to the right in time series order.

In the example shown in FIG. 3, the longitudinal direction (length direction) of the slit light matches the Y direction (vertical direction, body axis direction), the lateral direction (width direction) matches the X direction (left-right direction, horizontal direction), and the moving direction of the slit light matches the X direction. In addition, the scan start position is a position outside (left side) of the first edge position (left edge) of the cornea C, and the scan end position is a position outside (right side) of the second edge position (right edge) of the cornea C. According to the scanning of this mode, a three dimensional region that includes the entire cornea C can be photographed. Note that possible scan start positions and/or possible scan end positions are not limited to those in the present example. In some examples, the scan start position and/or the scan end position may be the edge position(s) of the cornea C in the X direction. Various kinds of scan parameters, such as the orientation of the slit light, the movement direction of the slit light, and the number of times of scans, can also be freely determined.

<Data Processor 8>

The data processor 8 executes various kinds of data processing. Data to be processed may be either any data acquired by the slit lamp microscope 1 or any data input from the outside. The data processor 8 can process images acquired by using the photography system 3.

The data processor 8 includes a processor, a primary storage, a secondary storage, and so forth. The secondary storage retains a data processing program and so forth. The data processing program and so forth may include a model constructed by machine learning (learned model, inference model, etc.). The data processing program and so forth may be stored in a computer or a storage accessible by the slit lamp microscope 1. The function of the data processor 8 is implemented by cooperation of software such as the data processing program and hardware such as the processor.

The example of the data processor 8 shown in FIG. 1B includes the image group processing processor 80, the processed image constructing processor 85, the misalignment information acquiring processor 86, the assessment value calculating processor 87, and the acceptability determining processor 88.

The slit lamp microscope 1 may be configured to be capable of performing follow-up photography and post-processing of the follow-up photography. The follow-up photography is performed in such a manner that the same position as in past photography (photography conducted in a past examination) is again photographed by referring to an image of the subject's eye E acquired in the past. The post-processing may include processing of assessing an error in an imaging position of follow-up photography. More specifically, the post-processing may include processing of assessing a shift (misalignment) between the region of the subject's eye E that is photographed and visualized in past photography and the region of the subject's eye E that is photographed and visualized in follow-up photography performed based on an image acquired in the past photography.

Follow-up photography performed using the slit lamp microscope 1 reproduces the scan position (scan area) of past photography, that is, a past scan applied to the anterior eye segment with slit light. In preparation for follow-up photography using the slit lamp microscope 1, the controller 7 may execute a control of a display device (not shown in the drawings) to display a patient selection screen (not shown in the drawings), for example. In some examples, the patient selection screen includes the following functional parts: a functional part for selecting a patient to whom follow-up photography is applied (patient selecting part); a functional part that displays patient information (patient information display part); and a functional part that displays photography information (photography information display part). The patient selection screen may also include various kinds of operation parts such as software keys. Further, the slit lamp microscope 1 may include an operation device used for performing an operation and/or information input regarding the patient selection screen.

The patient selecting part may be provided with a space in which a search query is input, a calendar used for an operation of selecting the date of photography (date of acquisition) (e.g., the last date on which photography has been performed in the past, etc.). When an input is made into the patient selecting part, the controller 7 may search for patient information stored in a storage (e.g., the memory 10, a storage accessible by the slit lamp microscope 1, or the like) and then execute a control of displaying the retrieved patient information on the patient information display part. The patient information may include, for example, identification information of a patient (referred to as a patient ID or subject ID), name of the patient, gender of the patient, date of birth of the patient, electronic medical record information of the patient, and so forth. In the cases such as when the calendar is used to select the date of photography, the controller 7 may execute a control of displaying a list containing a plurality of pieces of patient information on the patient information display part. The user can select a desired patient from the list displayed.

When a patient is selected, the controller 7 can obtain photography information related to the selected patient from the storage and execute a control of displaying the photography information on the photography information display part. In the case where photography has been performed a plurality of times in the past, the controller 7 may, for example, execute a control of displaying, on the photography information display part, a list in which a plurality of pieces of photography information respectively for the plurality of times of photography in chronological order is listed. The photography information may include, for example, the following pieces of information: date of photography; time of photography; address of storage into which data is stored (e.g., file number, etc.); whether or not photography is follow-up photography; scanning mode (e.g., scanning conditions, etc.); identification information for left eye or right eye; fixation position; and information relating to analysis processing (e.g., analysis content, analysis conditions, etc.).

When photography information to be referenced in follow-up photography is selected, the controller 7 can obtain an image obtained in past photography corresponding to the selected photography information from the storage, and then execute a control of the display device to display the image obtained. At this time, a screen displayed on the display device is switched from the patient selection screen to an image display screen (not shown in the drawings). The user can observe and refer to the displayed image and decide whether or not to use this image for follow-up photography. In the case of referring to another image, the user can observe various past images and select a desired image. When the image to be referred to is determined, the controller 7 can display the selected image on the display device and shift the operation state of the slit lamp microscope 1 to a state of waiting for an instruction to start follow-up photography.

Upon receiving a predetermined photographing start instruction input, the controller 7 can execute, for example, an alignment control, a slit light projection control, a photography control, a movement control, and so forth. By such controls, the controller 7 can conduct a control for performing photography of the same site under the same conditions as in past photography.

The controller 7 may be configured to store an image obtained by follow-up photography conducted in this way into the memory 10 in association with patient information, scan position information (scan area information), photography information, information related to past photography being referred to, and so forth.

<Image Group Processing Processor 80>

Figure 4A:
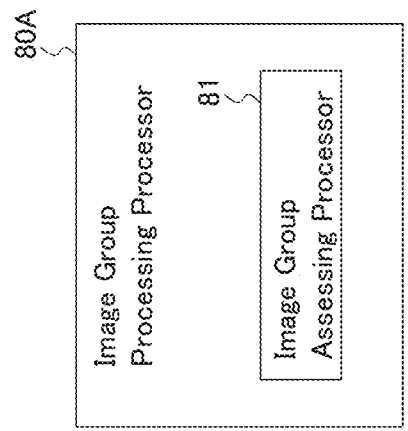
FIG. 4A is a schematic diagram illustrating a configuration of a slit lamp microscope according to an aspect example.
Figure 4B:
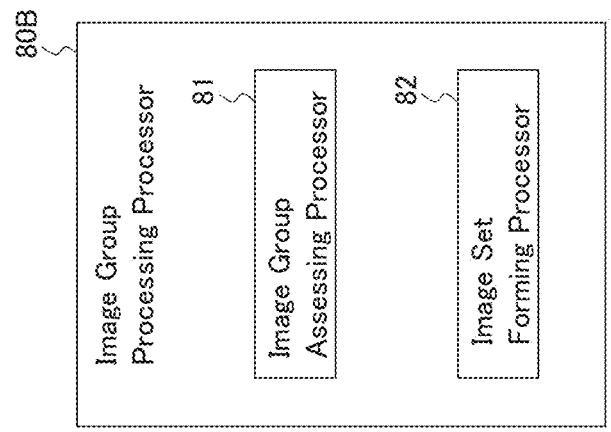
FIG. 4B is a schematic diagram illustrating a configuration of a slit lamp microscope according to an aspect example.
Figure 4D:
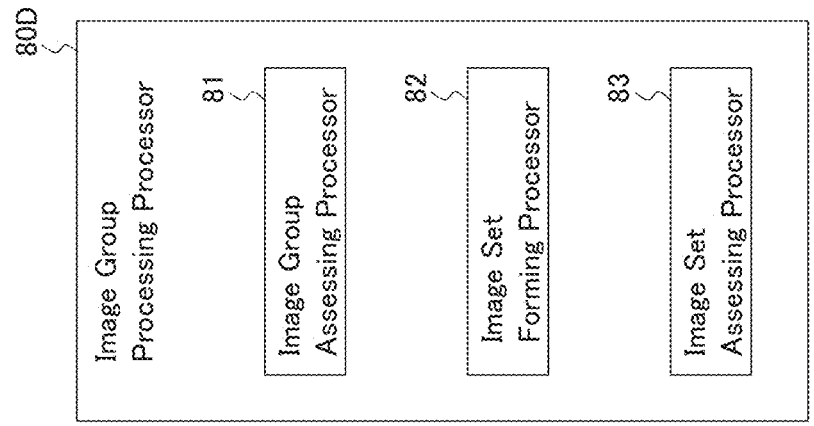
FIG. 4D is a schematic diagram illustrating a configuration of a slit lamp microscope according to an aspect example.

The image group processing processor 80 is configured to execute processing of at least one or more images of an image group collected by scanning the anterior segment with slit light. Some examples of the image group processing processor 80 will be described. The image group processing processor 80A shown in FIG. 4A, the image group processing processor 80B shown in FIG. 4B, the image group processing processor 80C shown in FIG. 4C, and the image group processing processor 80D shown in FIG. 4D are the first, second, third, and forth examples of the image group processing processor 80, respectively. Possible configurations of the image group processing processor 80 are not limited to these examples. For example, the image group processing processor 80 may include a combination of any two or more of the four image group processing processors 80A, 80, 80C, and 80D. In some examples, the image group processing processor 80 may be provided with any element configured for obtaining the same or similar types of results.

The slit lamp microscope 1 of the present aspect example applies one or more times of scans to the anterior segment of the subject's eye E. Each scan generates an image group like the plurality of anterior segment images F1 to FN shown in FIG. 3. The image group processing processor 80 may apply processing to one or more image groups acquired in this way.

The slit lamp microscope 1 may be configured to be capable of applying two or more times of scans to the anterior segment. For example, in the case where the first scan (the scan of the first time) does not yield a satisfactory image group, the second scan (the scan of the second time) is performed. More generally, in the case where all the first to the v-th scans (the scan of the v-th time) do not yield a satisfactory series of images, the (v+1)-th scan (the scan of the (v+1)-th time) is then performed (where v is an integer equal to or greater than 1). In some aspect examples, in the case where no satisfactory series of images (image set) is obtained from the v number of (pieces of) image groups acquired from the v number of (times of) scans of the first to the v-th scans, the (v+1)-th scan is then performed. In some other aspect examples, in the case where none of the v number of image groups acquired from the v number of scans of the first to the v-th scans is a satisfactory image set, the (v+1)-th scan is then performed. Note that the manner of conducting two or more times of scans is not limited to these example cases.

In the case where the slit lamp microscope 1 performs two or more times of scans, the start positions and the end positions (that is, scan areas) of the two or more times of scans may be the same, or one of or both the start positions and the end positions may be different. The two or more times of scans of some typical examples are aimed at the same scan area. Such scans acquire image groups, each of which is like the plurality of anterior segment images F1 to FN shown in FIG. 3. The number of the acquired image groups is equal to the number of scans.

Considering the eye movements of the subject's eye E and so forth, the scan area of some typical examples (scan start position, scan end position) is defined by the operation of the slit lamp microscope 1 rather than positions or area in an anterior eye segment. For example, the start point of the movement of the illumination system 2 and the photography system 3 for a scan is determined to be a scan start position, and the end point of the movement of the illumination system 2 and the photography system 3 for a scan is determined to be a scan end position.

On the other hand, a scan area may be defined by positions or area in the anterior segment. In this case, the illumination system 2 and the photography system 3 are moved to follow the movement of the subject's eye E. This operation is referred to as tracking. The slit lamp microscope 1 of the present example has, for example, the same or similar tracking function as or to that of a conventional slit lamp microscope. The tracking function includes, for example, the following processes: a process of performing moving image photography of an anterior eye segment; a process of extracting a landmark from each frame; a process of calculating positional shifts (displacements, positional differences, positional deviations) between frames using the landmarks; and a process of performing a movement control of the illumination system 2 and the photography system 3 to compensate for (to cancel, to eliminate) the positional shifts.

As another example of the definition (setting) of a scan area, a scan area may be set for images that have already been collected. In other words, setting of a scan area may be performed after scanning. A scan area in the present example is an area corresponding to images to be provided for subsequent processing.

A description will be given of the first example of such scan area determination after scanning. The slit lamp microscope of the present example is capable of performing anterior eye segment photography and recognizing the positional relationship between the optical system for anterior eye segment photography and the optical system for scanning (the illumination system 2 and the photography system 3). The present example begins with anterior eye segment photography, in parallel with acquisition of an image group (wide area image group) by scanning a sufficiently wide area of the anterior eye segment (particularly, sufficiently wide ranges in the X direction and the Y direction). Next, a scan area is determined for anterior segment images obtained by this anterior eye segment photography. This determination may be made manually or automatically. Automatic determination may include, for example, a process of analyzing an anterior segment image to detect a landmark and a process of determining a scan area with reference to the landmark. Examples of this landmark may include a corneal edge, a corner angle, or a pupil edge. After the scan area determination, a partial area of each wide area image corresponding to the determined scan area is identified based on the positional relationship between the optical systems described above. Finally, by cropping the identified partial area from the wide area image, an image corresponding to the scan area is formed. With such processes, an image group corresponding to the determined scan area is obtained. When the fixation of the subject's eye is stable (or, when it is or can be assumed as such), anterior eye segment photography of the present example may be still image photography. When anterior eye segment photography of the present example is moving image photography, for example, association (correspondence, relationship) between a wide area image group and a frame group in the moving image is made based on control executed for scanning and moving image photography, such as based on synchronization information between scanning and moving image photography, and the same or similar processing as or to the above is executed for each pair of a wide area image and a frame associated with one another by the association.

The second example of scan area determination after scanning will be described. The present example does not require parallel anterior eye segment photography, and scans a sufficiently wide area of the anterior eye segment (particularly, sufficiently wide ranges in the X direction and the Y direction) to collect a wide area image group. Then, a partial area corresponding to a desired scan area is designated for each wide area image. This designation may be made manually or automatically. Automatic designation may include, for example, a process of analyzing a wide area image to detect a landmark (e.g., a corneal edge or a corner angle) and a process of determining a scan area with reference to the landmark. A landmark may be manually designated for one of the wide area images. This wide area image for which a landmark is designated is referred to as a reference wide area image. Then, the reference wide area image and a wide area image adjacent to the reference wide area image (adjacent wide area image) may be analyzed to designate a landmark for this adjacent wide area image. Sequential application of such processes gives landmarks for all the wide area images. Furthermore, partial areas of the wide area images corresponding to the scan area may be identified based on the landmarks, and images corresponding to the scan area may be obtained by cropping the identified partial areas from the respective wide area images. As a result of this, an image group corresponding to the determined scan area is obtained.

A description will be given of the first example of the image group processing processor 80. The image group processing processor 80A shown in FIG. 4A includes the image group assessing processor 81. The image group assessing processor 81 is configured to execute an assessment of a quality of an image group collected by a single scan of the subject's eye E. In some aspect examples, the image group assessing processor 81 is configured to determine whether or not the image group satisfies a predetermined condition. In typical examples, the image group assessing processor 81 is configured to determine whether or not each image included in the image group satisfies a predetermined condition.

This predetermined condition (referred to as an image group assessment condition) is, for example, a condition relating to image quality required for effective performance of image interpretation and diagnosis. Examples of the image group assessment condition include a condition relating to the subject's eye E, a condition relating to the slit lamp microscope 1, a condition relating to the environment, and so forth. The image group assessment condition may include, for example, either one of or both the following condition items: a condition that an image to be assessed has not been affected by blinking (referred to as a blinking condition); and a condition that an image to be assessed has not been affected by eye movement (referred to as an eye movement condition). Further, the image group assessment condition may include any indicator relating to any image quality assessment and may include any of the following indicators: brightness; contrast; noise; signal-to-noise ratio (SNR); tone reproduction; dynamic range; sharpness; vignetting; aberrations (spherical aberration, astigmatism, comatic aberration, field curvature, distortion, chromatic aberration, etc.); color accuracy; exposure accuracy; lens flare; moire patterns; and artifacts. Possible image group assessment conditions are not limited to these examples, and may be determined and prepared optionally.

A description will be given of the blinking condition. For an image included in the image group, the image group assessing processor 81 performs determination whether or not a reflected image of the slit light projected onto the anterior segment of the subject's eye E is included in this image, for example. This determination is data processing carried out on the basis of a fact that a reflected image of the slit light is not depicted in an image taken during blinking and a fact that a reflected image of the slit light is represented significantly brighter than other areas. The determination is carried out, for example, based on the brightness distribution in an image being processed.

In some aspect examples, the image group assessing processor 81 generates a brightness histogram based on an image and then determines whether or not there is a pixel having brightness equal to or greater than a predetermined threshold value. When the image group assessing processor 81 determines that there is a pixel having brightness equal to or greater than the predetermined threshold value, it is determined that a reflected image of the slit light is included in this image. The present example has an advantage of being extremely simple to process, but it may falsely detect a high-brightness noise or a reflection of environment light (ambient light).

In some other aspect examples, the image group assessing processor 81 generates a brightness histogram based on an image and then determines whether or not there are a predetermined number or more of pixels having brightness equal to or greater than a predetermined threshold value. When the image group assessing processor 81 determines that the number of pixels having brightness equal to or greater than the predetermined threshold value is equal to or greater than the predetermined number, it is determined that a reflected image of the slit light is included in this image. The present example has an advantage that the above false detection can be prevented by simple processes as described above.

A description will be given of the eye movement condition. For an image included in the image group, the image group assessing processor 81 performs determination whether or not eye movement has affected this image by comparing this image with an image adjacent thereto, for example. This determination is data processing carried out on the basis of a fact that eye movement during moving image photography causes "skipping (lack, omission) of an image".

In some aspect examples, the image group assessing processor 81 detects a landmark from each of this image and the adjacent image, calculates the amounts of positional shifts (displacements, positional differences, positional deviations) of the detected landmarks, and determines whether or not each of the positional shift amounts calculated is equal to or greater than a predetermined threshold value. When the image group assessing processor 81 determines that the positional shift amount(s) is equal to or greater than the predetermined threshold value, it is determined that eye movement has occurred. Here, the landmark may be, for example, a cornea, an iris, a pupil, a corner angle, or the like. The threshold value may be calculated based on a predetermined scanning condition such as the photographing rate of the photography system 3, the movement speed of the photography system 3 carried out by the movement mechanism 6, or the like.

In some other aspect examples, the image group assessing processor 81 may be configured to determine the presence or absence of eye movement from a single image. For example, when the photographing rate of the photography system 3 is low and high-speed eye movement occurs, "blurring" may occur in an image obtained. The image group assessing processor 81 may be configured to determine the presence or absence of eye movement by using a blur detection technique. Blur detection of some typical examples is performed using any known techniques such as edge detection.

The image group assessing processor 81 may include an artificial intelligence engine configured to determine whether or not an input image satisfies the image group assessment condition described above. In some typical examples, this artificial intelligence engine includes a convolutional neural network (CNN). This convolutional neural network has been trained in advance using training data. This training data may include a large number of images acquired with slit lamp microscopes and corresponding determination results of whether or not each of these images satisfies the image group assessment condition. Note that images included in the training data are not limited to images acquired with slit lamp microscopes. In some examples, any of the following images may be included in training data: an image acquired using other kinds of ophthalmic modalities (e.g., fundus camera, OCT apparatus, SLO, surgical microscope); an image acquired using any kinds of diagnostic imaging modalities of any clinical departments other than ophthalmology (e.g., ultrasonic diagnostic apparatus, X-ray diagnostic apparatus, X-ray computed tomography (CT) apparatus, magnetic resonance imaging (MRI) apparatus); an image generated by processing an actual image (image acquired from a living body); and a pseudo image. Further, the method and technique used in the artificial intelligence engine may be freely selected from among any known method and technique. For example, the type of hardware, the type of software, the type of machine learning method, and the type of neural network may be freely designed based on any known method and technique.

A series of images composing an image group collected by a single scan may be associated with a plurality of positions (a plurality of locations) in the scan area. This association is performed by the image group processing processor 80, for example. A specific example will be explained. The scan area along the X direction is divided into the N−1 number of sections (intervals), the scan start position is determined at the first position, and the scan end position is determined at the N-th position. Here, N is an integer equal to or greater than 2. As a result, the N number of positions are determined in the scan area. The N number of positions are represented by B1, B2, B3, . . . , BN (not shown in the drawings). The intervals between the N number of positions B1 to BN may be equal or different. The number (N) of positions B1 to BN is determined based, for example, on the scan start position, the scan end position, the movement speed of the slit light (scan speed), the frame rate of the photography system 3, and so forth. The number (N) of positions B1 to BN determined in the present example is equal to the number of images collected by a single scan. Note that possible number (N) of positions B1 to BN is not limited to the present example, nor is possible method of determining thereof limited to the present example. It is now considered a case in which application of a single scan to the anterior segment of the subject's eye E has generated the image groups F1, F2, F3, . . . , FN shown in FIG. 3. The image group processing processor 80 may assign the image Fn to the position Bn. As a result of this, the N number of images Fn (n=1, 2, . . . , N) respectively corresponding to the N number of positions Bn (n=1, 2, . . . , N) can be obtained.

An image group of some examples may include only such a series of images, or may include other information in addition to the series of images. Examples of information that may be included in an image group together with a series of images include various kinds of supplementary information (incidental information, ancillary information) such as subject information, subject's eye information, date and time of photography, and photography conditions (acquisition conditions). An image group of some examples may include an image obtained by using another modality, examination data acquired by using an examination apparatus, or the like. Some examples of the configuration and the operation of the image group assessing processor 81 are described below with reference to FIG. 5A to FIG. 5D.

A description will be given of the second example of the image group processing processor 80. The effectiveness of the present example is particularly demonstrated in the case where two or more times of scans are applied to the subject's eye E. The image group processing processor 80B shown in FIG. 4B includes the image set forming processor 82 in addition to the image group assessing processor 81 that is the same as or similar to that of FIG. 4A. The image group processing processor 80B is provided with two or more image groups collected by two or more times of scans applied to the subject's eye E. The image group assessing processor 81 of the present example may execute a quality assessment of each of these image groups, or alternatively may execute a quality assessment of only an image group acquired by the first scan out of the two or more times of scans. The image set forming processor 82 is configured to execute a formation of an image set by selecting a series of images corresponding to a scan area from the two or more image groups input into the image group processing processor 80B.

The area represented by the series of images composing the image set may correspond to, for example, a three dimensional region to which any one of the two or more scans has been applied, or a three dimensional region determined based on scan areas of at least two of the two or more scans. As an example of the former, the maximum (largest) scan area or the minimum (smallest) scan area among the two or more scan areas to which the two or more scans have been respectively applied may be employed. As an example of the latter, the union set or the intersection set of the at least two scan areas may be employed.

The formed image set may include only the above-mentioned series of images corresponding to the scan area, or may include other information in addition to the series of images. Examples of information that may be included in the image set together with the series of images include various kinds of supplementary information (incidental information, ancillary information) such as subject information, subject's eye information, date and time of photography, and photography conditions. The image set may also include an image obtained by using another modality, examination data acquired by using an examination apparatus, or the like.

A description will be given of the third example of the image group processing processor 80. As in the second example, the effectiveness of the present example is particularly demonstrated when two or more times of scans are applied to the subject's eye E. The image group processing processor 80C shown in FIG. 4C includes both the image group assessing processor 81 configured in the same or similar manner as or to that of FIG. 4A and the image set forming processor 82 configured in the same or similar manner as or to that of FIG. 4B. However, the image set forming processor 82 of the present example includes the selecting processor 821.

The image group processing processor 80C is provided with two or more image groups collected by two or more times of scans applied to the subject's eye E. The image group assessing processor 81 of the present example may execute a quality assessment of each of these image groups, or may execute a quality assessment of only the image groups acquired by the first scan. The image set forming processor 82 is configured to execute a formation of an image set by selecting a series of images corresponding to a scan area from the two or more image groups input into the image group processing processor 80C. In this process of image set formation, the selecting processor 821 executes selection of images each of which satisfies a predetermined condition from the two or more image groups.

The predetermined condition (image selection condition) may be the same as or different from the image group assessment condition described above. In some examples in which the image group processing processor 80C is configured in such a manner that the selecting processor 821 is provided with two or more image groups after the image group assessing processor 81 executes a quality assessment of each of the images, the selecting processor 821 may be configured to execute image selection in consideration of a condition relating to an image arrangement (image order, image sequence, etc.). Here, examples of such a condition include the blinking condition and the eye movement condition described above. Note that the image selection condition is not limited to these examples, and the relationship between the image group assessment condition and the image selection condition is also not limited to these examples.

Below, descriptions will be given of a case in which the selecting processor 821 takes the blinking condition into consideration and a case in which the selecting processor 821 takes the eye movement condition into consideration. In addition, for cases in which the selecting processor 821 takes into consideration a condition other than these two conditions, the selecting processor 821 may be configured to be capable of executing the same or similar processing as or to some specific examples regarding the image group assessing processor 81. These specific examples will be described later with reference to FIG. 5A to FIG. 5D.

A description will be given of image selection with the blinking condition taken into account. Note that the blinking condition is a condition for checking whether or not an image to be assessed has been affected by blinking. For an image included in the two or more image groups, the selecting processor 821 performs determination whether or not a reflected image of the slit light projected onto the anterior segment of the subject's eye E is included in this image, for example. This determination is data processing carried out on the basis of a fact that a reflected image of the slit light is not depicted in an image taken during blinking and a fact that a reflected image of the slit light is represented significantly brighter than other areas. The determination is carried out, for example, based on the brightness distribution in an image being processed.

In some aspect examples, the selecting processor 821 generates a brightness histogram based on an image and then determines whether or not there is a pixel having brightness equal to or greater than a predetermined threshold value. If the selecting processor 821 determines that there is a pixel having brightness equal to or greater than the predetermined threshold value, it is determined that a reflected image of the slit light is included in this image. The present example has an advantage of being extremely simple to process, but it may falsely detect a high-brightness noise or a reflection of environment light (ambient light).

In some other aspect examples, the selecting processor 821 generates a brightness histogram based on an image and then determines whether or not there are a predetermined number or more of pixels having brightness equal to or greater than a predetermined threshold value. If the selecting processor 821 determines that the number of pixels having brightness equal to or greater than the predetermined threshold value is equal to or greater than the predetermined number, it is determined that a reflected image of the slit light is included in this image. The present example has an advantage that the above false detection can be prevented by simple processes as described above.

A description will be given of image selection with the eye movement condition taken into account. Note that the eye movement condition is a condition for checking whether or not an image to be assessed has been affected by eye movement. For an image included in the two or more image groups, the selecting processor 821 performs determination whether or not eye movement has affected this image by comparing this image with an image adjacent thereto, for example. This determination is data processing carried out on the basis of a fact that eye movement during moving image photography causes "skipping (lack, omission) of an image".

In some aspect examples, the selecting processor 821 detects a landmark from each of this image and the adjacent image, calculates the amounts of positional shifts (displacements, positional differences, positional deviations) of the detected landmarks, and determines whether or not each of the positional shift amounts calculated is equal to or greater than a predetermined threshold value. If the selecting processor 821 determines that the positional shift amount(s) is equal to or greater than the predetermined threshold value, it is determined that eye movement has occurred. Here, the landmark may be, for example, a cornea, an iris, a pupil, a corner angle, or the like. The threshold value may be calculated based on a predetermined scanning condition such as the photographing rate of the photography system 3, the movement speed of the photography system 3 carried out by the movement mechanism 6, or the like.

In some other aspect examples, the selecting processor 821 may be configured to determine the presence or absence of eye movement from a single image. For example, when the photographing rate of the photography system 3 is low and high-speed eye movement occurs, "blurring" may occur in an image obtained. The selecting processor 821 may be configured to determine the presence or absence of eye movement by using a blur detection technique. The blur detection of some typical examples is performed by using any known techniques such as edge detection.

As in the case of the image group assessing processor 81, the selecting processor 821 may include an artificial intelligence engine configured to determine whether or not an input image satisfies the image selection condition described above.

The series of images included in the image set formed by the image set forming processor 82 may be associated with a plurality of positions (a plurality of locations) in the scan area. For example, the selecting processor 821 may be configured to perform selection of images in such a manner as to assign one or more images to each of the plurality of positions in the scan area.

A specific example will be explained. As mentioned above, the scan area along the X direction is divided into N−1 number of sections (intervals), the scan start position is determined at the first position, and the scan end position is determined at the N-th position. Here, N is an integer equal to or greater than 2. As a result, N number of positions are determined in the scan area. The N number of positions are represented by B1, B2, B3, . . . , BN.

It is now considered a case in which a result of application of two or more times of scans to the anterior segment of the subject's eye E has generated the image groups F1, F2, F3, . . . , FN shown in FIG. 3. Note that in the description given above, the N number of images F1 to FN shown in FIG. 3 forms an image group obtained by a single scan. However, in the present document for the sake of simplicity of description, the N number of images F1 to FN shown in FIG. 3 may sometimes be treated as (used as) any image group (any plurality of images) to be considered. For example, in the description of the present example, the N number of images F1 to FN are treated as a series of images included in an image set.

For the N number of positions B1 to BN and the N number of images F1 to FN, the selecting processor 821 may assign the image Fn to the position Bn. As a result of this, the N number of images Fn (n=1, 2, . . . , N) respectively corresponding to the N number of positions Bn (n=1, 2, . . . , N) can be obtained, and then an image set can be formed with the image group Fn as "a series of images", for example.

In some aspect examples, if the image group assessing processor 81 has determined that the quality of an image group obtained by the first scan is not satisfactory, the second scan is then performed automatically or upon an instruction given by the user. If the number of scans applied to the anterior segment is two or more, the slit lamp microscope 1 performs an operation of applying the two or more times of scans to the anterior segment and an operation of selecting a series of images from two or more image groups collected by the two or more times of scans. Here, a way how to perform these operations (execution modes of these operations) may be freely selected or determined. In the first example thereof, the slit lamp microscope 1 may be configured to alternately execute (to execute by turns) application of a scan to the anterior eye segment and selection of an image from an image group acquired by this scan, in response to acquisition of an assessment result showing the quality of an image group obtained by the first scan is not satisfactory. In the second example, the slit lamp microscope 1 may be configured to perform two or more times of scans in a row and then select a series of images from two or more image groups collected by the two or more times of scans, in response to acquisition of an assessment result showing the quality of an image group obtained by the first scan is not satisfactory. These two examples will be described below. It should be noted that in place of or in addition to selection of an image from an image group(s), the image group assessing processor 81 may execute an assessment of an image group. As mentioned above, an image group assessment and image selection may be the same, similar, or interchangeable processes. In some aspect examples, any matters and items in a description of an image group assessment may be applied to image selection, and conversely, any matters and items in a description of image selection may be applied to an image group assessment.

The first example of the aspect (mode) of the scan application and the image selection performed after the image group assessing processor 81 has assessed that the quality of an image group obtained by the first scan is not satisfactory, is the alternate execution of the scan application and the image selection. More specifically, the first example is operated to repeat, a predetermined number of times, the pair of the application of a scan to the anterior eye segment and the selection of an image from an image group acquired by this scan, for example. In other words, the first example is operated to execute the U number of pairs of operations (here, U is an integer equal to or greater than 1) in the order of the first pair of operations (the scan application and the image selection), the second pair of operations (the scan application and the image selection), . . . , and the U-th pair of operations (the scan application and the image selection). Further, the pair of the first scan performed before this alternate execution and the quality assessment of the image group obtained by the first scan (by the image group assessing processor 81) will be referred to as the 0-th pair of operation.

Here, the number of scans in the u-th pair may be any number of times equal to or greater than 1 (u=0, 1, . . . , U). Further, the number of scans in the $u_1$-th pair and the number of scans in the $u_2$-th pair may be equal to or different from each other (here, $u_1$=0, 1, . . . , U; $u_2$=0, 1, . . . , U; $u_1 \neq u_2$).

In the first example, the selecting processor 821 may be configured to form a tentative image set (provisional image set, temporary image set, interim image set) by selecting two or more images from two or more image groups collected by two or more times of scans already performed. In other words, the slit lamp microscope 1 may be configured to form, at any point of time during the alternate execution of the scan application and the image selection, a tentative image set from two or more image groups obtained by two or more times of scans that have been performed up to this point of time. For example, the selecting processor 821 may be configured to form a tentative image set from all images obtained by the 0-th to the u-th pairs after the scan in the u-th pair has been performed. With such a configuration, the slit lamp microscope 1 is capable of forming a tentative image set from two or more image groups obtained up to the present point of time for the purpose of constructing a final image set.

In the case where the configuration described above is employed for forming a tentative image set, the following configuration may be combined with the configuration described above. Immediately after another scan is applied to the anterior segment of the subject's eye E, the selecting processor 821 first selects one or more images from another image group collected by this another scan. Subsequently, the selecting processor 821 forms another tentative image set (new tentative image set) by adding the one or more images selected from this another image group to a tentative image set that has been formed based on one or more scans performed prior to this another scan. For example, after the scan in the (u+1)-th pair have been performed, the selecting processor 821 may first select one or more images from an image group obtained by the (u+1)-th pair. Further, the selecting processor 821 may form another tentative image set by adding the one or more image selected from the image group obtained in the (u+1)-th pair to a tentative image set formed based on the image group(s) obtained by the 0-th to the u-th pairs. With such a configuration, each time a scan is applied to the anterior segment, the selecting processor 821 can sequentially update a tentative image set based on an image group obtained by this scan. This makes it possible to construct a final image set reliably and efficiently.

In the case where the configuration described above is employed for forming (and updating) a tentative image set, the following configuration may be combined with the configuration described above. The controller 7 (or the image set forming processor 82 (the selecting processor 821)) includes an image number counter configured to count the number of images included in a tentative image set. The controller 7 controls the scanner (the illumination system 2, the photography system 3, the movement mechanism 6) and the selecting processor 821 to terminate the alternate execution of the scan application and the image selection when the number of images included in the tentative image set reaches a predetermined number. Here, the predetermined number is the number of a series of images included in a final image set, and may be determined in advance or from a status of processing. Further, the controller 7 makes determination as to whether or not the number of images included in the tentative image set has reached the predetermined number. This determination may include only a process of comparing the number of images. Alternatively, in the case where a plurality of positions in the scan area and a series of images are associated with each other (described above), the controller 7 may determine whether or not a corresponding image has been assigned to every one of the plurality of positions. With such a configuration, the alternate execution of the scan application and the image selection can be automatically terminated upon obtaining the required number of images for a final image set.

In the case where the configuration described above is employed for forming (and updating) a tentative image set, the following configuration can be further combined with the configuration described above. The controller 7 includes a repetition counter configured to count the number of (times of) repetitions of the alternate execution of the scan application and the image selection. The repetition counter may be configured to count the number of the repetitions of the alternate execution by counting the number of repetition of the pair of the scan application and the image selection (the first pair to the U-th pair), or by counting the number of repetition of the scan application. The controller 7 controls the scanner (the illumination system 2, the photography system 3, the movement mechanism 6) and the selecting processor 821 to terminate the alternate execution of the scan application and the image selection when the number of the repetitions in the alternate execution reaches a predetermined number. In the case where the number of the repetitions is defined in units of the pair of the scan application and the image selection, the predetermined number is equal to the total number (U+1) of the pairs determined in advance. In the case where the number of the repetitions is defined in units of the number of the scan application, the predetermined number is equal to the total number of the scan application determined in advance. Further, the controller 7 makes determination as to whether or not the number of the repetitions has reached the predetermined number. With such a configuration, the scan application and the image selection can be automatically terminated at the stage where the scan application and the image selection have been repeated the number of times determined in advance. In the case where such a configuration is not employed, the scan application and the image selection are repeated until the number of images required to construct a final image set are selected, which causes fatigue to the subject and reduces photographing efficiency. In particular, when photographing a plurality of subjects in sequence, the throughput of the photographing is greatly impaired.

As described above, the present aspect example may be configured to automatically terminate the alternate execution of the scan application and the image selection. Possible conditions for such automatic termination are not limited to the two examples described above. For example, a condition for automatic termination may be an instruction input from a user. An alternative example may be configured to measure the elapsed time from the start of the alternate execution of the scan application and the image selection and terminate the alternate execution when the measured elapsed time reaches a predetermined time. Note that in the case where the repetition rate of the scan application and the image selection is constant, the automatic termination control based on the elapsed time is equivalent to the automatic termination control based on the number of the repetitions described above. The image set forming processor 82 may form an image set based on a tentative image set that has been saved at the point of time of termination of the alternate execution of the scan application and the image selection. The tentative image set is included in the image set, for example, as a series of images corresponding to the scan area. Predetermined subject information such as subject ID, official ID, name, age, gender, etc. is separately input into the slit lamp microscope 1. The image set forming processor 82 may be configured to form an image set by generating a supplementary information of a series of images including such subject information, subject's eye information (e.g., information indicating left eye/right eye), date and time of photography, photography conditions, etc. Further, the image set may also include other images obtained with the slit lamp microscope 1, images obtained with other modalities, examination data acquired with examination apparatuses, or the like. This concludes the description of the first example of the execution mode of the scan application and the image selection.

Next, the second example of the aspect (mode) of the scan application and the image selection performed after the image group assessing processor 81 has assessed that the quality of an image group obtained by the first scan is not satisfactory will be described. In the present example, the slit lamp microscope 1 is configured to perform two or more times of scans in a row and then select a series of images from two or more image groups collected by the two or more times of scans. Then, an image is selected from the two or more image groups collected by the two or more times of scans and the image group obtained by the first scan performed prior to the two or more times of scans, and an image set that includes a series of images selected in this way is formed.

A specific example of such an operation will be described. To begin with, the selecting processor 821 generates an association (correspondence, relationship) between an image group corresponding to each scan and a plurality of positions in the scan area (described above). With this association, two or more images corresponding to different scans are assigned to each of the plurality of positions in the scan area.

Subsequently, for each position of the plurality of positions in the scan area, the selecting processor 821 selects one image from the two or more images that have been assigned to this position. The image selection condition employed in the present example may be, for example, the blinking condition and the eye movement condition described above. With this, one image is assigned to each of the plurality of positions in the scan area. A plurality of images respectively associated with the plurality of positions in this way is used as a series of images included in an image set. This concludes the description of the second example of the execution mode of the scan application and the image selection.

The fourth example of the image group processing processor 80 will be described. As in the second and third examples, the effectiveness of the present example is particularly demonstrated in the case where two or more times of scans are applied to the subject's eye E. The image group assessing processor 80D shown in FIG. 4D includes the image set assessing processor 83 in addition to the image group assessing processor 81, which is the same as or similar to that of FIG. 4A, and the image set forming processor 82, which is the same as or similar to that of FIG. 4B or FIG. 4C.

The image set assessing processor 83 is configured to execute an assessment of a quality of an image set formed by the image set forming processor 82. This quality assessment is a process of determining whether or not an image set has sufficient quality to effectively conduct diagnosis (image interpretation), and an assessment item and an assessment criterion are determined from this viewpoint. The assessment item and the assessment criterion may be common to one or more of the above-described image group assessment conditions and/or one or more of the above-described image selection conditions; however, the assessment item and the assessment criterion are not limited thereto.

The image set assessing processor 83 may be configured to execute different assessment processes depending on the types (aspects, modes) of image sets. For example, an assessment process applied to an image set formed in the case where the number of images included in a tentative image set has reached a predetermined number and an assessment process applied to an image set formed in the case where the number of the repetitions in the alternate execution of the scan application and the image selection has reached a predetermined number, may be different from each other. Note that the same assessment process may be applied regardless of the types of image sets.

Examples of an image set quality assessment include, in addition to an assessment of the quality of each image (which may be the same as or similar to an assessment of an image group), an assessment of an "arrangement order" of a series of images, an assessment of "skipping (lack, omission) of an image", and an assessment of "misalignment". Defects in an image set, such as disorder in the arrangement order, skipping (lack, omission) of an image, misalignment, etc., are caused by eye movement, fixation shift (fixation deviation), or the like.

The assessment of the arrangement order of a series of images will be described. In some aspect examples, the above-mentioned correspondence (one-to-one correspondence) between a series of images and a plurality of positions in a scan area is determined and prepared in advance. The image set assessing processor 83 may execute an arrangement order assessment using this correspondence.

Here, the plurality of positions in the scan area is ordered in accordance with their positional relationships in the real space. An example will be described now. As described above, the scan area along the X direction is divided into the N−1 number of sections, and the N number of positions B1, B2, B3, . . . , BN are set in order from the scan start position to the scan end position. In other words, the N number of positions B1 to BN are ordered in accordance with their positional relationships in the real space. In addition, a one-to-one correspondence is given between the N number of images F1 to FN (a series of images) and the N number of positions B1 to BN.

Under such conditions, the image set assessing processor 83 arranges the N number of images F1 to FN in accordance with the arrangement order (relative positional relationships) of the N number of positions B1 to BN, for example. This arrangement processing may be implemented by, for example, determining the coordinates of the N number of positions B1 to BN in a given three dimensional coordinate system, and arranging (embedding) the N number of images F1 to FN in the three dimensional coordinate system in accordance with the N number of coordinates determined. More specifically, the image set assessing processor 83 of some aspect examples may be configured to extract the slit light projected regions A1 to AN from the N number of images F1 to FN, respectively. Here, the slit light projected regions A1 to AN are two dimensional cross sectional images. The image set assessing processor 83 of the aspect examples further determines the coordinates of the N number of positions B1 to BN in the three dimensional coordinate system, and then executes a process of embedding the N number of two dimensional cross sectional images A1 to AN into the three dimensional coordinate system in accordance with the N number of coordinates determined.

The image set assessing processor 83 may be configured to analyze the images F1 to FN (the two dimensional cross sectional images A1 to AN) embedded in the three dimensional coordinate system to execute an assessment of whether or not their arrangement order is appropriate. In some aspect examples, the image set assessing processor 83 may be configured to detect a region of interest from the images F1 to FN (the two dimensional cross sectional images A1 to AN) and execute an assessment based on the morphology (e.g., connectivity (connectedness), continuity, etc.) of the region of interest in the arrangement direction of the images F1 to FN (the two dimensional cross sectional images A1 to AN). Here, the arrangement direction of the images F1 to FN is the X direction in the present example, and the region of interest is an image region corresponding to a site of interest such as the anterior surface of the cornea, the posterior surface of the cornea, the iris, the pupil, the anterior surface of the crystalline lens, the posterior surface of the crystalline lens, the corner angle, or the like. For example, if there exists a gap of the size equal to or larger than a predetermined size in the region of interest, the arrangement order is determined to be inappropriate, or it is determined that there is a change (replacement, swapping) in the arrangement order.

In some other aspect examples, the image set assessing processor 83 may be configured to construct a cross sectional image along the X direction, from the images F1 to FN (the two dimensional cross sectional images A1 to AN) embedded in the three dimensional coordinate system. In addition, the image set assessing processor 83 may be configured to execute an assessment based on the morphology (e.g., connectivity, continuity, etc.) of this cross sectional image constructed.

The assessment of skipping (lack, omission) of an image and the assessment of misalignment may be executed in the same manner as the arrangement order assessment described above.

As with the image group assessing processor 81 and the selecting processor 821, the image set assessing processor 83 may include an artificial intelligence engine configured to execute an assessment whether or not an input image set has sufficient quality for effective diagnosis.

The controller 7 may be configured to execute a control of the communication device 9 to transmit an image set when the image set assessing processor 83 assesses that the quality of this image set is satisfactory. For example, the controller 7 prepares transmission information including such an image set, and then controls the communication device 9 to transmit this transmission information to a predesignated external device.

Possible modes or aspects of outputting an image set (and other information) from the slit lamp microscope 1 are not limited to transmission. Examples of output modes other than transmitting include storing in a storage (e.g., database), recording on a recording medium, printing on a printing medium, and so forth.

The controller 7 may be configured to execute a control for applying another scan to the subject's eye E when the image set assessing processor 83 assesses that the quality of the image set is not satisfactory. In other words, the controller 7 may be configured to execute a control to acquire another image group (another image set) when the image set assessing processor 83 assesses that the quality of the image set is not satisfactory. For example, the controller 7 may be configured to display predetermined output information and/or perform audio (voice) output of predetermined output information. The predetermined output information may include contents for prompting or suggesting the user to conduct re-photographing (another photographing), for example, contents indicating that the performed photography (acquisition, image acquisition) was unsuccessful, or that re-photographing is necessary.

In some other aspect examples, the controller 7 may be configured to send a command to at least the scanner (the illumination system 2, the photography system 3, the movement mechanism 6) and the image set forming processor 82 in order to automatically start re-photographing (re-execution of scan application and image set formation) when the image set assessing processor 83 assesses that the quality of the image set is not satisfactory.

Below, several examples of the image group assessing processor 81 are described with reference to FIG. 5A to FIG. 5D. Note that the image group assessing processor 81 is not limited to these examples, and any modifications, such as additions, replacements, and/or omissions, are possible. In addition, any two or more of these examples and modifications may be combined at least in part.

Figure 5A:
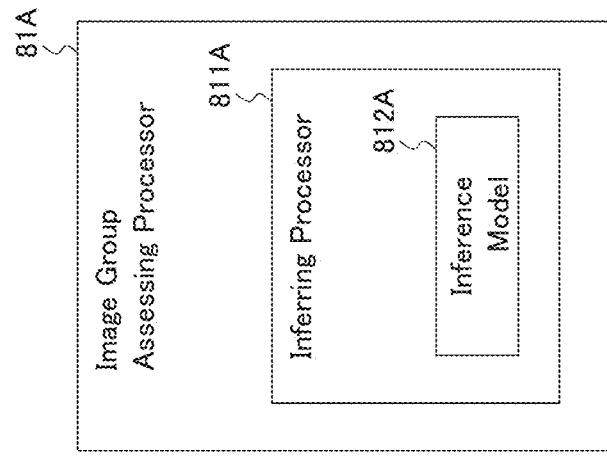
FIG. 5A is a schematic diagram illustrating a configuration of a slit lamp microscope according to an aspect example.

The first example of the image group assessing processor 81 will be described with reference to FIG. 5A and FIG. 5B. The present example utilizes artificial intelligence technology to execute a quality assessment of an image group. The image group assessing processor 81A shown in FIG. 5A includes the inferring processor 811A configured to execute a quality assessment of an image group using the inference model 812A.

The inference model 812A is constructed in advance by using machine learning with training data including a plurality of anterior segment images. The device for constructing the inference model 812A (inference model construction device) may be disposed in the slit lamp microscope 1 (the data processor 8, etc.), or in a peripheral device (a peripheral computer or the like) of the slit lamp microscope 1. Alternatively, the inference model construction device may be a computer other than the peripheral computer.

Figure 5B:
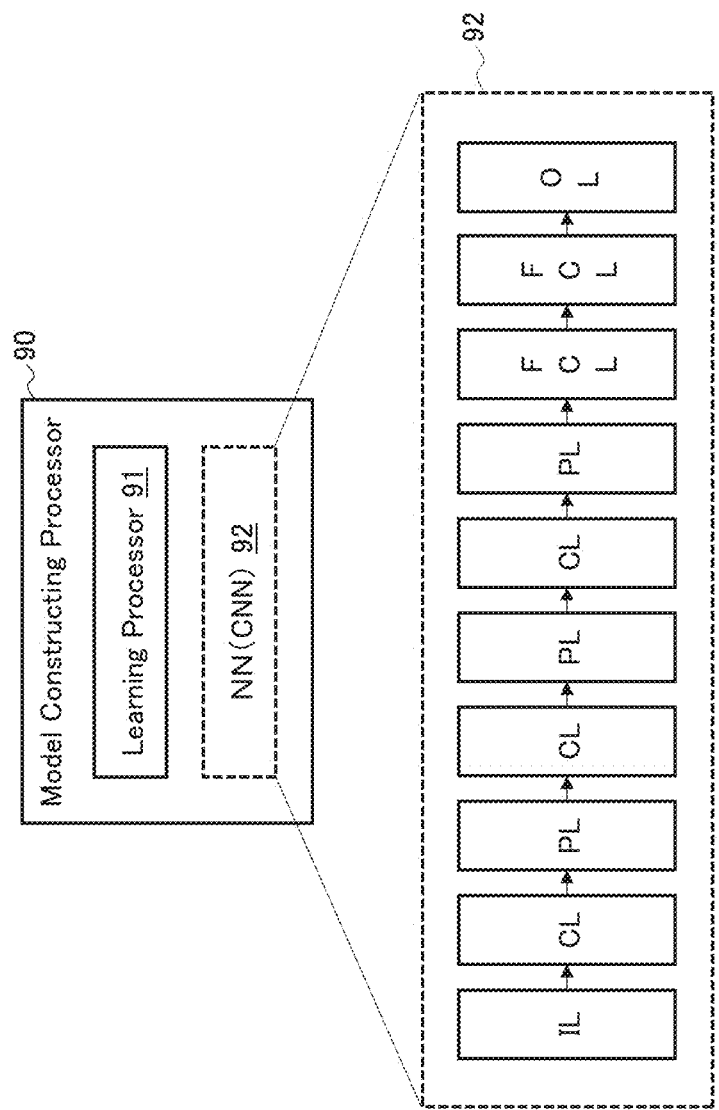
FIG. 5B is a schematic diagram for describing construction of an inference model for a slit lamp microscope according to an aspect example.

The model constructing processor 90 shown in FIG. 5B is an example of the inference model construction device, and is provided in the slit lamp microscope 1 or in its peripheral device. The model constructing processor 90 includes the learning processor 91 and the neural network 92.

In some typical examples, the neural network 92 includes a convolutional neural network (CNN). FIG. 5B shows an example of the structure of this convolutional neural network.

An image is input into the input layer of the neural network 92. Behind the input layer, a plurality of pairs of a convolutional layer and a pooling layer is disposed. While three pieces of pairs of a convolution layer and a pooling layer are provided in the neural network 92 shown in FIG. 5B, the number of the pairs may be freely selected or determined.

In the convolutional layer, a convolution operation is performed to detect or extract a feature (e.g., contour) from the input image. This convolution operation is a multiply-accumulate operation (a multiply-add operation, a product-sum operation) on the input image. This multiply-accumulate operation is performed with a filter function (a weight coefficient, a filter kernel) having the same dimension as the input image. In the convolutional layer, the convolution operation is applied to individual parts (individual sections, individual portions) of the input image. More specifically, the convolutional layer is configured to calculate a product by multiplying the value of each pixel in a partial image, to which the filter function has been applied, by the value (weight) of the filter function corresponding to this pixel, and then calculate the sum of the products over a plurality of pixels in this partial image. The sum of products obtained in this way is substituted for the corresponding pixel in an image to be output from the convolutional layer. By repetitively performing such multiply-accumulate operation in parallel with moving sites (parts) to which the filter function is applied (that is, in parallel with changing or switching partial images of the input image), a result of the convolution operation for the entire input image is obtained. The convolution operation performed in this way gives a large number of images in which various features have been extracted using a large number of weight coefficients. This means that a large number of filtered images, such as smoothed images and edge images, are obtained. The large number of images generated by the convolutional layer are referred to as feature maps (or activation maps).

The pooling layer executes data compression (e.g., data thinning) of the feature maps generated by the convolutional layer disposed at the immediately preceding position. More specifically, the pooling layer calculates statistical values in predetermined neighboring pixels of a predetermined pixel of interest in an input feature map at each predetermined pixel intervals, and outputs an image having a size smaller than the input feature map. The statistical values applied to the pooling operation may be maximum values (max pooling) or average values (average pooling), for example. The value of the pixel intervals applied to the pooling operation is referred to as a stride.

In general, a convolutional neural network extracts many features from an input image by executing processing using a plurality of pairs of a convolutional layer and a pooling layer.

A fully connected layer is disposed behind the most downstream pair of a convolutional layer and a pooling layer. While two pieces of fully connected layers are provided in the example shown in FIG. 5B, the number of fully connected layers may be freely selected or determined. The fully connected layer executes processing such as image classification, image segmentation, or regression using the features compressed by the combination of convolution and pooling. An output layer is disposed behind the most downstream fully connected layer. The output layer gives an output result.

Some aspect examples may employ a convolutional neural network including no fully connected layer. For example, some aspect examples may employ a fully convolutional network (FCN). Some aspect examples may include a support vector machine, a recurrent neural network (RNN), or any other models. Further, machine learning applied to the neural network 92 may be transfer learning. In other words, the neural network 92 may include a neural network that has already been trained using other training data (training images) and whose parameters have been adjusted (tuned). Further, the model constructing processor 90 (the learning processor 91) may be configured in such a manner that fine tuning can be applied to a trained neural network (at least part of the neural network 92). The neural network 92 may be constructed, for example, using a known open source neural network architecture.

The learning processor 91 applies machine learning with training data to the neural network 92. In the case in which the neural network 92 includes a convolutional neural network, parameters tuned by the learning processor 91 include, for example, filter coefficients of one or more convolutional layers therein and connection weights and offsets of one or more fully connected layers therein.

The training data of the present example at least includes a plurality of anterior segment images, as described above. The plurality of anterior segment images in some typical examples is images acquired by a slit lamp microscope but is not limited thereto. In some examples, the plurality of anterior segment images may include any of the following images: an image acquired using other kinds of ophthalmic modalities (e.g., fundus camera, OCT apparatus, SLO, surgical microscope); an image acquired using any kinds of diagnostic imaging modalities of any clinical departments other than ophthalmology (e.g., ultrasonic diagnostic apparatus, X-ray diagnostic apparatus, X-ray computed tomography (CT) apparatus, magnetic resonance imaging (MRI) apparatus); an image generated by processing an actual image (image acquired from a living body); and a pseudo image. Further, the number of pieces of training data may be increased by using any technique such as data augmentation.

The method and technique of training employed for constructing the inference model may be freely selected from among any known method and technique, or may be freely designed based on any known method and technique. In some examples, the method and technique of the training may be any of supervised learning, unsupervised learning, and reinforcement learning. In some alternative examples, the method and technique of the training may be any combination of any two or more of supervised learning, unsupervised learning, and reinforcement learning.

In some aspect examples, supervised learning is conducted on the basis of training data in which a label as a final output is assigned to each input image. For example, to each of a plurality of anterior segment images included in the training data, a label is attached in advance, representing whether or not image interpretation of the corresponding image is possible. Labels may be generated by, for example, a doctor or other inference models. The learning processor 91 of the present example may be configured to construct the inference model 812A by applying supervised learning using such training data to the neural network 92.

The inference model 812A of the present example constructed in this way is a trained model (learned model) configured to receive an input of an image obtained by scanning the anterior segment with slit light, and to generate an output of a possibility of image interpretation. Note that a possibility of image interpretation, which is an output of the inference model 812A, may be a freely selected or determined type of parameter that shows whether or not an image group to be assessed is suitable for image interpretation. In some examples, a possibility of image interpretation may include any of the following options: a result of a determination (judgment) of whether image interpretation is possible or impossible; a probability of image interpretation being able to be conducted; a validity (e.g., accuracy, precision) of a result obtained by conducting image interpretation, and so forth.

In order to prevent the overconcentration of processes in a specific unit of the neural network 92, the learning processor 91 may randomly select and invalidate one or more units and execute learning using the remaining units. Such a function is referred to as dropout.

The methods and techniques used for inference model creation are not limited to the examples shown above. In some examples, any methods and techniques such as the following options may be employed for creating an inference model: support vector machine, Bayes classifier, boosting, k-means clustering, kernel density estimation, principal component analysis, independent component analysis, self-organizing map (or self-organizing feature map), random forest (or randomized trees, random decision forests), and generative adversarial network (GAN).

Using the inference model 812A as described above, the inferring processor 811A shown in FIG. 5A executes an assessment of a quality of an image group collected by a single scan of the anterior segment of the subject's eye E. More specifically, first, the inferring processor 811A inputs an image group or each image included in the image group into the inference model 812A. In response to this input, the inference model 812A derives information representing image interpretation possibility from the image group or the corresponding image included in the image group.

The inferring processor 811A may use the interpretation possibility information output from the inference model 812A as it is as an inference result, or may generate an inference result on the basis of the interpretation possibility information. As an example of the latter, the inferring processor 811A may generate information for display from the interpretation possibility information, or may execute predetermined statistical processing.

Figure 5C:
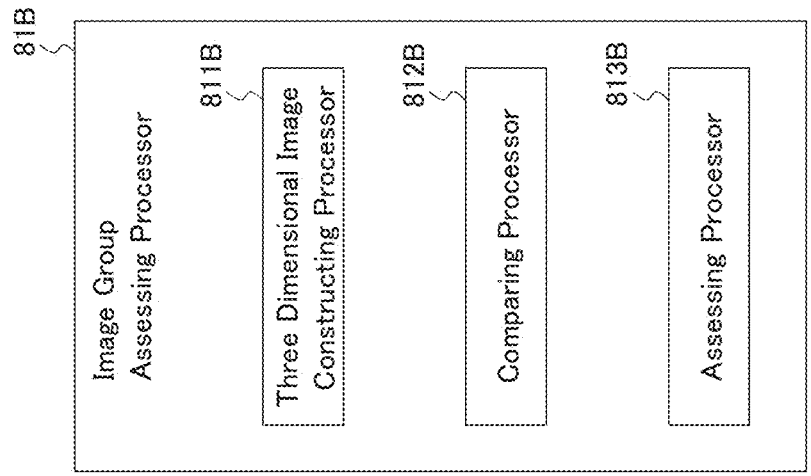
FIG. 5C is a schematic diagram illustrating a configuration of a slit lamp microscope according to an aspect example.

The second example of the image group assessing processor 81 will be described with reference to FIG. 5C. The present example transforms an image group into a three dimensional image and then executes a quality assessment. The image group assessing processor 81B shown in FIG. 5C includes the three dimensional image constructing processor 811B, the comparing processor 812B, and the assessing processor 813B.

The three dimensional image constructing processor 811B is configured to execute construction of a three dimensional image from an image group collected by a single scan of the anterior segment of the subject's eye E. For example, the three dimensional image constructing processor 811B may be configured to construct stack data by embedding an image group in a single three dimensional coordinate system. This stack data is constructed, for example, by embedding the N number of two dimensional cross sectional images A1 to AN shown in FIG. 3 into a three dimensional coordinate system in accordance with the arrangement (relative positional relationships) of the N number of positions B1 to BN mentioned above.

The three dimensional image constructing processor 811B may be configured to apply a voxelization process to stack data constructed from an image group to construct volume data. In addition, the three dimensional image constructing processor 811B may apply a predetermined rendering process to stack data or volume data. Examples of the rendering process include volume rendering and surface rendering.

The comparing processor 812B is configured to execute a comparison between the three dimensional image (stack data, volume data, rendered image, etc.) constructed by the three dimensional image constructing processor 811B and a predetermined reference three dimensional image. The number of prepared reference three dimensional images is one or more and freely selected or determined.

The reference three dimensional image may include one or more reference three dimensional images corresponding to normal eyes. A reference three dimensional image corresponding to a normal eye may be, for example, an image acquired by performing photography of the normal eye which is an eye with no disease diagnosed and is also referred to as a healthy eye. An imaging modality employed for acquiring this reference three dimensional image may be freely selected or determined. In some typical examples, the imaging modality is the slit lamp microscope 1 or a slit lamp microscope having the same or similar configuration as or to the slit lamp microscope 1. In addition, the reference three dimensional image corresponding to a normal eye may be either of the following images: an image acquired by performing photography of a model of a normal eye (such as an eye model); or an image generated by computer graphics based on a model of a normal eye or a clinical example.

The reference three dimensional image may include one or more reference three dimensional images corresponding to an eye with a disease (affected eye). A reference three dimensional image corresponding to an eye with a disease may be, for example, an image acquired by performing photography of an eye in which a definitive diagnosis of a specific disease has been made. While an imaging modality for acquiring such a reference three dimensional image may be freely selected or determined, a typical example of the imaging modality is the slit lamp microscope 1 or a slit lamp microscope having the same or similar configuration as or to the slit lamp microscope 1. In addition, a reference three dimensional image corresponding to an eye with a disease may be either of the following options: an image acquired by performing photography of a model of an eye with a disease (such as an eye model); or an image generated by computer graphics based on a model of an eye with a disease or a clinical example.

The comparing processor 812B is configured to execute image matching between the three dimensional image constructed by the three dimensional image constructing processor 811B and the reference three dimensional image, thereby calculating a value of a predetermined parameter. This image matching may use any method or technique such as an image correlation, feature-based matching, area-based matching, machine learning (learned model), and so forth. The parameter to be calculated may be any kind of parameter such as a correlation value, a matching parameter (e.g., angle, scale, similarity, degree of congruity (degree of agreement), etc.), an output parameter of a trained model, and so forth.

Such image matching is typically a process of generating a quantitative representation (i.e., representation by a numerical value) of a degree (extent) to which a feature (e.g., the shape and/or structure) of a tissue and/or site depicted in a three dimensional image is similar to a feature (e.g., the shape and/or structure) of a standard normal eye and/or to a feature (e.g., the shape and/or structure) of a standard eye with a disease. Here, the tissue or the site may be any of a cornea, an iris, a pupil, a corner angle, and other parts of an eye.

The assessing processor 813B is configured to execute the assessment of the quality of the corresponding image group based on the parameter value calculated by the comparing processor 812B. For example, the assessing processor 813B may be configured to execute the assessment of the quality of the corresponding image group by executing a comparison between the parameter value calculated by the comparing processor 812B and a predetermined threshold value. Alternatively, the assessing processor 813B may be configured to execute the assessment of the quality of the corresponding image group by determining whether or not the parameter value calculated by the comparing processor 812B falls within a predetermined range. Note that the method or technique used for processing executed by the assessing processor 813B is not limited to the above examples, and may be any method or technique that can be used to derive an assessment result from a value of a certain parameter.

The method or technique used for the quality assessment of an image group executed by using three dimensional image construction is not limited to the present example. In some examples, the image group assessing processor 81 may be configured to be capable of executing any one or more of the following assessment processing options in the same manner as the image set assessing processor 83: an assessment of the arrangement order of a series of images composing an image group; an assessment of skipping (lack, omission) of an image among a series of images composing an image group; and an assessment of misalignment between a series of images composing an image group.

Figure 5D:
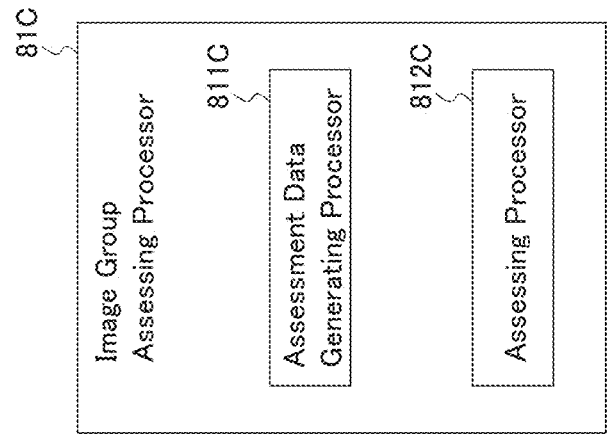
FIG. 5D is a schematic diagram illustrating a configuration of a slit lamp microscope according to an aspect example.

The third example of the image group assessing processor 81 will be described with reference to FIG. 5D. The present example executes a quality assessment by way of a quantitative assessment of an image quality of an image group. The image group assessing processor 81C shown in FIG. 5D includes the assessment data generating processor 811C and the assessing processor 812C.

The assessment data generating processor 811C is configured to execute generation of image quality assessment data from an image included in an image group collected by a single scan of the anterior segment of the subject's eye E. The image quality assessment data quantitatively represents the image quality of the image group.

Several examples of image quality assessment processing executed by the assessment data generating processor 811C will be described. In some aspect examples, the image quality assessment processing executed by the assessment data generating processor 811C may be a freely selected or determined kind of processing, and may be processing conducted by using any known technique or technology such as any of the following options: signal-to-noise ratio (SNR); contrast-to-noise ratio (CNR); root mean square (RMS) granularity; Wiener spectrum; modulation transfer function (MTF); and quality index (QI).

In some examples, the assessment data generating processor 811C calculates a value of a predetermined image quality assessment index (image quality assessment value) as image quality assessment data of an image group. An image quality assessment value may be a freely selected or determined kind of parameter that quantitatively represents a quality of an image. In some typical examples, the higher a quality of an image, the greater an image quality assessment value.

As an example of the method of calculating an image quality assessment value, a description will be given below of a method of calculating an image quality value (IQ value) used for assessing an image quality of an OCT image. To begin with, the assessment data generating processor 811C applies a predetermined analysis process (e.g., segmentation) to an assessment region determined in an image to be assessed. With this analysis process, the assessment data generating processor 811C detects an image region corresponding to a tissue (site) of the anterior segment (referred to as a tissue image region) and an image region other than the tissue image region (referred to as a background region or non-tissue image region). The assessment data generating processor 811C then generates a histogram of brightness based on the tissue image region and a histogram of brightness based on the background region. Subsequently, the assessment data generating processor 811C calculates an image quality assessment value (IQ value) based on the degree of overlap between these two histograms. For example, the range of the IQ value is defined to be [0, 100] such that the IQ value=0 when the two histograms are completely overlapping with each other and the IQ value=100 when the two histograms are completely separated from each other. This image quality assessment calculation of some examples may include normalization of two histograms, generation of a probability distribution function, calculation of an IQ value using a predetermined arithmetic expression, and so forth.

As described thus far, the assessment data generating processor 811C may be configured to execute the following processes: the process of identifying a tissue image region in an image to be assessed corresponding to a tissue of an anterior segment and identifying a background region; the process of generating the first histogram showing a frequency distribution of brightness (brightness frequency distribution) in the tissue image region; the process of generating the second histogram showing a brightness frequency distribution in the background region; and the process of calculating the image quality assessment value (IQ value), which is used as an image quality assessment data, based on the first histogram and the second histogram.

The assessment processor 812C is configured to execute an assessment of a quality of the image group based on the image quality assessment data generated by the assessment data generating processor 811C. While several methods and techniques for a quality assessment conducted based on image quality assessment data will be described below, quality assessment methods and techniques are not limited to these examples and may be freely selected from known methods and techniques.

A description is given of the first example of the quality assessment executed based on image quality assessment data. In the case where an IQ value is obtained for each image included in an image group, the assessing processor 812C executes a comparison between each of the plurality of IQ values obtained for this image group and a predetermined threshold value. If all of the plurality of IQ values are equal to or greater than the threshold value, the assessing processor 812C determines that the quality of the image group is satisfactory. On the other hand, if any one or more of the plurality of IQ values are less than the threshold value, the assessing processor 812C determines that the quality of the image group is not satisfactory.

A description is given of the second example of the quality assessment executed based on image quality assessment data. In the case where an IQ value is obtained for each image included in an image group, the assessing processor 812C executes selection of the lowest IQ value from among the plurality of IQ values obtained for this image group, and executes a comparison between this selected lowest IQ value and a predetermined threshold value. If the lowest IQ value is equal to or greater than the threshold value, the assessing processor 812C determines that the quality of the image group is satisfactory. On the other hand, if the lowest IQ value is less than the threshold value, the assessing processor 812C determines that the quality of the image group is not satisfactory.

A description is given of the third example of the quality assessment executed based on image quality assessment data. In the case where an IQ value is obtained for each image included in an image group, the assessing processor 812C executes application of a predetermined statistical calculation to the plurality of IQ values obtained for this image group, thereby calculating a statistical value. The type of this statistical value may be freely selected or determined, and may be, for example, any of the following options: a mean value (average value), minimum value, maximum value, mode, and median value. Note that the case where a minimum value is used as the statistical value corresponds to the second example described above. The assessing processor 812C executes a comparison between the calculated statistical value and a predetermined threshold value. If the statistical value is equal to or greater than the threshold value, the assessing processor 812C determines that the quality of the image group is satisfactory. On the other hand, if the statistical value is less than the threshold value, the assessing processor 812C determines that the quality of the image group is not satisfactory.

The processing executed by the assessing processor 812C is not limited to processing on the basis of image quality assessment data generated by the assessment data generating processor 811C. In some examples, the assessing processor 812C may be configured to be capable of executing any one or more of the following options of assessment processing (all of which are described above): an assessment of the arrangement order of a series of images composing an image group; an assessment of skipping (lack, omission) of an image among a series of images composing an image group; and an assessment of misalignment between a series of images composing an image group.

<Processed Image Constructing Processor 85>

The processed image constructing processor 85 is configured to construct a processed image from an image group collected by performing a scan on the anterior eye segment using slit light. At least one image included in the image group is used to construct a processed image. The processed image construction may include freely selected or designed image processing. While some examples thereof are described below, processing included in the processed image construction is not limited to these examples.

The processed image constructing processor 85 of some aspect examples may be configured to be capable of executing three dimensional image construction that is processing of constructing a three dimensional image from an image group. A three dimensional image constructed from an image group may be, for example, stack data or volume data. The processed image constructing processor 85 of the present example may have the same or similar configuration as or to the three dimensional image constructing processor 811B described above. For example, a combination of hardware and software forming the processed image constructing processor 85 and a combination of hardware and software forming the three dimensional image constructing processor 811B may be common at least in part.

The processed image constructing processor 85 of some aspect examples may be configured to be capable of executing a rendering process of constructing a rendered image of a three dimensional image. The processed image constructing processor 85 may apply a predetermined rendering process to stack data or volume data obtained by three dimensional image construction, for example. Examples of the rendering process include volume rendering and surface rendering. The processed image constructing processor 85 of the present example may also have the same or similar configuration as or to the three dimensional image constructing processor 811B.

The processed image constructing processor 85 of some aspect examples may be configured to be capable of executing a process of identifying a partial area in an image (e.g., segmentation), a process of extracting the partial area identified (e.g., cropping, trimming), or the like processes. For example, the processed image constructing processor 85 may be configured to be capable of extracting a region of interest corresponding to a predetermined site of the subject's eye E from an image included in an image group, a three dimensional image, or a rendered image.

<Misalignment Information Acquiring Processor 86>

The misalignment information acquiring processor 86 is configured to operate after the execution of follow-up photography using the slit lamp microscope 1. Follow-up photography is performed with reference to an image of the anterior segment of the subject's eye E acquired in the past (this image is referred to as the first image of a reference image), and is performed in order to acquire a new image of the anterior segment of the subject's eye E (this new image is referred to as the second image or a follow-up image). The reference image and the follow-up image are stored in the memory 10.

The controller 7 reads out the reference image and the follow-up image from the memory 10 and sends these images to the misalignment information acquiring processor 86. The misalignment information acquiring processor 86 is configured to analyze the reference image referred to in follow-up photography and the follow-up image acquired in this follow-up photography, thereby acquiring misalignment information between the reference image and the follow-up image. The misalignment information represents, in a quantitative manner, the degree or extent of the deviation (misalignment, shift) of the position (area, region) of the anterior segment depicted in the follow-up image with respect to the position (area, region) of the anterior segment depicted in the reference image.

As misalignment information, the misalignment information acquiring processor 86 calculates, for example, both misalignment in translation (misalignment in parallel movement) and misalignment in rotational movement between the reference image and the follow-up image. The misalignment in translation includes, for example, information representing the amount of translation of the follow-up image with respect to the reference image within the XY coordinate system. The amount of translation is referred to as a translational positional shift. The misalignment in translation is not limited to this example, and may include any of translational positional shift information in the YZ coordinate system, translational positional shift information in the ZX coordinate system, and translational positional shift information in the XYZ coordinate system. Similarly, the misalignment in rotational movement includes, for example, information representing the amount of rotational movement of the follow-up image with respect to the reference image within the XY coordinate system centered on a predetermined position in the XY coordinate system. The amount of rotational movement is referred to as a rotational movement positional shift. The misalignment in rotational movement is not limited to this example, and may include any of rotational movement positional shift information in the YZ coordinate system, rotational movement positional shift information in the ZX coordinate system, and rotational movement positional shift information in the XYZ coordinate system. The misalignment in translation and the misalignment in rotational movement may be represented, for example, as an affine transformation between the coordinates of the reference image and the coordinates of the follow-up image. Note that the misalignment information acquiring processor 86 may be configured to calculate only either one of misalignment in translation and misalignment in rotational movement.

A description will be given of an example of a method for calculating misalignment in translation and misalignment in rotational movement. In some aspect examples, a reference image may include a first scan image acquired by applying a scan with slit light to the anterior segment of the subject's eye E. The first scan image is an image acquired in the past by the slit lamp microscope 1 or other apparatus. On the other hand, a follow-up image may include a second scan image acquired by follow-up photography using the first scan image as a reference. The misalignment information acquiring processor 86 may be configured to be capable of acquiring misalignment information based at least on the first scan image and the second scan image.

The follow-up image may include at least one image (at least one two dimensional cross sectional image) included in an image group collected in the follow-up photography (i.e., scanning of the anterior eye segment using slit light). If this is the case, the misalignment information acquiring processor 86 executes, for example, a process of identifying a region (a cross section, or a three dimensional region across two or more images) in the reference image that corresponds to the cross section represented by the two dimensional cross sectional image that is used as a follow-up image. In the case where the reference image includes an image group (or at least one image (two dimensional cross sectional image) included therein), the misalignment information acquiring processor 86 may identify a two dimensional cross sectional image in the image group (which is used as a reference image) that corresponds to the location of the cross section represented by the two dimensional cross sectional image which is used as a follow-up image. Here, the misalignment information acquiring processor 86 may select, from the image group as the reference image, a two dimensional cross sectional image corresponding to the cross section closest to the location of the cross section of the two dimensional cross sectional image that is used as a follow-up image. Alternatively, the misalignment information acquiring processor 86 may be configured to execute the following processes: the process of selecting, from the image group that is used as a reference image, two or more two dimensional cross sectional images located in the vicinity of the location of the cross section of the two dimensional cross sectional image that is used as a follow-up image; and the process of constructing a new two dimensional cross sectional image by synthesizing (composing) the two or more two dimensional cross sectional images selected. The two dimensional cross sectional image newly constructed in this way may be used as a reference image.

In the case where the follow-up image includes at least one or more images of the image group, the reference image may be a three dimensional image such as stack data or volume data, or a rendered image. In this case, the misalignment information acquiring processor 86 may execute, for example, a process of identifying a region (e.g., a cross section, a three dimensional region, etc.) in the reference image that corresponds to the cross section represented by the two dimensional cross sectional image that is used as a follow-up image. In another example, the misalignment information acquiring processor 86 may be configured to construct a processed image such as a three dimensional image or a rendered image from a plurality of two dimensional cross sectional images that are used as follow-up images, and then construct a reference image corresponding to the cross section represented by the two dimensional cross sectional image used as a follow-up image based on the processed image used as a reference image and the processed image used as a follow-up image.

The follow-up image may include a processed image constructed by the processed image constructing processor 85. As described above, a processed image may be, for example, a three dimensional image such as stack data or volume data, a rendered image, or like images. In the case where the follow-up image includes a processed image, the misalignment information acquiring processor 86 executes, for example, a process of identifying a region (e.g., a cross section, a three dimensional region, etc.) in the reference image that corresponds to the region represented by the processed image used as the follow-up image. In the case where the reference image includes an image group (or at least one image (two dimensional cross sectional image) included therein), the misalignment information acquiring processor 86 may identify a region in the image group to be used as the reference image. Here, the identified region in the image group corresponds to the location of the region represented by the processed image used as the follow-up image. In the case where the reference image includes a processed image such as a three dimensional image or a rendered image, the misalignment information acquiring processor 86 may construct a reference image, based on a processed image used as a reference image and a processed image used as a follow-up image, that corresponds to the region represented by the processed image used as the follow-up image.

Comparative analysis between a reference image and a follow-up image may include freely selected or designed image processing, such as feature point extraction, segmentation, labeling, pattern matching, template matching, thresholding, binarization, edge detection, image correlation, masking, and so forth.

An example of processing for generating misalignment information will be described. To begin with, the misalignment information acquiring processor 86 executes analysis of a reference image to identify an image position (i.e., pixel position) corresponding to a predetermined characteristic site (feature site) of the anterior segment of the subject's eye E. Similarly, the misalignment information acquiring processor 86 executes analysis of a follow-up image to identify an image position (i.e., pixel position) corresponding to the same characteristic site. The characteristic site may be, for example, any of the corneal apex, the corneal edge, the center of the pupil, the pupil edge, a feature point of the iris pattern, the corner angle, a lesion, and other sites.

Next, the misalignment information acquiring processor 86 determines the positional shift (displacement, positional difference, positional deviation) between the coordinates of the image position identified for the reference image and the coordinates of the image position identified for the follow-up image. This positional shift determining process may be executed by, for example, determining elements (entries) of an affine transformation matrix, for each of the image positions of a plurality of characteristic sites, through substituting the coordinates of a corresponding image position in the reference image and the coordinates of this corresponding image position in the follow-up image into the well-known transformation formula for two dimensional affine transformation. Here, the coordinates of an image position are represented as address information assigned in advance to each pixel. The affine transformation matrix derived in this way contains information of both the misalignment in translation and the misalignment in rotational movement between the reference image and the follow-up image.

<Assessment Value Calculating Processor 87>

The assessment value calculating processor 87 is configured to calculate an assessment value of an error in a scan position during follow-up photography based on misalignment information acquired by the misalignment information acquiring processor 86. Examples of the assessment value include the following values: an assessment value calculated based on the area (size) of a predetermined image region defined by the scan position of a reference image and the scan position of a follow-up image; and an assessment value based on the positional shift between the scan position of a reference image and the scan position of a follow-up image. Note that the factors used for calculating an assessment value are not limited to these examples, and it is also possible to calculate an assessment value based on another factor. Alternatively, an assessment value may be calculated by combining different factors.

Figure 6:
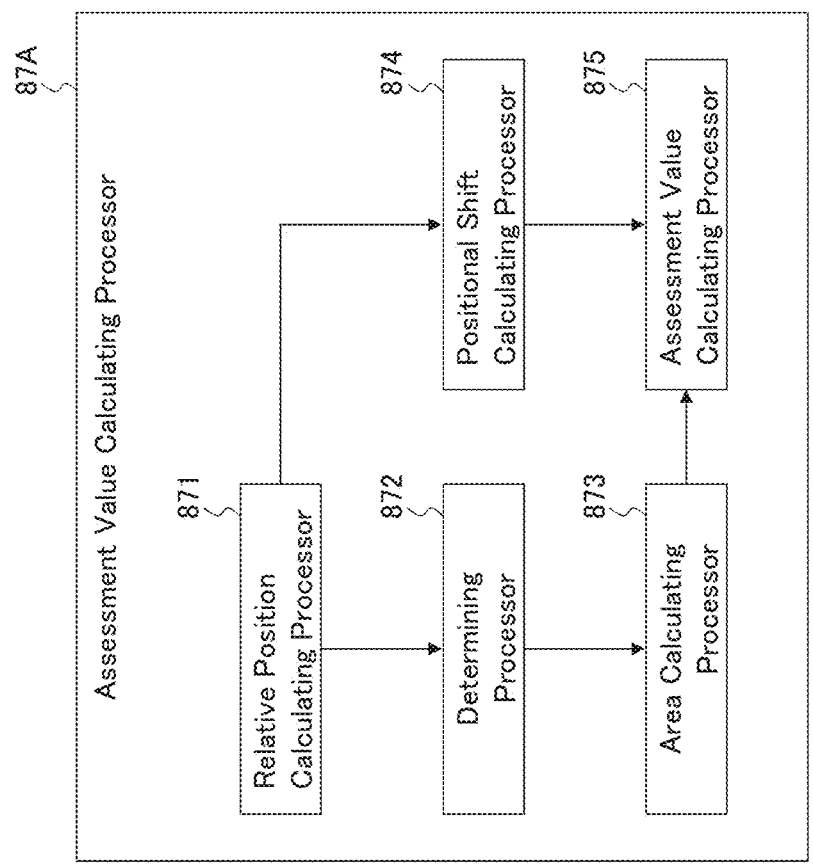
FIG. 6 is a schematic diagram illustrating a configuration of a slit lamp microscope according to an aspect example.

FIG. 6 shows an example of the configuration of the assessment value calculating processor 87. The assessment value calculating processor 87A of the present example includes the relative position calculating processor 871, the determining processor 872, the area calculating processor 873, the positional shift calculating processor 874, and the assessment value calculating processor 875. The process of calculating an assessment value based on the area (size) described above, is executed by the relative position calculating processor 871, the determining processor 872, and the area calculating processor 873. The process of calculating an assessment value based on the positional shift described above, is executed by the relative position calculating processor 871, the positional shift calculating processor 874, and the assessment value calculating processor 875.

Follow-up photography information (described later) stored in the memory 10 includes reference scan position information and follow-up scan position information. Here, the reference scan position information represents a scan position corresponding to a reference image, and the follow-up scan position information represents a scan position corresponding to a follow-up image acquired by the follow-up photography. The scan position corresponding to a reference image is referred to as a reference scan position, and the scan position corresponding to a follow-up image is referred to as a follow-up scan position. The relative position calculating processor 871 is configured to calculate relative position information between the reference scan position and the follow-up scan position based on the misalignment information acquired by the misalignment information acquiring processor 86.

As mentioned above, follow-up photography is conducted in order to reproduce a specific position where a scan has been applied in the past and apply a new scan to the position reproduced. According to this purpose, the reference scan position and the follow-up scan position are ideally the same. However, considering the effects of eye movements, photographing environment, and so forth, it is practically difficult to perfectly reproduce a past scan position. On the other hand, absence of these effects allows the reference scan position and the follow-up scan position to be matched. Therefore, the relative position between these scan positions corresponds to the misalignment of the subject's eye E caused by eye movements, in other words, the misalignment between the reference image and the follow-up image. Such misalignment is acquired as misalignment information by the misalignment information acquiring processor 86.

The relative position calculating processor 871 is configured to calculate the position corresponding to the reference scan position in the follow-up image, that is, an ideal scan position that would be achieved if the reference scan position were reproduced perfectly by, for example, shifting the reference scan position by the amount of misalignment shown in the misalignment information. The relative position information represents the relative position between this ideal scan position and the position of a scan performed in the actual follow-up photography, that is, between this ideal scan position and the follow-up scan position. Thus, the relative position information is substantially equivalent to the misalignment information. It should be noted that misalignment information represents the positional shift between images while relative position information represents the positional shift between scan positions. The relative position calculating processor 871 sends the obtained relative position information to the determining processor 872 and the positional shift calculating processor 874.

The relative position between the reference scan position and the follow-up scan position exhibits various aspects such as the examples shown in FIG. 7A to FIG. 7D. In FIG. 7A to FIG. 7D, the reference character R denotes the follow-up scan position and the reference character R0 denotes the reference scan position. The reference scan position R0 is obtained by a positional shift on the basis of the misalignment information (or the relative position information). As can be seen from the above description relating to the anterior segment scan using slit light and FIG. 3, the position (area, region) to which a scan is applied is a three dimensional region of the anterior segment, and the shape of this three dimensional region in the XY coordinate system, that is, the shape of the projected image of this three dimensional region formed on the XY plane, is substantially rectangular. In the present example, the follow-up scan position R shows the long axis (the axis along the scan direction, the axis in the X direction) of the XY projection image of the three dimensional region of the anterior segment to which the follow-up scan has been applied. Similarly, the reference scan position R0 shows the long axis of the XY projection image of the three dimensional region to which the reference scan has been applied.

Possible definitions of a reference scan position and a follow-up scan position are not limited to the above examples. In some examples, a scan position may be defined based on any of the top edge, bottom edge, side edge, diagonal line, apex, and other feature positions of an XY projection image. Further, possible definitions of a reference scan position and a follow-up scan position are not limited to definitions in a two dimensional manner as in the present examples. For example, definitions of a reference scan position and a follow-up scan position may be a three dimensional definition on the basis of a three dimensional region.

Figure 7A:
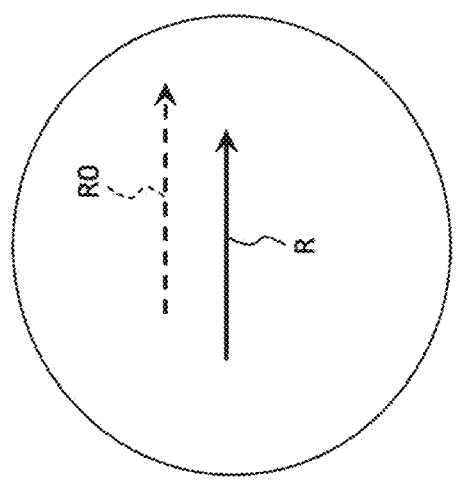
FIG. 7A is a schematic diagram for describing an operation of a slit lamp microscope according to an aspect example.
Figure 7B:
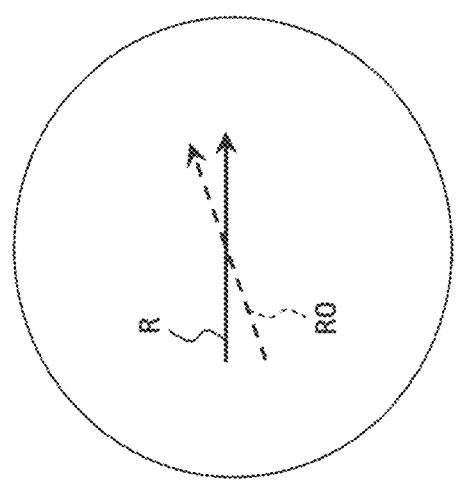
FIG. 7B is a schematic diagram for describing an operation of a slit lamp microscope according to an aspect example.
Figure 7C:
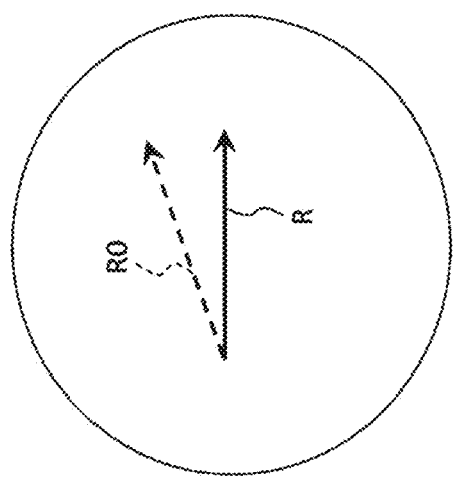
FIG. 7C is a schematic diagram for describing an operation of a slit lamp microscope according to an aspect example.
Figure 7D:
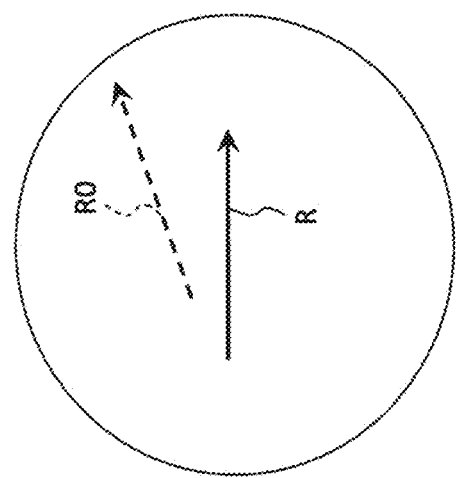
FIG. 7D is a schematic diagram for describing an operation of a slit lamp microscope according to an aspect example.

FIG. 7A shows an example of a case in which misalignment only includes misalignment in translation. FIG. 7B shows an example of a case in which misalignment only includes misalignment in rotational movement and both scan positions intersect each other in the vicinities of their centers. FIG. 7C shows an example of a case in which misalignment only includes misalignment in rotational movement and both scan positions intersect each other in the vicinities of their scan start positions. FIG. 7D shows an example of a case in which misalignment includes both misalignment in translation and misalignment in rotational movement. Note that FIG. 7A to 7D are merely examples of the aspects of the relative positions of the scan positions, and possible aspects of the relative positions of the scan positions are not limited to these examples.

The determining processor 872 is configured to determine whether or not there is a common position between the reference scan position and the follow-up scan position based on the misalignment information (or the relative position information). The common position represents a position (area, region) where the reference scan position and the follow-up scan position overlap each other, that is, a position (area, region) where the reference scan position and the follow-up scan position intersect each other.

The common position may be any of a zero dimensional region (point), a one dimensional region (line), a two dimensional region (plane), and a three dimensional region (solid). In FIG. 7A to FIG. 7D, the reference scan position and the follow-up scan position are both represented by line segments (arrows). In these cases, the common position is a point (intersection point) if the reference scan position and the follow-up scan position intersect each other, and there is no common position if they do not intersect. Although not shown in the drawings, in the case where the direction of the positional shift of the follow-up scan position with respect to the reference scan position has only a component in the length direction of these scan positions, and where the amount of this positional shift is less than the lengths of these scan positions, then the common position of these two scan positions is a one dimensional region.

The process of determining whether or not there is a common position, is executed based on the coordinates of the reference scan position and the coordinates of the follow-up scan position in the follow-up image. For example, the determining processor 872 checks the coordinates of the reference scan position and the coordinates of the follow-up scan position against each other. Then, the determining processor 872 determines that there is a common position if there are common coordinates between these scan positions, and determines that there is no common position if there are no common coordinates between these scan positions. This process also provides the coordinates of the common position in the follow-up image. These coordinates are defined, for example, in a coordinate system defined in advance for the follow-up image.

The determining processor 872 sends a result of the determination regarding the common position (e.g., presence or absence of the common position, coordinates of the common position, etc.) to the area calculating processor 873.

The area calculating processor 873 is configured to calculate the area (size) of a two dimensional region defined by the reference scan position and the follow-up scan position based on the misalignment information (or the relative position information). As described above, the misalignment information and the relative position information are substantially equivalent to each other. The two dimensional region whose area is to be calculated is a partial region of the follow-up image. A method of defining a two dimensional region from two scan positions is determined in advance. The area calculating process may be executed in a freely selected or designed manner. The area calculating process may include, for example, any of a process of counting the number of pixels in the two dimensional region, a process of obtaining a mathematical expression (e.g., formula, equation, etc.) representing the boundary region (the outer edge region) of the two dimensional region, an integral calculation, and other processes. Further, the area, which is a result of the area calculating process, may be represented by a numerical value that uniquely expresses the size (dimension) of the two dimensional region. Examples of such numerical representation include the length of the outer edge (boundary, circumference) of the two dimensional region, and the distance across the two dimensional region.

The area calculating processor 873 may be configured to execute different arithmetic processes according to determination results obtained by the determining processor 872 in the area calculating process. In some example cases, the area calculating processor 873 executes different arithmetic processes depending on whether or not there is a common position between the reference scan position and the follow-up scan position. Some specific examples of such cases will be described below. These specific examples consider the cases where the two scan positions are defined by line segments, and separately consider the cases where the two scan positions intersect each other and cases where the two scan positions do not intersect each other. In other words, these specific examples separately consider the cases where a common position exists and the cases where a common position does not exist. Furthermore, the cases where the two scan positions intersect each other, are divided into the following two different subcases: the subcases where their intersection is located at an edge point(s) of the scan position(s); and the subcases where their intersection is located at a location different from an edge point(s) of the scan position(s). The process of determining whether or not the intersection is located at an edge point can be performed easily by referring to the coordinates of the two scan positions and the coordinates of their intersection. Note that the edge points of a scan position are the scan start point and the scan end point of the scan position of the shape of a line segment. In the specific examples below, there is only one intersection because the scan positions are of line segment shapes. On the other hand, in the case where at least one of scan positions is of a curved shape, there can be two or more intersections therebetween.

In the case where the two scan positions intersect each other as shown in FIG. 7B and FIG. 7C, the area calculating processor 873 calculates the area of a two dimensional region defined by the edge points of the two scan positions and the intersection of the two scan positions. More specifically, the area calculating processor 873 may execute the following calculation processes: a process of calculating the area of the triangle formed by respective two edge points of the two scan positions located on one side with respect to the intersection and the intersection of the two scan positions; a process of calculating the area of the triangle formed by the respective two edge points of the two scan positions located on the other side with respect to the intersection and the intersection of the two scan positions; and a process of calculating the sum of the areas of the two triangles. Then, the area calculating processor 873 may define the sum of the areas of the two triangles to be the area of the two dimensional region of the present case.

Figure 8A:
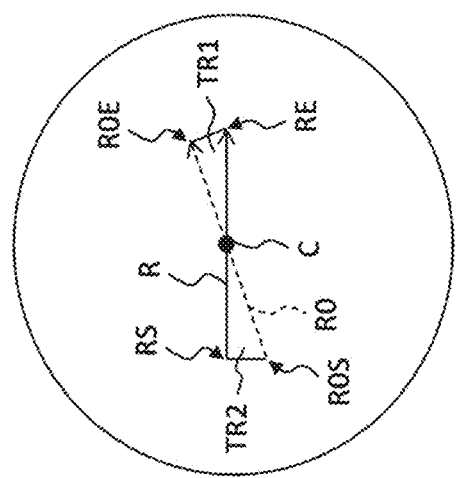
FIG. 8A is a schematic diagram for describing an operation of a slit lamp microscope according to an aspect example.

For example, in the case where the intersection is located at a position other than the edge points of the scan positions as shown in FIG. 7B, the area calculating processor 873 executes calculation as described based on FIG. 8A. More specifically, the area calculating processor 873 calculates the area of the triangle TR1 whose three vertices are the edge point R0E of the scan position R0, the edge point RE of the scan position R, and the intersection C of the scan positions R0 and R. Here, the edge point R0E is the scan end point of the scan position R0 and the edge point RE is the scan end point of the scan position R, and the edge points R0E and RE are both located on the right side with respect to the intersection C. In addition, the area calculating processor 873 calculates the area of the triangle TR2 whose three vertices are three vertices are the edge point R0S of the scan position R0, the edge point RS of the scan position R, and the intersection C of the scan positions R0 and R. Here, the edge point R0S is the scan start point of the scan position R0 and the edge point RS is the scan start point of the scan position R, and the edge points R0S and RS are both located on the left side with respect to the intersection C. Then, the area calculating processor 873 adds the calculated area of the triangle TR1 and the calculated area of the triangle TR2. This sum is used as a value of the area of the two dimensional region which is the purpose of the calculation.

Figure 8B:
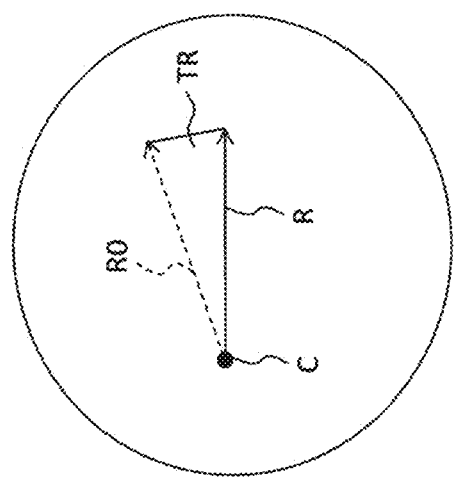
FIG. 8B is a schematic diagram for describing an operation of a slit lamp microscope according to an aspect example.

Another example is with respect to the case in which the two scan positions intersect at their respective edge points as shown in FIG. 7C (the two scan positions intersect at their respective scan start points). In this case, the area calculating processor 873 may calculate the area of the triangle TR whose three vertices are the intersection C of the two scan positions R0 and R, the scan end point of the reference scan position R0, and the scan end point of the follow-up scan position R as shown in FIG. 8B. Here, the intersection C corresponds to the scan start point of the scan position R0 and the scan start point of the scan position R.

In the case where the intersection of the two scan positions (the first and second scan positions) is located at the first edge point of the first scan position and at a point of the second scan position other than its edge points, the area calculating processor 873 may calculate, for example, the area of the triangle whose three vertices are the intersection of the two scan positions, the second edge point of the first scan position on the opposite side to the first edge point, and one edge point of the second scan position. Here, the one edge point of the second scan position is, for example, the edge point of the second scan position that is located on the same side as the second edge point of the first scan position.

Figure 8C:
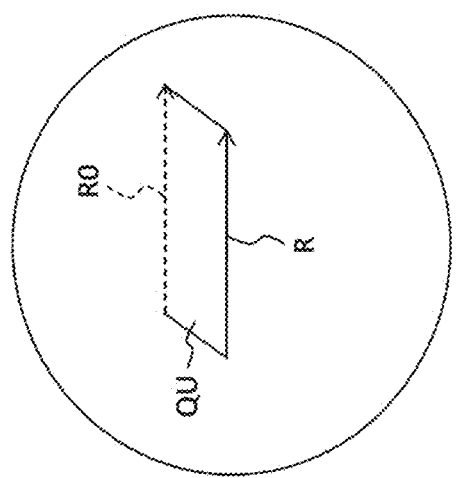
FIG. 8C is a schematic diagram for describing an operation of a slit lamp microscope according to an aspect example.
Figure 8D:
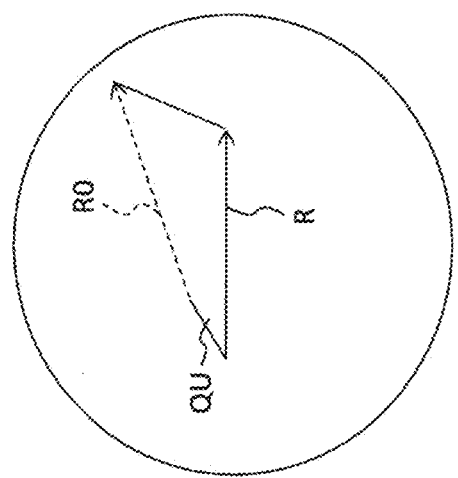
FIG. 8D is a schematic diagram for describing an operation of a slit lamp microscope according to an aspect example.

In the case where the two scan positions R0 and R do not intersect each other as shown in FIG. 7A and FIG. 7D, the area calculating processor 873 may calculate the area of a quadrilateral defined by the two scan positions R0 and R, and define the calculated area of the quadrilateral to be the area of the two dimensional region which is the purpose of the calculation. More specifically, in the case where the two scan positions R0 and R do not intersect each other, the area calculating processor 873 may calculate the area of the quadrilateral QU, as shown in FIG. 8C or FIG. 8D. Here, the quadrilateral QU has the reference scan position R0 and the follow-up scan position R as two of the four sides, and two line segments that do not intersect each other and respectively connect two pair of edge points of the two scan positions R0 and R as the remaining two sides.

The area calculating processor 873 sends the area calculated in the way as described above, to the assessment value calculating processor 875. Note that while the present example is configured to calculate an assessment value using an area, possible parameters of sizes that can be used for assessment value calculation are not limited to areas, and may be a freely selected or determined parameter such as volumes, lengths, or other size representations.

The positional shift calculating processor 874 is configured to calculate the positional shift between the reference scan position and the follow-up scan position based on the misalignment information (or the relative position information) generated by the misalignment information acquiring processor 86. The method of calculating a positional shift may be freely selected or designed. An example of the method of calculating a positional shift will be described with reference to FIG. 9.

FIG. 9 shows the reference scan position R0 of a line segment shape and the follow-up scan position R of a line segment shape. It should be noted that whether or not the two scan positions R0 and R intersect each other may be irrelevant in positional shift calculation.

To begin with, the positional shift calculating processor 874 identifies a predetermined position on the reference scan position R0 and a predetermined position on the follow-up scan position R. This position identifying process may be executed based on the coordinates of each point of the scan position R0 (R). Examples of the predetermined positions to be identified include a scan start point, a scan end point, a midpoint, and other feature points. Note that when considering a scan position of a form other than a line segment, a predetermined position on this scan position to be identified may be a position corresponding to the shape of this scan position. Further, the same type of predetermined position is applied to the two scan positions to be compared. For example, when the scan start point is used as a predetermined position, the scan start point is identified from each scan position. In some examples, a plurality of types of predetermined positions may be identified from each scan position. If this is the case, corresponding type information is associated with each predetermined position identified.

Next, the positional shift calculating processor 874 calculates the positional shift between the coordinates of the predetermined position identified from the reference scan position R0 and the coordinates of the predetermined position identified from the follow-up scan position R. This positional shift calculating process may be executed, for example, using a two dimensional coordinate system defined in advance for the follow-up image. The positional shift may be determined by counting the number of pixels between the two predetermined positions. The positional shift calculated in this process is defined to be the positional shift between predetermined positions of the same type. For example, the positional shift calculated is the positional shift between two scan start points, but not the positional difference between a scan start point and a midpoint.

FIG. 9 shows a case where three types of positions are applied as the predetermined position described above. The three types of positions are a scan start point, a scan end point, and a midpoint. In FIG. 9, the reference character DS denotes the positional shift between the scan start point R0S of the reference scan position R0 and the scan start point RS of the follow-up scan position R. The reference character DE denotes the positional shift between the scan end point R0E of the reference scan position R0 and the scan end point RE of the follow-up scan position R. Further, the reference character DM denotes the positional shift between the midpoint R0M of the reference scan position R0 and the midpoint RM of the follow-up scan position R.

The positional shift calculating processor 874 sends the positional shifts obtained in the way as described above, to the assessment value calculating processor 875.

The assessment value calculating processor 875 is configured to calculate a value used for assessing an error in a scan position of follow-up photography. This value is referred to as an assessment value. As information used for this assessment value calculating process, the information on the area obtained by the area calculating processor 873 and the information on the positional shift obtained by the positional shift calculating processor 874 are input into the assessment value calculating processor 875. Described below are an example of an assessment value calculating process on the basis of the area, an example of an assessment value calculating process on the basis of the positional shift, and an example of an assessment value calculating process on the basis of both the area and the positional shift.

Note that possible types of information (parameters) that can be used in assessment value calculating processes are not limited to these examples, and may be a freely selected or determined type of information that reflects an error in a scan position of follow-up photography. The assessment value calculating processor 875 is configured to calculate an assessment value by executing processing determined or designed in advance according to the type of information employed.

As an example of the process of calculating an assessment value from the area of the image region calculated by the area calculating processor 873, the assessment value calculating processor 875 may execute an arithmetic process of subtracting the product of the area of the image region and a predetermined weight from a predetermined maximum value for assessment value.

The arithmetic process of the present example is expressed, for example, by the following equation: $S_1=S_{1,max}-a\times(Area)$. Here, "$S_1$" denotes an assessment value on the basis of an area, "$S_{1,max}$" denotes a maximum value of this assessment value set in advance, "a" denotes a weight set in advance, and "Area" denotes the area calculated by the area calculating processor 873. The maximum value "$S_{1,max}$" may be freely set, and the weight "a" may also be freely set. The maximum value "$S_{1,max}$" may be set to 100, for example. The weight "a" may be determined based on, for example, the magnitude of a value set as the maximum value, the magnitude of the value of the area, or other factors.

According to the arithmetic process of the present example as described above, the smaller the area becomes, the larger the value of the assessment value $S_1$ becomes. In other words, the smaller the error in the scan position of follow-up photography becomes, the larger the value of the assessment value $S_1$ becomes.

As an example of the process of obtaining an assessment value from the positional shift calculated by the positional shift calculating processor 874, the assessment value calculating processor 875 may execute an arithmetic process of subtracting the product of this positional shift and a predetermined weight from a predetermined maximum value of assessment value.

The arithmetic process of the present example is expressed, for example, by the following equation: $S_2=S_{2,max}-(b\times DM+c\times DS+d\times DE)$. Here, "$S_2$" denotes an assessment value on the basis of a positional shift, "$S_{2,max}$" denotes a maximum value of the assessment value set in advance, and "b", "c", and "d" denote weights set in advance. Further, "DM" denotes the positional shift between the midpoints calculated by the positional shift calculating processor 874, "DS" denotes the positional shift between the scan start points calculated by the positional shift calculating processor 874, and "DE" denotes the positional shift between the scan end points calculated by the positional shift calculating processor 874. The maximum value "$S_{2,max}$" and the weights "b", "c", and "d" may be freely determined. For example, the maximum value "$S_{2,max}$" may be set to 100, and the weights "b", "c", and "d" may be determined based on the magnitude of a value set as the maximum value, the magnitude of the value of the area, or other factors.

According to the arithmetic process of the present example as described above, the smaller the positional shift becomes, the larger the value of the assessment value $S_2$ becomes. In other words, the smaller the error in the scan position of follow-up photography becomes, the larger the value of the assessment value $S_2$ becomes. Note that while the present example considers the three types of points, namely, the midpoints, the scan start points, and the scan end points, in order to calculate an assessment value, some other examples may consider only one or two of the three types of points in order to calculate an assessment value. Alternatively, it is also possible to calculate a positional shift between points of a type other than the three types, and take this positional shift into account.

In some examples of the process of obtaining an assessment value based on both the area of the image region calculated by the area calculating processor 873 and the positional shift calculated by the positional shift calculating processor 874, the assessment value calculating processor 875 may use an arithmetic equation derived by combining the arithmetic equations of the two cases described above.

The arithmetic equation of the present example may be expressed as follows, for example: $S=S_{max}-a\times(Area)-(b\times DM+c\times DS+d\times DE)$. Here, "S2 denotes an assessment value on the basis of both the area and the positional shift, "$S_{max}$" denotes a maximum value of assessment value determined in advance, "a" to "d" denote weights determined in advance, and "Area" denotes the area calculated by the area calculating processor 873. "DM", "DS", and "DE" denote the positional shift between the midpoints, the positional shift between the scan start points, and the positional shift between the scan end points, which are calculated by the positional shift calculating processor 874, respectively. The maximum value $S_{max}$ and the weights "a" to "d" may be freely determined. For example, the maximum value $S_{max}$ may be set to 100, and each of the weights "a" to "d" may be determined based on the magnitude of a value set as the maximum value, the magnitude of the value of the area, or other factors.

According to the arithmetic process of the present example as described above, the smaller any one of or both the area and the positional shift becomes, the larger the value of the assessment value S becomes. In other words, the smaller the error in the scan position of follow-up photography becomes, the larger the value of the assessment value S becomes.

Information on the assessment value calculated by the assessment value calculating processor 875 (or the assessment value calculating processor 87) in the way as described above is sent to the acceptability determining processor 88.

<Acceptability Determining Processor 88>

The acceptability determining processor 88 is configured to determine acceptability of the follow-up photography based on the assessment value calculated by the assessment value calculating processor 87. Here, the "acceptability" of follow-up photography refers to whether or not the follow-up photography has been carried out in a satisfactory (appropriate, suitable) manner. The acceptability determining process is executed, for example, by comparing the assessment value calculated by the assessment value calculating processor 87 with a numerical range determined in advance.

Below, a description will be given of a specific example of the processing executed by the acceptability determining processor 88. In the case where an assessment value increases as an error decreases as in the examples described above, the acceptability determining processor 88 may compare the calculated assessment value with a predetermined threshold value to judge whether or not the assessment value is equal to or greater than the threshold value. When it is determined that the assessment value is equal to or greater than the threshold value, the acceptability determining processor 88 obtains a determination result that the corresponding follow-up photography has been performed under a satisfactory condition. Conversely, when the assessment value is determined to be less than the threshold value, the acceptability determining processor 88 obtains a determination result that the corresponding follow-up photography has not been performed under a satisfactory condition.

Note that while the example described above uses a single threshold value, it is also possible to apply two or more different threshold values in a stepwise manner in order to determine the acceptability of follow-up photography.

The acceptability determining processor 88 sends the acquired determination result to the controller 7. The controller 7 may store the received determination result into the memory 10. The controller 7 may execute a control of a display device to display the received determination result. The controller 7 may execute a control of the communication device 9 to transmit the received determination result to another apparatus.

In the case where the slit lamp microscope 1 is configured to be capable of outputting (e.g., displaying, outputting audio (voice), etc.) the assessment value calculated by the assessment value calculating processor 87, there is no need to provide the acceptability determining processor 88 therein. If this is the case, the user can determine the acceptability of follow-up photography based on the assessment value output from the slit lamp microscope 1.

<Communication Device 9>

The communication device 9 performs data communication between the slit lamp microscope 1 and another apparatus (external device). In other words, the communication device 9 performs transmission of data to another apparatus and reception of data transmitted from another apparatus.

For example, the communication device 9 is configured to be capable of performing transmission of at least one or more images of an image group collected by scanning the anterior segment of the subject's eye E with slit light to another device (first external device). Further, the communication device 9 is configured to be capable of performing transmission of data generated from such an image group by the data processor 8 to another device (second external device). The first external device and the second external device may be the same device or may be different devices. In the case where the first external device and the second external device are the same, this external device may be any of the following devices, for example: an image interpretation computer terminal, an image interpretation apparatus, and a computer configured to execute processing different from the processing executed by the data processor 8. On the other hand, in the case where the first external device and the second external device are different, the first external device may be any of an image interpretation computer terminal, an image interpretation apparatus, a computer configured to execute processing same as or similar to the processing executed by the data processor 8, and a computer configured to execute processing different from the processing executed by the data processor 8, and the second external device may be any of an image interpretation computer terminal, an image interpretation apparatus, and a computer configured to execute processing different from the processing executed by the data processor 8. In the case where the first external device and the second external device are different, the controller 7 may be configured to execute selection of a destination external device according to the type of data to be transmitted.

The communication device 9 is configured to be capable of transmitting any of the following kinds of data or information to an external device: a processed image constructed by the processed image constructing processor 85; misalignment information generated by the misalignment information acquiring processor 86; an assessment value calculated by the assessment value calculating processor 87; and a determination result obtained by the acceptability determining processor 88.

Before follow-up photography is performed, the communication device 9 may receive, from an external device, an anterior segment image acquired in the past from a target patient (subject). Further, the communication device 9 may receive, from an external device, information regarding photography conditions when the anterior segment image was obtained. These external devices may typically be a freely selected or determined medical system. In some specific examples, the medical system may include a medical image management system such as a Picture Archiving and Communication System (PACS), an electronic medical record system, or other systems. The controller 7 stores, into the memory 10, the anterior segment image and/or the information regarding photography conditions received from the external devices. The anterior segment image may be used as a reference image in follow-up photography. The information regarding photography conditions may be used for setting a condition of follow-up photography.

The system or method of the data communication executed by the communication device 9 may be selected accordingly. For example, the communication device 9 may include any one or more of various kinds of communication interfaces such as a communication interface conforming to the Internet, a communication interface conforming to a dedicated line, a communication interface conforming to a local area network (LAN), and a communication interface conforming to near field communication. The data communication may include any one of or both wireless communication and wired communication.

Data sent and/or received by the communication device 9 may be encrypted. If encryption is used, for example, any one of or both the controller 7 and the data processor 8 include(s) at least one of an encryptor and a decryptor. The encryptor is configured to encrypt data to be sent by the communication device 9. The decryptor is configured to decrypt data having been received by the communication device 9.

<Memory 10>

The memory 10 retains various kinds of data. For example, the memory 10 may retain any of the following kinds of data or information: an image group collected by scanning the anterior segment of the subject's eye E with slit light; an image set formed from two or more image groups; analysis data generated by image analysis; a processed image constructed by the processed image constructing processor 85; misalignment information generated by the misalignment information acquiring processor 86; an assessment value calculated by the assessment value calculating processor 87; and a determination result obtained by the acceptability determining processor 88. The controller 7 is configured to execute processing of storing data into the memory 10 and processing of reading out data from the memory 10. The data storing process and data reading-out process are executed at the appropriate times in various kinds of operations of the slit lamp microscope 1.

The memory 10 retains follow-up photography information including predetermined types of information. The follow-up photography information is information related to photography performed in the past (past photography). The past photography may be follow-up photography and/or non-follow-up photography. The follow-up photography information may include at least the following items, for example: an image of the anterior segment of the subject's eye E that was referred to in follow-up photography performed in the past (e.g., the first image, reference image); and an image of the anterior segment of the subject's eye E that was acquired in this follow-up photography (e.g., the second image, follow-up image).

Further, the follow-up photography information may also include reference scan position information and follow-up scan position information. Here, the reference scan position information represents a scan position corresponding to a reference image, that is, represents the first scan position, or the reference scan position, described above. The follow-up scan position information represents a scan position corresponding to a follow-up image acquired by the follow-up photography, that is, represents the second scan position, or the follow-up scan position, described above. The reference scan position information and the follow-up scan position information may include, for example, control information for the movement mechanism 6 in order to perform a scan, control information for the illumination system 2 and/or the photography system 3 in order to perform a scan, and so forth. control information for the illumination system 2 and/or the photography system 3 may include, for example, control information for the slit forming member, control information for the image sensor 5, and so forth. Note that in the case where the slit lamp microscope 1 is configured to acquire a front image of the anterior segment in real time while applying a scan with slit light to the anterior segment (described later), the scan position information may include the coordinates of the scan position (scan trajectory) depicted in this front image.

The memory 10 includes a freely selected types of storage, and includes at least one of a non-volatile storage and a volatile storage. The memory 10 includes, for example, any one of or both a hard disk drive and a semiconductor memory.

<Other Elements>

In addition to the elements shown in FIG. 1A and FIG. 1B, the slit lamp microscope 1 may further include a display device and an operation device. In some other aspect examples, a display device and an operation device may be peripheral devices of the slit lamp microscope 1.

The display device is configured to display various kinds of information under the control of the controller 7. The display device may include a flat panel display such as a liquid crystal display (LCD).

The operation device includes a device for operating the slit lamp microscope 1 and/or a device for inputting information. The operation device includes, for example, a button, a switch, a lever, a dial, a handle, a knob, a mouse, a keyboard, a trackball, an operation panel, or the like.

A device such as a touch screen may be employed in which a display device and an operation device are integrated (combined).

The subject (patient) or an assistant may operate the slit lamp microscope 1 by using the display device and the operation device.

<Alignment>

A description will be given of the alignment of the slit lamp microscope 1 with respect to the subject's eye E. Alignment, in general, is an operation to place an optical system of an apparatus at an appropriate position for photography or measurement of the subject's eye E. The alignment of the present aspect example is an operation to place the illumination system 2 and the photography system 3 at appropriate positions for acquisition of a plurality of anterior segment images (a series of images, a moving image, an image group, or an image set) as shown in FIG. 3.

There are various kinds of methods and techniques for alignment of an ophthalmic apparatus. While some alignment methods and techniques will be described below, alignment methods and techniques applicable to the present aspect example are not limited to these examples.

One of the alignment methods and techniques applicable to the present aspect example is stereo alignment. Stereo alignment may be applicable to an ophthalmic apparatus capable of photographing an anterior segment from two or more mutually different directions (two or more mutually different viewpoints). A specific method of stereo alignment is disclosed by the present applicant in Japanese Unexamined Patent Application Publication No. 2013-248376. Stereo alignment includes, for example, the following steps: a step of photographing the anterior segment from different directions by two or more anterior segment cameras to acquire two or more photographed images; a step of analyzing the photographed images by a processor to determine a three dimensional position of the subject's eye; and a step of performing a movement control of an optical system by a processor based on the three dimensional position determined. With such an alignment operation, the optical system (the illumination system 2 and the photography system 3 in the present example) is brought to and placed at an appropriate alignment position with respect to the subject's eye. The position of the pupil (e.g., the center of the pupil or the center of gravity of the pupil) of the subject's eye is used as a reference (or an indicator) in a typical stereo alignment.

In addition to the stereo alignment described hereinbefore, any known alignment methods and techniques may be employed, such as an alignment method or technique using a Purkinje image formed by alignment light, an alignment method or technique using an optical lever, or an alignment method or technique using an alignment indicator. The alignment method or technique using a Purkinje image and the alignment method or technique using an optical lever or an alignment indicator uses the position of the corneal apex of the subject's eye as a reference.

Conventional typical alignment methods and techniques including the above examples are performed for the purpose of matching the optical axis of an optical system with the axis of a subject's eye. On the other hand, the present aspect example may perform alignment so as to place the illumination system 2 and the photography system 3 at a position corresponding to the scan start position.

The first example of the alignment of the present aspect example may be carried out in the following manner. First, alignment with reference to the pupil or corneal apex of the subject's eye E may be performed by applying any of the alignment methods and techniques described above. Then, the illumination system 2 and the photography system 3 may be moved (in the X direction) by a distance corresponding to a standard value of the corneal radius determined in advance or by a distance corresponding to a value obtained by adding a standard value of the corneal radius determined in advance and a predetermined value. Note that a measurement value of the corneal radius of the subject's eye E acquired in advance may be used in place of the standard value.

The second example of the alignment of the present aspect example may be carried out in the following manner. First, alignment with reference to the pupil or corneal apex of the subject's eye E may be performed by applying any of the alignment methods and techniques described above. Second, the corneal radius of the subject's eye E may be measured by analyzing an image of anterior segment. Third, the illumination system 2 and the photography system 3 may be moved (in the X direction) by a distance corresponding to the measurement value of the corneal radius of the subject's eye E or by a distance corresponding to a value obtained by adding the measurement value of the corneal radius of the subject's eye E and a predetermined value. The image of the anterior segment analyzed in the present example is an anterior segment image obtained by the photography system 3 or another image, for example. This another image here may be an image of any kind, such as an image obtained by an anterior segment camera, an image obtained by an anterior segment OCT, or the like.

The third example of the alignment of the present aspect example may be carried out in the following manner. First, the first edge position of the cornea may be determined by analyzing an image of the anterior segment acquired by the anterior segment camera for stereo alignment or by the photography system 3. Then, the illumination system 2 and the photography system 3 may be moved to a position corresponding to the first edge position or to a position shifted (moved, changed) outward from the first edge position by a predetermined distance by applying stereo alignment.

It should be noted that alignment may be performed with reference to the pupil or corneal apex of the subject's eye E by applying any of the alignment methods and techniques described above, and then the scan with slit light may be started from the position determined by the alignment. In such a case as well, a scan sequence may be determined to perform scanning of a three dimensional region that includes the cornea C such as a three dimensional region that includes the entire cornea C. For example, the scan sequence may be determined in such a manner that the scan is performed to the left from the position determined by the alignment conducted with reference to the pupil or the corneal apex and then to the right.

<Some Additional Matters and Items>

The slit lamp microscope 1 may be provided with a fixation system configured to output light for fixation of the subject's eye E (referred to as fixation light). The fixation system of some typical examples includes at least one visible light source (referred to as a fixation light source(s)) or a display device configured to display an image such as a landscape chart or a fixation target. The fixation system of some example aspects is arranged coaxially or non-coaxially with the illumination system 2 or the photography system 3. The fixation system may include an internal fixation system and/or an external fixation system. The internal fixation system is configured to present a fixation target to the subject through the optical path of an optical system of an apparatus. The external fixation system is configured to present a fixation target to the subject from outside the optical path of an optical system of an apparatus.

The types (kinds) of images that may be acquired by the slit lamp microscope 1 are not limited to the plurality of anterior segment images shown in FIG. 3. For example, the slit lamp microscope 1 may acquire any of the following types of images: a three dimensional image constructed based on the plurality of anterior segment images; a rendered image constructed based on the three dimensional image; a transillumination image (red reflex image); a moving image representing movement of a contact lens applied to the subject's eye; and an image representing a gap between a contact lens and the corneal surface by fluorescent agent administration. A rendered image will be described in another aspect example. A transillumination image is an image obtained by a red reflex technique (transillumination) for depicting opacity and foreign bodies in the eye by using the retinal reflection of illumination light. Note that the slit lamp microscope 1 may be configured to be capable of carrying out fundus photography, corneal endothelial cell photography, Meibomian gland photography, and any other imaging modalities.

The slit lamp microscope 1 (the data processor 8) may be configured to be capable of executing analysis processing. In some examples, the slit lamp microscope 1 may be configured to be capable of calculating any anterior segment parameters. An anterior segment parameter is a value representing the morphology (shape, form) of an anterior segment. Examples of anterior eye parameters include radius of curvature of anterior corneal surface, radius of curvature of posterior corneal surface, radius of curvature of anterior surface of crystalline lens, radius of curvature of posterior surface of crystalline lens, corneal diameter (vertical diameter, horizontal diameter (white-to-white)), corneal thickness (central thickness, peripheral thickness), crystalline lens thickness, anterior chamber depth, anterior chamber volume, pupil diameter, and pupil center (eccentricity). The anterior segment parameter(s) may be shape distribution data, and may include, for example, corneal shape maps of various kinds such as a curvature map in the axial direction (axial curvature map), a tangential curvature map, an elevation map, a refractive power map, a thickness map (pachymetry map), a wavefront aberration map. The anterior segment parameter(s) may also include a corner angle parameter(s). Examples of corner angle parameters include angle opening distance (AOD), anterior chamber angle (ACA), trabecular iris space area (TISA), angle recess area (ARA), and angle-to-angle distance (AtA). The methods and techniques of anterior segment parameter calculation is publicly known. In some typical examples, anterior segment parameter calculation may include a process of identifying a site and/or a position to be measured (e.g., a process of segmentation, a process of feature point detection), and a measurement process of determining a value of anterior segment parameter based on the site and/or the position identified (e.g., distance measurement, ratio calculation, angle calculation).

<Other Aspects of Optical System>

Figure 10:
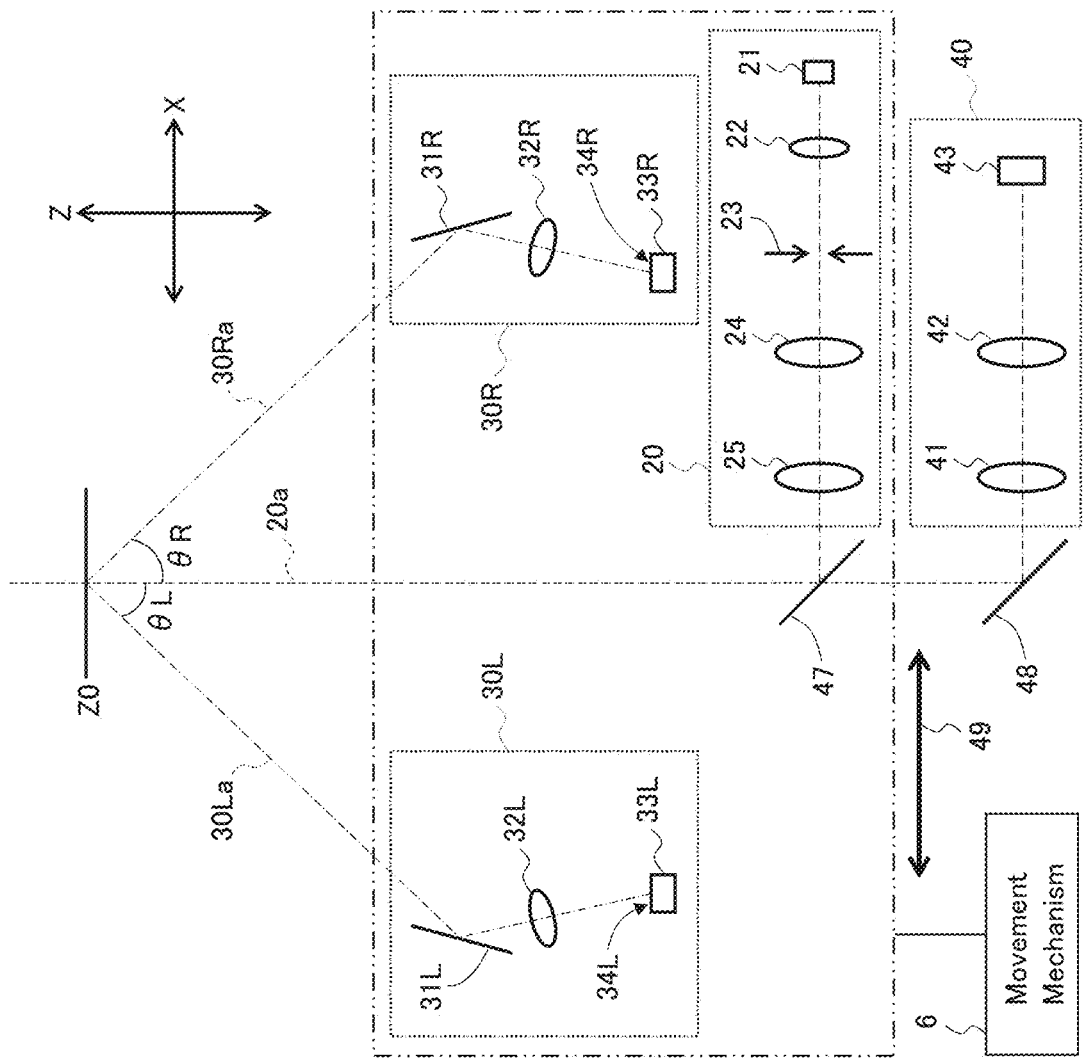
FIG. 10 is a schematic diagram illustrating a configuration of an optical system of a slit lamp microscope according to an aspect example.

In the slit lamp microscope of the mode or aspect described thus far, both a reference image and a follow-up image are images acquired by applying a scan with slit light to an anterior eye segment (referred to as scan images), and misalignment information is generated from these two scan images. However, a reference image needs not be a scan image and/or a follow-up image needs not be a scan image. For example, in the case where a slit lamp microscope is configured to be capable of acquiring a front image as well as a scan image, misalignment information may be generated from the front image. FIG. 10 shows an example of an optical system of such a slit lamp microscope. In addition to the element group shown in FIG. 10, the slit lamp microscope of the present aspect example may include, for example, the above-described controller 7, the above-described data processor 8, the above-described communication device 9, the above-described memory 10, the above-described display device, and the above-described operation device, and so forth. The matters and items relating to the slit lamp microscope 1 described above may be incorporated into the present aspect example, unless otherwise mentioned.

The illumination system 20 shown in FIG. 10 is an example of the illumination system 2 of the slit lamp microscope 1, and the pair of the left photography system 30L and the right photography system 30R is an example of the photography system 3. In the following, the illumination system 20 may be referred to as the illumination system 2, and the left photography system 30L and/or the right photography system 30R may be referred to as the photography system 3. Note that some aspect examples may include only one of the left photography system 30L and the right photography system 30R, and this single photography system may be regarded as an example of the photography system 3. The reference character 20a denotes the optical axis of the illumination system 20 (referred to as the illumination optical axis), the reference character 30La denotes the optical axis of the left photography system 30L (referred to as the left photography optical axis), and the reference character 30Ra denotes the optical axis of the right photography system 30R (referred to as the right photography optical axis). The orientation of the left photography optical axis 30La and the orientation of the right photography optical axis 30Ra are different from each other. The angle formed by the illumination optical axis 20a and the left photography optical axis 30La is denoted by θL, and the angle formed by the illumination optical axis 20a and the right photography optical axis 30Ra is denoted by θR. The angle θL and the angle θR may be equal to or different from each other. The illumination optical axis 20a, the left photography optical axis 30La, and the right photography optical axis 30Ra intersect at one point. As with FIG. 1A, the Z coordinate of the intersection is denoted by Z0.

The movement mechanism 6 is capable of moving the illumination system 20, the left photography system 30L, and the right photography system 30R in the direction denoted by the arrow 49 (X direction). In some typical examples, the illumination system 20, the left photography system 30L, and the right photography system 30R are mounted on a stage that is movable at least in the X direction, and the movement mechanism 6 moves the movable stage under a control signal from the controller 7.

The illumination system 20 is configured to project slit light onto the anterior segment of the subject's eye E. Similar to an illumination system of a conventional slit lamp microscope, the illumination system 20 includes the illumination light source 21, the positive lens 22, the slit forming member 23, and the group of objective lenses 24 and 25 in the order from the side far from the subject's eye E.

The illumination light output from the illumination light source 21 (typically, visible light) is refracted by the positive lens 22 and projected onto the slit forming member 23. Part of the illumination light projected onto the slit forming member 23, passes through the slit formed by the slit forming member 23 and becomes slit light. The slit light generated by the slit forming member 23 is refracted by the group of objective lenses 24 and 25, and then reflected by the beam splitter 47, and projected onto the anterior segment of the subject's eye E.

The left photography system 30L includes the reflector 31L, the imaging lens 32L, and the image sensor 33L. The reflector 31L and the imaging lens 32L direct, to the image sensor 33L, light coming from the anterior segment onto which the slit light is being projected by the illumination system 20 (that is, light coming from the anterior segment and traveling in the direction toward the left photography system 30L).

The light traveling in the direction toward the left photography system 30L from the anterior eye segment corresponds to light that not only comes from the anterior eye segment onto which the slit light is being projected but also travels in the direction away from the illumination optical axis 20a. The reflector 31L is arranged to reflect the light toward a direction approaching the illumination optical axis 20a. The imaging lens 32L refracts the light reflected by the reflector 31L and forms an image on the light detecting plane 34L of the image sensor 33L. The image sensor 33L receives and detects the light by the light detecting plane 34L.

As in the slit lamp microscope 1 described above, the left photography system 30L performs repetitive photography in parallel with movement of the illumination system 20, the left photography system 30L, and the right photography system 30R performed by the movement mechanism 6. Such operations acquire a plurality of anterior segment images (image group).

Also as in the slit lamp microscope 1 described above, the subject plane along the illumination optical axis 20a, the optical system that includes the reflector 31L and the imaging lens 32L, and the light detecting plane 34L satisfy the Scheimpflug condition. More specifically, considering the deflection of the optical path of the photography system 30L by the reflector 31L, the YZ plane (including the subject plane) passing through the illumination optical axis 20a, the principal plane of the imaging lens 32L, and the light detecting plane 34L intersect on the same straight line. As a result, the left photography system 30L may perform photography with all positions in the subject plane (e.g., the area from the anterior corneal surface to the posterior crystalline lens surface) in focus.

The right photography system 30R includes the reflector 31R, the imaging lens 32R, and the image sensor 33R. Like the left photography system 30L, the right photography system 30R directs light coming from the anterior eye segment onto which the slit light is being projected by the illumination system 20 to the light detecting plane 34R of the image sensor 33R by the reflector 31R and the imaging lens 32R. Further, as with the left photography system 30L, the right photography system 30R acquires a plurality of anterior segment images (image group) by performing repetitive photography in parallel with movement of the illumination system 20, the left photography system 30L, and the right photography system 30R performed by the movement mechanism 6. As in the case of the left photography system 30L, the subject plane along the illumination optical axis 20a, the optical system that includes the reflector 31R and the imaging lens 32R, and the light detecting plane 34R satisfy the Scheimpflug condition.

The controller 7 may perform synchronization between the repetitive photography carried out by the left photography system 30L and the repetitive photography carried out by the right photography system 30R. With this synchronization, a correspondence (association, relationship) can be made between a plurality of anterior segment images obtained by the left photography system 30L and a plurality of anterior segment images obtained by the right photography system 30R. This correspondence is a temporal correspondence (chronological correspondence), and more specifically, it is a correspondence for establishing a pair of images acquired at substantially the same time by the left photography system 30L and the right photography system 30R.

In some alternative examples, the controller 7 or the data processor 8 may execute a process of determining a correspondence between a plurality of anterior segment images obtained by the left photography system 30L and a plurality of anterior segment images obtained by the right photography system 30R. For example, the controller 7 or the data processor 8 may be configured to form pairs of images from anterior segment images sequentially input from the left photography system 30L and anterior segment images sequentially input from the right photography system 30R, in accordance with their input timings.

The present aspect example further includes the moving image acquisition unit 40. The moving image acquisition unit 40 acquires a moving image of the anterior segment of the subject's eye E from a fixed position in parallel with the photography (image acquisition) performed by the left photography system 30L and the right photography system 30R. This acquisition of a moving image from the fixed position indicates that the moving image acquisition unit 40 is not moved while the illumination system 20, the left photography system 30L and the right photography system 30R are moved for the anterior segment scanning. Note that the moving image acquisition unit 40 is also capable of acquiring a still image.

The moving image acquisition unit 40 of the present aspect example is arranged coaxially with the illumination system 20; however, possible arrangements are not limited to this example. For example, the moving image acquisition unit 40 may be arranged non-coaxially with the illumination system 20. Further, an optical system may be provided which projects, onto the anterior eye segment, illumination light of a wavelength band(s) detectable by the moving image acquisition unit 40.

The light transmitted through the beam splitter 47 is reflected by the reflector 48 and enters the moving image acquisition unit 40. The light that has entered the moving image acquisition unit 40 is refracted by the objective lens 41 and then forms an image on the light detecting plane of the image sensor 43 by the imaging lens 42. The image sensor 43 may be an area sensor. The image sensor 43 is capable of detecting one of or both wavelength bands of visible light and infrared light, for example.

In the case where the moving image acquisition unit 40 is employed, movement of the subject's eye E may be monitored and tracking may be performed. Further, alignment may be performed using the moving image acquisition unit 40.

The beam splitter 47 may be a dichroic mirror or a half mirror, for example, depending on the output wavelength of the illumination system 20 and the detectable wavelength of the moving image acquisition unit 40.

Some features, some actions, and some advantageous effects of the slit lamp microscope of the present aspect example will be described.

The present aspect example provides the pair of the left photography system 30L and the right photography system 30R as an example of the photography system 3 of the slit lamp microscope 1 described above. The left photography system 30L includes the reflector 31L and the imaging lens 32L (first optical system), and the image sensor 33L (first image sensor). The first optical system is configured to direct the light coming from the anterior eye segment onto which the slit light is being projected. The first image sensor includes the light detecting plane 34L (first light detecting plane) that receives the light directed by the first optical system. Likewise, the right photography system 30R includes the reflector 31R and the imaging lens 32R (second optical system) and the image sensor 33R (second image sensor). The second optical system is configured to direct the light coming from the anterior eye segment onto which the slit light is being projected. The second image sensor includes the light detecting plane 34R (second light detecting plane) that receives the light directed by the second optical system.

The orientation of the optical axis of the left photography system 30L (the left photography optical axis 30La) and the orientation of the optical axis of the right photography system 30R (the right photography optical axis 30Ra) are different from each other. Further, the subject plane along the optical axis of the illumination system 20 (the illumination optical axis 20a), the reflector 31L and the imaging lens 32L, and the light detecting plane 34L satisfy the Scheimpflug condition. Similarly, the subject plane, the reflector 31R and the imaging lens 32R, and the light detecting plane 34R satisfy the Scheimpflug condition.

The left photography system 30L acquires the first image group by performing repetitive photography in parallel with the movement of the illumination system 20, the left photography system 30L, and the right photography system 30R performed by the movement mechanism 6. Likewise, the right photography system 30R acquires the second image group by performing repetitive photography in parallel with the movement of the illumination system 20, the left photography system 30L, and the right photography system 30R performed by the movement mechanism 6.

The controller 7 may be configured to perform a control of the illumination system 20, the left photography system 30L, the right photography system 30R, and the movement mechanism 6 in such a manner that, for example, the left photography system 30L and the right photography system 30R individually apply a single scan to the anterior segment of the subject's eye E in parallel with one another. The data processor 8 may be configured to form a single image group by selecting, from the pair of the left image group and the right image group collected by the parallel scans, a series of images corresponding to the scan area. The image group assessing processor 81 is configured to execute a quality assessment of the image group formed. In the case where the image group assessing processor 81 determines that the quality of this image group is satisfactory, the controller 7 is configured to perform a control of the communication device 9 to transmit the image group to a predetermined external device.

In the case where the image group assessing processor 81 determines that the quality of this image group is not satisfactory, the controller 7 is configured to perform a control of the illumination system 20, the left photography system 30L, the right photography system 30R, and the movement mechanism 6 to apply another scan (one or more times of scans) to the anterior segment of the subject's eye E. With this additional scan, the left photography system 30L collects one or more first image groups corresponding to the one or more times of scans, and the right photography system 30R collects one or more second image groups corresponding to the one or more times of scans. For example, the image set forming processor 82 may be configured to execute both of the following processes: a process of forming the first image set by selecting the first series of images corresponding to the scan area, from among the two or more first image groups acquired by the first scan and the additional scan; and a process of forming the second image set by selecting the second series of images corresponding to the scan area, from among the two or more second image groups acquired by the first scan and the additional scan. In some alternative examples, the image set forming processor 82 may be configured to form an image set by selecting a series of images corresponding to the scan area, from among the two or more first image groups and the two or more second image groups acquired by the first scan and the additional scan. Any of the matters and items, such as the configurations, controls, processes, actions, and functions described in relation to the slit lamp microscope 1, may be combined with the present aspect example.

According to the present aspect example, moving images of the anterior eye segment onto which the slit light is being projected can be acquired respectively from mutually different directions. There may be a case where an image (first image) acquired by one of the photography systems contains an artifact while the other image (second image) substantially simultaneously acquired with the first image by the other photography system does not contain any artifact. Further, there may be a case where a pair of images substantially simultaneously acquired by the two photography systems both contain artifacts, and the artifact in one of the images overlaps a region of interest (e.g., a region onto which the slit light is being projected (slit light projected region)) while the artifact in the other image does not overlap a region of interest. Therefore, the present aspect example is capable of improving the possibility of being able to obtain satisfactory (proper, eligible, preferable) images. As a result, the present aspect example becomes capable of further improving the probability of being able to obtain an image group and/or image set of a satisfactory quality.

Note that, in addition to the left photography system 30L (the first photography system) and the right photography system 30R (the second photography system), the photography system 3 may include the third photography system, . . . , K-th photography system (where K is an integer equal to or greater than 3) each of which has a similar configuration as the first or second photography system. Although such a configuration makes the structure of the optical system more complicated, this configuration makes it possible to further improve the probability of being able to obtain an image group and/or image set of a good quality. A person who intends to implement the present aspect example may design a slit lamp microscope in view of these trade-off matters and items (that is, the complexity of the optical system and the probability of being able to obtain an image set having a high quality).

The left photography system 30L of the present aspect example includes the reflector 31L and the imaging lens 32L. The reflector 31L is configured to reflect the light coming from the anterior segment onto which the slit light is being projected and traveling in a direction away from the illumination optical axis 20a, toward a direction approaching the illumination optical axis 20a. Further, the imaging lens 32L is configured to form an image of the light reflected by the reflector 31L on the light detecting plane 34L. Here, the imaging lens 32L includes one or more lenses.

Likewise, the right photography system 30R includes the reflector 31R and the imaging lens 32R. The reflector 31R is configured to reflect the light coming from the anterior segment onto which the slit light is being projected and traveling in a direction away from the illumination optical axis 20a, toward a direction approaching the illumination optical axis 20a. Further, the imaging lens 32R is configured to form an image of the light reflected by the reflector 31R on the light detecting plane 34R. Here, the imaging lens 32R includes one or more lenses.

With such a configuration, reducing the size of the apparatus can be achieved. More specifically, taking into account the fact that the images acquired by the image sensor 33L (33R) are output through a cable extending from the surface on the opposite side of the light detecting plane 34L (34R), the present configuration allows a cable to be arranged from the back surface of the image sensor 33L (33R) located relatively close to the illumination optical axis 20a toward the direction opposite to the subject's eye E. As a result of this, cable routing can be performed in a preferable manner, making it possible to reduce the size of the apparatus.

In addition, the present configuration allows the angle θL and the angle θR to be designed large. This increases the possibility of an image acquired by one of the photography systems not containing any artifact although a corresponding image acquired by the other photography system contains an artifact. Here, the corresponding image is an image acquired by the other photography system substantially at the same time as the image acquired by the one of the photography systems. In addition, even though artifacts are contained in both of a pair of images substantially simultaneously acquired by the both photography systems and an artifact in one of the images overlaps a region of interest (e.g., a region onto which slit light is being projected (slit light projected region)), designing the angle θL and the angle θR to be large can reduce the possibility of an artifact in the other image overlapping a region of interest.

The present aspect example includes the moving image acquisition unit 40. The left photography system 30L and the right photography system 30R each perform repetitive photography of the anterior eye segment in parallel with the movement of the illumination system 20, the left photography system 30L and the right photography system 30R performed by the movement mechanism 6. In parallel with such repetitive photography, the moving image acquisition unit 40 acquires a moving image of the anterior segment from a fixed position.

Such a configuration allows acquiring a moving image from the fixed position (e.g., from the front position with respect to the subject's eye E) in parallel with the anterior eye segment scanning with slit light. This makes it possible to grasp the state of the subject's eye E during the scanning as well as to perform a control depending on the state of the subject's eye E.

For example, in the case where the slit lamp microscope of the present aspect example includes the image group assessing processor 81 (the image set assessing processor 83) of the slit lamp microscope 1 described above, the slit lamp microscope of the present aspect example may be configured to be capable of assessing whether or not an image group(s) (image set(s)) acquired by the left photography system 30L and/or the right photography system 30R are/is of a quality good enough for image interpretation. Combining the image group assessing processor 81 (the image set assessing processor 83) with the moving image acquisition unit 40 makes it possible to perform the operations described in the following. It should be noted that the same or similar operations may also be implemented by using two or more anterior segment cameras for stereo alignment or using like imaging methods and techniques.

The moving image acquisition unit 40 performs acquisition of a moving image of the anterior segment of the subject's eye E from a fixed position in parallel with application of a scan to the anterior segment. This moving image acquisition is performed under the control of the controller 7, for example. In other words, in order to perform the anterior segment scanning of the subject's eye E, the controller 7 may execute an interlocking control of the illumination system 2 (the illumination system 20), the photography system 3 (the left photography system 30L and/or the right photography system 30R), the movement mechanism 6, and the moving image acquisition unit 40.

In this interlocking control, the controller 7 may execute synchronization of the photographing rate of the photography system 3 and the photographing rate of the moving image acquisition unit 40 with each other. For example, the photographing rate of the photography system 3 and the photographing rate of the moving image acquisition unit 40 are controlled to be equal to one another, and the photographing timing of the photography system 3 and the photographing timing of the moving image acquisition unit 40 are controlled to coincide with one another. With such controls, a frame group acquired by the photography system 3 and the frame group acquired by the moving image acquisition unit 40 during scanning can be associated with each other in terms of time.

Even when one of or both the photographing rates and the photographing timings are different, it is possible to associate a frame group acquired by the photography system 3 and a frame group acquired by the moving image acquisition unit 40 during scanning with each other in terms of time. This association can be made, for example, by ignoring a time difference within a permissible range determined in advance.

It can be considered that two frames (one is a frame obtained by the photography system 3 and the other is a frame obtained by the moving image acquisition unit 40) paired with each other in terms of chronological correspondence have been acquired at substantially the same time. Therefore, when a pair of temporally (chronologically) associated frames is considered (treated), positional differences (positional shifts) between these frames due to eye movement can be ignored.

Under such a premise, the image group assessing processor 81 (the image set assessing processor 83) may be configured to execute a quality assessment of a series of images included in an image group (image set) based on a moving image (frame group) acquired by the moving image acquisition unit 40.

In such examples, the image group assessing processor 81 (the image set assessing processor 83) may be configured to execute an assessment of a quality of the image group (image set) based on a correspondence between the series of images included in the image group (image set) and a series of frames included in the moving image acquired by the moving image acquisition unit 40. In other words, the image group assessing processor 81 (the image set assessing processor 83) may be configured to execute a quality assessment of the image group (image set) based on a temporal correspondence (chronological correspondence) between a frame group obtained by the photography system 3 and a frame group acquired by the moving image acquisition unit 40. In addition, the image group assessing processor 81 (the image set assessing processor 83) may be configured to execute a quality assessment of the image group (image set) based on a landmark in the series of frames and the correspondence described above.

A specific example is described below. In the present example, the frame group F1 to FN (described above) have been acquired by the photography system 3 and a frame group D1 to DN have been acquired by the moving image acquisition unit 40 in parallel with the acquisition of the frame group F1 to FN. In addition, for any n=1, 2, ..., N, the frame Fn and the frame Dn have been associated with each other.

The image group assessing processor 81 (the image set assessing processor 83) identifies a landmark in each of the frame group D1 to DN. This landmark may be, for example, an image region corresponding to the iris (iris region).

Next, the image group assessing processor 81 (the image set assessing processor 83) determines an arrangement order (spatial arrangement order) of the frame group D1 to DN based on the positions of the N number of landmarks identified respectively from the frame group D1 to DN (e.g., based on changes in spatial positions of the identified landmarks).

As mentioned above, the frame group D1 to DN are arranged in a temporal (chronological) manner in accordance with the ascending order n=1, 2, ..., N (temporal arrangement order or chronological arrangement order). If the temporal arrangement order (chronological arrangement order) and the spatial arrangement order are different from each other, there is a possibility that the order of the frames has been changed and/or positional deviation (positional shift) has occurred due to the influence of eye movement. In addition, there is a possibility that skipping (lack, omission) of a frame has occurred due to the influence of blinking.

In the case where such a defect is detected, that is, in the case where the fact is detected that the temporal arrangement order (chronological arrangement order) and the spatial arrangement order are different from each other, the image group assessing processor 81 (the image set assessing processor 83) determines that the quality of this image group (image set) is not satisfactory.

With such a configuration, the slit lamp microscope is capable of acquiring a moving image in which a wide area of the anterior eye segment is depicted (at least a wide area in the X direction and a wide area in the Y direction) in parallel with anterior segment scanning with slit light, and detecting a defect in a series of images included in the image group (image set) using the moving image acquired.

Each image of the series of images included in the image group (image set) is an image that extends in the depth direction (the Z direction). Therefore, it is necessary to employ image processing (image analysis) similar to that of the slit lamp microscope 1 described above, in order to recognize the locations, arrangement, layout, or the like of the series of images in the X and Y directions orthogonal to the Z direction on the basis of the series of images itself.

The present example implements, without applying image analysis to a series of images, a quality assessment of a series of images using a moving image that is separately acquired in parallel with scanning. The assessment items in the present example may be any of an arrangement order of a series of images, lack or omission of an image in a series of images, and misalignment of a series of images, as in the slit lamp microscope 1 described above. Further, the assessment processing of the present example may be combined with any of the assessment processes described for the slit lamp microscope 1 described above.

Another application of the moving image acquisition unit 40 is described below. The purpose of the present example is to, when, for example, two or more times of additional scans are to be performed after a quality of an image group collected by the first scan is determined to be not satisfactory, prevent misalignment (positional deviation) of the subject's eye E between scans by performing adjustment of the commencement timings of the two or more times of additional scans.

In the present example as well, the moving image acquisition unit 40 performs photography of the anterior segment of the subject's eye E from a fixed position. The controller 7 is configured to control the scanner to commence the second scan in response to an event that the moving image acquisition unit 40 has acquired an image substantially the same image as a reference image that has been acquired by the moving image acquisition unit 40 in response to commencement of the first scan of the two or more times of additional scans.

The following is a more specific description. Any one of two or more scans applied to the anterior eye segment to form an image set is referred to as the first scan. The first scan of the present example may be the scan executed first among the two or more scans.

To begin with, the controller 7 saves an image acquired by the moving image acquisition unit 40 at the commencement timing of the first scan (referred to as a reference image). The reference image may be, for example, a frame captured at a point of time closest to the point of time of the commencement of the first scan, among a frame group of a moving image whose acquisition has started before the commencement of the first scan. In some alternative examples, the moving image acquisition unit 40 may acquire, under the control of the controller 7, a reference image by taking a still image of the anterior eye segment at the commencement point of time of the first scan. This commencement point of time of the first scan may be any of the following options: a point of time immediately before the commencement point of time of the first scan; a point of time that coincides with the commencement point of time of the first scan; and a point of time immediately after the commencement point of time of the first scan.

Any scan that is performed after the first scan (referred to as the second scan) is commenced at a point of time during the moving image photography of the anterior segment is being performed by the moving image acquisition unit 40. The controller 7 (or the data processor 8) compares the frames sequentially acquired by the moving image acquisition unit 40 with the reference image. This comparison may include any image processing, such as segmentation to identify a landmark, image matching, image correlation, or the like.

When it is determined that substantially the same frame as the reference image is obtained, the controller 7 controls the illumination system 2, the photography system 3, and the movement mechanism 6 to start the second scan.

The slit lamp microscope of the present example continues repetitive execution of the series of processes described above until the number of scan applications to the anterior eye segment reaches the number of scan repetitions for image set formation determined in advance. The present example thus configured can reduce misalignment of the subject's eye E between scans and therefore prevent the quality of an image set from deteriorating due to eye movements. In addition, the present example makes it possible to improve the efficiency and facilitation of image selection.

An image acquired by the moving image acquisition unit 40 can be used to obtain a misalignment occurred in follow-up photography. In some aspect examples, the moving image acquisition unit 40 is arranged to perform photography the anterior segment of the subject's eye E from the front. In other words, the moving image acquisition unit 40 may be configured to be capable of acquiring a front image of the anterior segment.

Possible configurations used for acquiring a front image are not limited to the moving image acquisition unit 40. For example, a front image may be constructed by synthesizing or composing two or more anterior segment images acquired by two or more anterior segment cameras described by Japanese Unexamined Patent Application Publication No. 2013-248376 filed by the present applicant. The front image constructed from the two or more anterior segment images is a virtual viewpoint image generated using an image processing technique or technology such as viewpoint conversion. Even when using such a virtual front image, it is possible to execute the same or similar processing as when acquiring a front image by the moving image acquisition unit 40.

In the present example, anterior segment photography (acquisition of a front image) using the moving image acquisition unit 40 is performed together with anterior segment scanning with slit light (collection of an image group) using the elements including the illumination system 20, the left photography system 30L, the right photography system 30R, and the movement mechanism 6.

The timing of acquiring the front image may be freely determined. For example, the anterior segment photography using the moving image acquisition unit 40 may be performed in parallel with the anterior segment scanning with slit light. In other words, at least part of the execution period of the anterior segment photography and at least part of the execution period of the anterior segment scanning may overlap each other. Alternatively, the anterior segment photography may be performed immediately before the anterior segment scanning or immediately after the anterior segment scanning. If this is the case, the time difference between the anterior segment scanning and the anterior segment photography is set sufficiently small, for example, to the extent that the influence of eye movement can be ignored.

Before follow-up photography is performed, the slit lamp microscope of the present aspect acquires a front image of the anterior segment of the subject's eye E acquired by photography performed in the past (past photography). This front image is referred to as the first front image or a reference front image. The first front image acquired is stored in the memory 10. Along with the past photography, the slit lamp microscope of the present aspect may also perform acquisition and storage of photography conditions. The follow-up photography is performed using the first front image as a reference image. In this follow-up photography, the moving image acquisition unit 40 acquires a front image of the anterior segment of the subject's eye E. This front image is referred to as the second front image or a follow-up front image. The follow-up photography is performed, for example, by referring to photography conditions (e.g., scanning conditions, etc.) employed in the past photography.

In the present example, the misalignment information acquiring processor 86 is configured to analyze the first front image referred to in follow-up photography and the second front image acquired by this follow-up photography, thereby acquiring misalignment information between the first front image and the second front image.

In the case where the photography conditions of the past photography and the photography conditions of the current photography (i.e., follow-up photography) are the same, the misalignment between the first front image and the second front image can be considered to correspond to the positional shift in the scan position. By executing such a comparison between front images, the slit lamp microscope can acquire information representing an positional error of the follow-up photography.

The photography conditions of the past photography and the photography conditions of the current photography do not have to be the same as each other. For example, in the case where the photography conditions of the past photography and the photography conditions of the current photography can be compared with each other, misalignment information can be generated in consideration of the difference between the two photography conditions. For example, in the case where the scan start position of the current photography is different from the scan start position of the past photography, the position of the image group may be determined in consideration of the shift amount between these scan start positions. In the case where the scan interval (frame rate) of the current photography is different from the scan interval of the past photography, the arrangement of the image group may be determined (e.g., construction of stack data may be executed) in consideration of the difference between these scan intervals.

In the present aspect, the assessment value calculating processor 87 may calculate an assessment value of an error in a scan position of follow-up photography based on the misalignment information acquired by the misalignment information acquiring processor 86. Further, the acceptability determining processor 88 may determine whether or not the follow-up photography has been performed in a satisfactory manner based on the assessment value calculated by the assessment value calculating processor 87.

The slit lamp microscope of the present aspect example can display various kinds of information using a front image. For example, the controller 7 may execute a control of the display device to display the reference front image and/or the follow-up front image, and also display a reference scan position image and a follow-up scan position image on the front image(s) in an overlapping manner based on the misalignment information acquired by the misalignment information acquiring processor 86. Here, the reference scan position image represents a reference scan position, and the follow-up scan position image represents a follow-up scan position.

In such a display control, relative position information equivalent to or similar to the misalignment information may be referred to in place of or in addition to the misalignment information.

In the case where either one of the reference front image or the follow-up front image is displayed, the reference scan position image and the follow-up scan position image may be displayed in an overlapping manner on the displayed front image. In the case where both the reference front image and the follow-up front image are displayed, the reference scan position image and the follow-up scan position image may be displayed in an overlapping manner on each of the two front images, or, the reference scan position image and the follow-up scan position image may be displayed in an overlapping manner only on one of the reference front image and the follow-up front image.

The controller 7 may display the reference scan position image and the follow-up scan position image in mutually different modes or aspects. For example, the two scan position images may be displayed in different colors from each other, in different thicknesses from each other, or in different densities from each other. Further, identification information (e.g., character string information, image information, etc.) may be attached to each scan position image. In addition, the two scan position images may be always displayed in different modes. Alternatively, display modes of the two scan position images may be switched to different display modes in response to a predetermined trigger.

Figure 11:
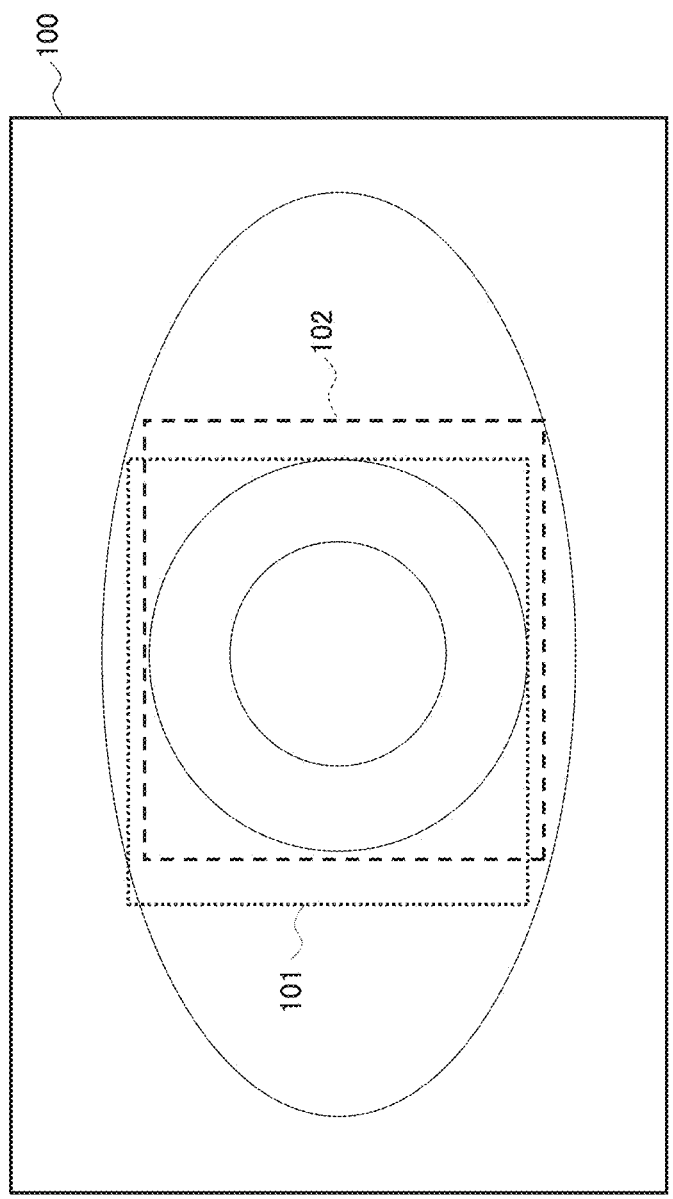
FIG. 11 is a schematic diagram for describing an operation of a slit lamp microscope according to an aspect example.

FIG. 11 shows an example of information displayed by the display control described above. FIG. 11 illustrates displayed information in which the reference scan position image 101 represented by the dotted line and the follow-up scan position image 102 represented by the dashed line are displayed on the front image 100 of the anterior segment such as the follow-up front image or the reference front image. The follow-up scan position image 102 shows the area to which a scan was applied by the follow-up photography. The reference scan position image 101 shows the scan area for the case where the follow-up photography was performed without an error. In other words, the reference scan position image 101 shows the area to which a scan was applied by the past photography, which is also the area corresponding to a scan target area of the current follow-up photography. By displaying such information, it becomes possible for the user to visually understand the error (accuracy) in the position of the follow-up photography.

Such information display is performed, for example, in the following manner. To begin with, the memory 10 retains the first position information and the second position information. The first position information represents a position in the reference front image of an image (an image group) acquired by the anterior segment scan together with the acquisition of the reference front image, and the second position information represents a position in the follow-up front image of an image (an image group) acquired by the anterior segment scan together with the acquisition of the follow-up front image. The first position information is information generated based on the first anterior segment scan and the first anterior segment photography performed in the past, which is the information showing an application position (application area) of the first anterior segment scan in a front image acquired by the first anterior segment photography (the reference front image). The second position information is information generated based on the follow-up photography (the second anterior segment scan) and the second anterior segment photography performed with reference to the reference front image, which is the information showing an application position (application area) of the second anterior segment scan in a front image acquired by the second anterior segment photography (the follow-up front image). The controller 7 executes a control of the display device to display at least one front image of the first front image and the second front image, and to display the first position image corresponding to the first position information and the second position image corresponding to the second position information on the at least one front image in an overlapping manner based on the misalignment information acquired by the misalignment information acquiring processor 86. For example, when displaying both the first position image and the second position image on the follow-up front image in an overlapping manner, the display position of the second position image on the follow-up front image is determined by the second position information while the display position of the first position image on the follow-up front image is determined by correcting the position indicated by the first position information based on the misalignment information.

Possible aspects of the display control that can be executed by the present aspect example are not limited to the above examples. In some examples, the controller 7 may display freely selected or determined information that indicates an error in the scan position of the follow-up photography. As a specific example thereof, the controller 7 may execute a control of the display device to display an assessment value calculated by the assessment value calculating processor 87. The assessment value may be displayed alone, or may be displayed together with information such as a front image or an image showing the scan position. Further, in place of the assessment value or together with the assessment value, a determination result obtained by the acceptability determining processor 88 may be displayed.

<Operations>

Several examples of the operation of the slit lamp microscope according to the aspect example will be described. The following description will be given as operation examples of the slit lamp microscope 1, but operations of the slit lamp microscope of the aspect shown in FIG. 10 and operations of a slit lamp microscope of other aspects may be performed in the same manner.

While not shown in the drawings, the user (a subject, an examiner, or an assistant) may input subject information into the slit lamp microscope 1 at any stage. The subject information that has been input is stored in the memory 10 by the controller 7. The subject information of some typical examples includes identification information (identifier) of the subject (referred to as subject ID).

Furthermore, background information may also be input. The background information is any kind of information related to the subject, and examples thereof include information acquired by a medical interview of the subject, information on a sheet filled in by the subject, information recorded in the electronic medical record of the subject, and so forth. In some typical examples, the background information includes the subject's data on items such as gender, age, height, weight, disease name, possible disease name, examination result (e.g., visual acuity value, eye refractive power value, intraocular pressure value), history of a wearing device for refractive correction (e.g., history of wearing glasses, contact lenses) and the power of the device, examination history, and treatment history. These are merely examples, and possible items of the background information are not limited to these examples.

Further, in preparation for photography, the table on which the slit lamp microscope 1 is installed, the chair on which the subject sits, and the chin rest of the slit lamp microscope 1 are adjusted (all not shown in the drawings). For example, the heights of the table, chair and chin rest are adjusted. The chin rest is provided with a chin rest member and a forehead rest member for stably positioning the face of the subject.

After the completion of the preparation, the subject sits on the chair, puts his/her chin on the chin rest member, and puts his/her forehead on the forehead rest member. Before or after these actions, the user performs an operation of issuing an instruction to start photography of the subject's eye. This operation may be conducted, for example, by pressing a photography start trigger button (not shown in the drawings) or inputting a voice instruction. Alternatively, the controller 7 may detect the completion of the preparation phase and automatically shift to the photography phase. In addition, a fixation target (not shown in the drawings) may be presented to the subject (the subject's eye E or the fellow eye thereof).

First Operation Example

Figure 12:
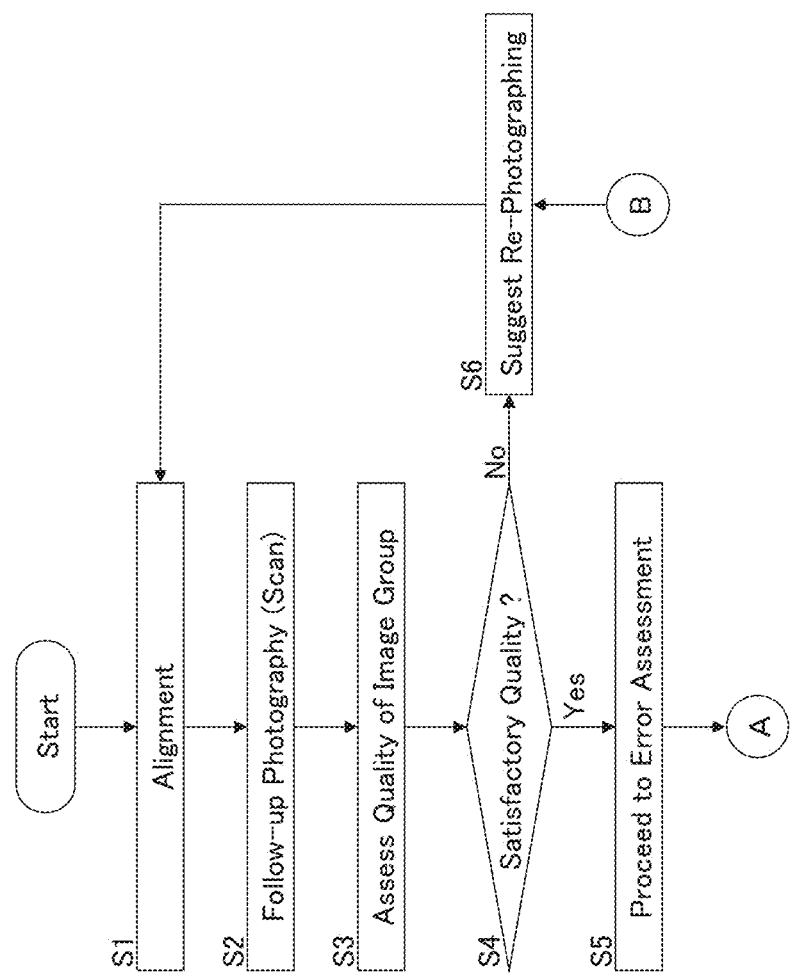
FIG. 12 is a flowchart illustrating an operation of a slit lamp microscope according to an aspect example.

The first operation example performed after the above preparations will be described with reference to FIG. 12 and FIG. 14. FIG. 12 shows an example of the operation for obtaining an image group of a satisfactory quality by follow-up photography. FIG. 14 shows an example of the operation for assessing a quality (an error) of the follow-up photography.

In the present example, the operation example shown in FIG. 14 is executed after the execution of the operation example shown in FIG. 12. In other words, the present example executes an assessment of the quality of the follow-up photography after acquisition of an image group of a satisfactory quality. Although not shown in the drawings nor described in detail, some other aspect examples may be operated to execute an assessment of the quality of the image group after the execution of an assessment of the quality of the follow-up photography in contrast to the present example. Still some other aspect examples may be operated to execute a quality assessment of the follow-up photography and a quality assessment of the image group in parallel with each other. A person having ordinary knowledge and skills of the technical field to which the present disclosure belongs (a person skilled in the art) would be able to understand these other aspect examples based on the first operation example described below.

(S1: Alignment)

Upon commencing photography, the slit lamp microscope 1 performs alignment of the illumination system 2 and the photography system 3 with respect to the subject's eye E. Unlike general alignment operations for aligning the optical axis of an optical system with the corneal apex or the center of the pupil of the subject's eye E, the alignment in the step S1 is performed to place the illumination system 2 and the photography system 3 at a start position of the scan to be performed in the step S2. The mode (aspect) of the alignment of the step S1 may be freely selected or determined, and may be any of the examples described above. An operation such as adjustment of the image sensor 5, focus adjustment, or the like may be performed before the commencement of alignment, during alignment, and/or after the completion of alignment.

(S2: Follow-Up Photography (Anterior Segment Scan))

The slit lamp microscope 1 scans the anterior segment of the subject's eye E by combining the projection of the slit light performed by the illumination system 2, the moving image photography performed by the photography system 3, and the movement of the illumination system 2 and the photography system 3 performed by the movement mechanism 6. This scan is applied to a three dimensional region of the anterior segment. As a result of a single scan (that is, a scan from the scan start position to the scan end position), for example, the image group (a plurality of anterior segment images) F1 to FN shown in FIG. 3 is obtained.

The data processor 8 may be configured to perform predetermined processing on an image obtained by the scan application. For example, freely selected or determined signal processing and/or freely selected or determined image processing may be applied to an image obtained by the scan application, such as noise elimination, contrast adjustment, brightness adjustment, and color correction.

(S3: Assess Quality of Image Group)

The image group assessing processor 81 executes an assessment of the quality of the image group collected by the scan of the step S2.

(S4: Satisfactory Quality?)

In the case where the image group assessing processor 81 has determined in the step S3 that the quality of the image group is satisfactory (S4: Yes), the present operation proceeds to an assessment of the quality (error) of the follow-up photography (S5). On the other hand, in the case where the image group assessing processor 81 has determined in the step S3 that the quality of the image group is not satisfactory (S4: No), the present operation proceeds to the step S6.

(S5: Proceed to Error Assessment)

When the image group assessing processor 81 has determined in the step S3 that the quality of the image group is satisfactory (S4: Yes), the controller 7 executes a control to perform processing for assessing the quality (error) of the follow-up photography by which this image group was obtained.

For example, the controller 7 sends information for an error assessment to the data processor 8 (e.g., to the misalignment information acquiring processor 86). The information for the error assessment includes, for example, an image group determined in the step S4 to be of a satisfactory quality (follow-up images) and past images referenced in the follow-up photography (reference images). The information for the error assessment may further include photography conditions applied in the past photography, photography conditions applied in the follow-up photography, and so forth. The destination of the information for the error assessment (the element to which the information for the error assessment is sent) is not limited to the misalignment information acquiring processor 86. In some examples, the controller 7 may send the information for the error assessment to the processed image constructing processor 85 in order to generate misalignment information using a processed image.

After the execution of the step S5, the present operation proceeds to the step S31 in FIG. 14.

(S6: Suggest Re-Photographing)

In the case where the image group assessing processor 81 has determined in the step S3 that the quality of the image group is not satisfactory (S4: No), the controller 7 then executes a control for perform collection of a new image group (another image group) from the anterior segment of the subject's eye E. The controller 7 of the present example executes a control for displaying information and/or outputting audio (voice) information to suggest the user to conduct photography again. The user then conducts an operation of issuing an instruction to start re-photographing or an operation of issuing an instruction not to re-perform photography.

If the user performs the operation of issuing the instruction to start re-photographing, the controller 7 executes a control to re-execute the operation from the step S1 (or the step S2). The re-photographing may be repeated, for example, up to a predetermined number of times.

On the other hand, if the user performs the operation of issuing the instruction not to re-perform photography, the controller 7 of some examples may execute a control to provide the image group determined to be of an unsatisfactory quality for an error assessment of the follow-up photography. Alternatively, the controller 7 of some examples may execute a control to delete, save, or record the image group determined to be of an unsatisfactory quality.

(S31: Generate Misalignment Information)

After the execution of the step S5, the present operation proceeds to the step S31 in FIG. 14. In the step S31, the misalignment information acquiring processor 86 analyzes the image group determined in the step S4 to be of a satisfactory quality (the follow-up images) and the past images referred to in the follow-up photography (the reference images), thereby generating misalignment information between the follow-up image and the reference image.

(S32: Calculate Assessment Value)

Next, the assessment value calculating processor 87 calculates an assessment value of an error in the scan position of the follow-up photography based on the misalignment information generated in the step S31.

(S33: Determine Acceptability of Follow-Up Photography)

Subsequently, the acceptability determining processor 88 determines whether or not the follow-up photography has been successfully performed, based on the assessment value calculated in the step S32.

(S34: Acceptable?)

In the case where the acceptability determining processor 88 has determined in the step S33 that the follow-up photography has been successfully performed (S34: Yes), the present operation proceeds to the step S35.

On the other hand, in the case where the acceptability determining processor 88 has determined in the step S33 that the follow-up photography has not been successfully performed (S34: No), the present operation returns to the step S6 of FIG. 12. The processing in this case is executed in conformity with the processing executed in the step S6 described above.

(S35: Output Image)

In the case where the acceptability determining processor 88 has determined in the step S33 that the follow-up photography has been successfully performed (S34: Yes), the controller 7 executes a control for outputting the image group. For example, the controller 7 can transmit this image group to another apparatus by executing a control of the communication device 9. The image group to be output is an image group of a satisfactory quality acquired by the follow-up photography with a small positional error with respect to the past photography. This output image group is suitable not only for image interpretation, but also for a follow-up (for comparison with an image acquired in the past).

Examples of an apparatus to which the image group is transmitted include an information processing apparatus and a storage. The information processing apparatus is, for example, a server on a wide area network, a server on a LAN, a computer terminal, or the like. The storage may be a storage device provided on a wide area network, a storage provided on a LAN, or the like.

The image group output in the step S35 may include the background information, the misalignment information, the assessment value, the acceptability determination result, and other kinds of information described above. Alternatively, these pieces of information may be supplementary information attached to the image group. In general, the data structure of the information output in the step S35 may be selected accordingly.

In some typical examples, the image group transmitted in the step S35 includes a series of images of the anterior segment of the subject's right eye and a series of images of the anterior segment of the subject's left eye. The series of images of the right eye and the series of images of the left eye are obtained by applying the operations described in the present example to the right eye and the left eye, respectively. The subject's eye information described above is attached to the series of images of the right eye and the subject's eye information is attached to the series of images of the left eye, whereby the series of images of the right eye and the series of images of the left eye are distinguished from each other.

Identification information of the subject is transmitted together with the image group. The identification information may be the subject ID input into the slit lamp microscope 1, or identification information generated based on the subject ID. For example, the subject ID used for personal identification in the facility where the slit lamp microscope 1 is installed (referred to as internal identification information) may be converted into external identification information used outside the facility. Such identification information conversion makes it possible to improve the information security of personal information such as image groups and background information.

The image group transmitted from the slit lamp microscope 1 in the step S35 (or S6) is sent directly or indirectly to an information processing apparatus. A typical example of this information processing apparatus is the aforementioned image interpretation computer terminal for the use of a doctor (or an optometrist).

The doctor can conduct image interpretation of the series of images included in the image group (e.g., the series of images F1 to FN shown in FIG. 3) using the image interpretation computer terminal. Further, a three dimensional image may be constructed from the series of images, a rendered image of the three dimensional image may be displayed, or the information transmitted together with the image group may be displayed. In addition, analysis of any image in the series of images may be performed, analysis of the three dimensional image may be performed, analysis of the rendered image may be performed, or analysis of the information transmitted together with the image group may be performed by the image interpretation computer terminal or another information processing apparatus.

By using the image interpretation computer terminal, the doctor can generate a report (an image interpretation report) in which information obtained from image interpretation is recorded. The image interpretation report may be offered, for example, to the facility where the slit lamp microscope 1 is installed, to a medical institution designated by the subject or the like, to an information processing apparatus used by a doctor designated by the subject or the like, to an address (e.g., email address, postal address, etc.) registered by the subject or the like. Further, the image interpretation report may be sent to a predesignated database system to be stored and managed.

An image interpretation apparatus is another example of the information processing apparatus that is a destination of the image group transmitted from the slit lamp microscope 1 in the step S35 (or S6). The image interpretation apparatus includes an image interpretation processor. The image interpretation processor is configured to operate, for example, in accordance with a program for image interpretation, and analyze the series of images included in the image group to derive findings. In addition, the image interpretation processor is configured to generate a report based on the findings derived.

The image interpretation processor may include an artificial intelligence engine that performs image interpretation using a learned model (inference model). The artificial intelligence engine of some typical examples includes a convolutional neural network (CNN) trained with training data containing a large number of images acquired by slit lamp microscopes and corresponding image interpretation information.

In the case where the image interpretation apparatus includes an artificial intelligence engine and the slit lamp microscope 1 (the data processor 8) also includes an artificial intelligence engine, these artificial intelligence engines may be adjusted to have equivalent capabilities (abilities, faculties, qualities). In other words, it is possible to make adjustments so that there is no capability difference (so that capability difference is small) between the artificial intelligence engine of the image interpretation apparatus and the artificial intelligence engine of the slit lamp microscope 1. Further in other words, the artificial intelligence engine provided in the image interpretation apparatus may be the same at least in part as the aforementioned artificial intelligence engine provided in the slit lamp microscope 1.

In some aspect examples, both the artificial intelligence engines may be configured by applying the same neural network model and the same parameters. In addition, the models and the parameters of both the artificial intelligence engines may be updated in synchronization with each other.

Such a unified (integrated, synchronized) adjustment of the artificial intelligence engines makes it possible to prevent the inconvenience of inconsistencies or errors between outputs from the artificial intelligence engine of the slit lamp microscope 1 and outputs from the artificial intelligence engine of the image interpretation apparatus. In addition, as described above, the quality assessment conducted before transmitting an image group from the slit lamp microscope 1 is a process of assessing the image quality required for effective image interpretation and diagnosis. Therefore, performing the unified adjustment of the artificial intelligence engines makes it possible to achieve appropriate execution of the image quality assessment of an image group before transmission. With this, an image group that is suitable for image interpretation by the artificial intelligence engine of the image interpretation apparatus can be assessed with high accuracy as a "suitable image group for image interpretation" prior to transmission from the slit lamp microscope 1. Also, an image group that is not suitable for image interpretation by the artificial intelligence engine of the image interpretation apparatus can be assessed with high accuracy as an "unsuitable image group for image interpretation" prior to transmission from the slit lamp microscope 1.

In the case where such a unified adjustment of the artificial intelligence engines is not made, or in the case where image interpretation is requested to another image interpretation apparatus that includes an artificial intelligence engine with a different model and/or parameters, a processing condition of the artificial intelligence engine of the slit lamp microscope 1 may be attached to an image set to be transmitted, and/or, a processing condition of the artificial intelligence engine of the image interpretation apparatus may be attached to an image set to be transmitted. Here, the processing conditions represent a corresponding model, corresponding parameters, or the like.

According to the first operation example, in the case where an image group having a satisfactory quality is acquired by the first scan, this image group can be provided for subsequent processing such as image interpretation. On the other hand, in the case where an image group of a satisfactory quality cannot be acquired by the first scan, the first operation example may perform acquisition of another image group by performing a scan again. More generally, the first operation example can repeatedly perform photography until an image group with a satisfactory quality is obtained.

Therefore, the slit lamp microscope 1 is capable of providing an image group with a satisfactory quality for subsequent processing in either case where an image group with a satisfactory quality is or is not obtained by the first scan. Therefore, processing such as image interpretation can be suitably performed.

Furthermore, according to the first operation example, in the case where the first follow-up photography is successfully performed, the image group acquired by the first follow-up photography may be provided for subsequent processing such as image interpretation. On the other hand, in the case where the first follow-up photography is unsuccessfully performed, the first operation example may be operated to perform follow-up photography again to acquire another image group. More generally, the first operation example may be operated to repeat photography until satisfactory follow-up photography is carried out. As a result, the first operation example is capable of providing an image group (follow-up images) with a small positional error with respect to images acquired in the past photography (reference images) for subsequent processing in either case where the first follow-up photography has been performed satisfactorily or unsatisfactorily (successfully or unsuccessfully). Therefore, an image comparison in a follow-up can be performed in a suitable manner.

In this way, the first operation example is operated to be capable of carrying out both the quality assessment of an image group and the quality assessment of follow-up photography. This makes it possible to suitably execute automatic image interpretation by means of an information processing apparatus (an image interpretation apparatus), and for a doctor (e.g., medical image interpreter) to conduct image interpretation in an appropriate manner. This also makes it possible to satisfactorily perform an image comparison in a follow-up. This completes the description of the first operation example.

Second Operation Example

Figure 13:
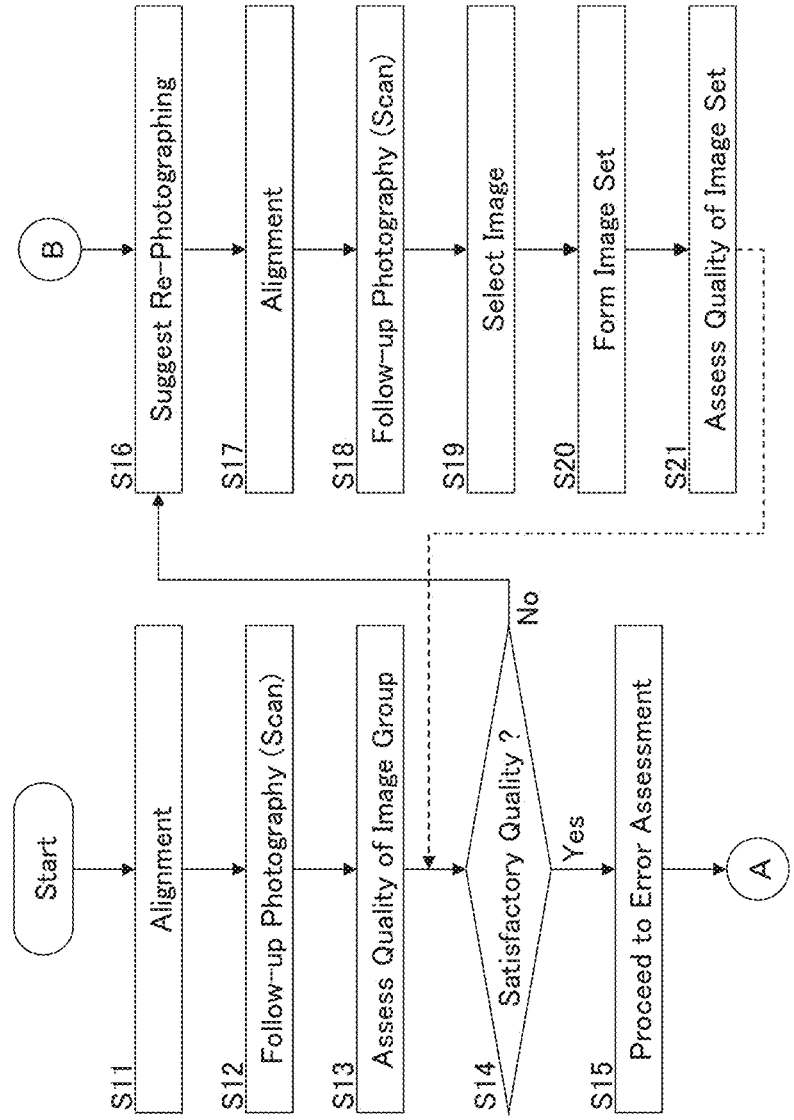
FIG. 13 is a flowchart illustrating an operation of a slit lamp microscope according to an aspect example.

The second operation example performed after the preparations mentioned above will be described with reference to FIG. 13 and FIG. 14. FIG. 13 shows an example of the operation for acquiring an image set of a satisfactory quality by follow-up photography. FIG. 14 shows an example of the operation for assessing a quality (an error) of the follow-up photography.

While the first operation example described above is operated to repeat scanning (photography) of an anterior segment until an "image group" with a satisfactory quality is obtained, the present operation example is operated to repeat scanning (photography) until an "image set" with a satisfactory quality is obtained. Here, an image group refers to a series of images collected by a single scan, and an image set refers, for example, to a series of images arranged in a predetermined scan area.

In other words, while data finally obtained by the first operation example is a series of images collected by a single scan, data finally obtained by the present operation example is, for example, a series of images corresponding to a plurality of cross sections arranged in a predetermined scan area (a three dimensional region of the anterior segment). To put it another way, data finally obtained by the present operation example may be a series of images obtained by a single scan as in the first operation example, or, unlike the first operation example, may be a series of images selected from two or more image groups obtained by two or more times of scans.

In the present example, the operation example shown in FIG. 14 is executed after the execution of the operation example shown in FIG. 13. In other words, the present example executes an assessment of the quality of the follow-up photography after acquisition of an image set of a satisfactory quality. Although not shown in the drawings nor described in detail, some other aspect examples may be operated to execute an assessment of the quality of the image set after the execution of an assessment of the quality of the follow-up photography in contrast to the present example. Still some other aspect examples may execute a quality assessment of the follow-up photography and a quality assessment of the image set in parallel. Yet some other aspect examples may execute the following processes in the following order a quality assessment of the image group, a quality assessment of the follow-up photography, and a quality assessment of the image set. A person having ordinary knowledge and skills of the technical field to which the present disclosure belongs (a person skilled in the art) would be able to understand these other aspect examples based on the second operation example described below.

The steps S11 to S13 of the present operation example may be performed in the same manner as the steps S1 to S3 of the first operation example, respectively. Therefore, the description of the steps S11 to S13 is omitted. In addition, the matters and items described in the first operation example may be combined with the present operation example, unless otherwise mentioned.

(S14: Satisfactory Quality?)

In the case where the image group assessing processor 81 has determined in the step S13 that the quality of the image group is satisfactory (S14: Yes), the present operation proceeds to an assessment of the quality (error) of the follow-up photography (S15). On the other hand, in the case where the image group assessing processor 81 has determined in the step S13 that the quality of the image group is not satisfactory (S14: No), the present operation proceeds to the step S16.

(S15: Proceed to Error Assessment)

When the image group assessing processor 81 has determined in the step S13 that the quality of the image group is satisfactory (S14: Yes), the controller 7 executes a control to perform processing for assessing the quality (error) of the follow-up photography from which this image group was obtained. This control may be executed, for example, in the same manner as the step S5 in the first operation example. After the execution of the step S15, the present operation proceeds to the step S31 in FIG. 14.

(S16: Suggest Re-Photographing)

In the case where the image group assessing processor 81 has determined in the step S13 that the quality of the image group is not satisfactory (S14: No), the controller 7 then executes a control to suggest the user to conduct photography again. The user then performs an operation of issuing an instruction to start re-photographing or an operation of issuing an instruction not to re-perform photography.

(S17: Alignment)

Upon receiving an instruction from the user to start re-photographing, the controller 7 performs alignment in the same manner as in the step S11.

(S18: Follow-Up Photography (Scan))

After completing the alignment in the step S17, the slit lamp microscope 1 applies a scan to the three dimensional region of the anterior segment of the subject's eye E in the same manner as in the step S12. Another image group is obtained by this scan.

(S19: Select Image)

The selecting processor 821 selects one or more images that satisfy a predetermined condition, from among a set of images that includes the image group collected by the scan of the step S12 and the image group collected by the scan of the step S18. Note that in the case where a determination result "No" has been issued two or more times in the step S14, the selecting processor 821 selects one or more images that satisfy the predetermined condition, from a set of images that includes the image group collected by the scan of the step S12 and two or more image groups collected by the two or more times of scans performed in the step S18.

In some aspect examples, the combination of the operation of the step S18 and the operation of the step S19 may be either one of an operation of alternately performing scan application and image selection or an operation of performing image selection after executing all scans, as described above. By such an interlocking operation of the scan application and the image selection, a series of images is selected from two or more image groups obtained by two or more times of scans.

(S20: Form Image Set)

The image set forming processor 82 forms an image set including a series of images selected in the step S19.

(S21: Assess Quality of Image Set)

The image set assessing processor 83 assesses the quality of the image set formed in the step S20.

(S14: Satisfactory Quality?)

In the case where the image set assessing processor 83 has determined in the step S21 that the quality of the image set is satisfactory (S14: Yes), the present operation proceeds to an assessment of the quality (error) of the follow-up photography (S15). On the other hand, in the case where the image set assessing processor 83 has determined in the step S21 that the quality of the image set is not satisfactory (S14: No), the present operation proceeds to the step S16 and then the processes of the steps S16 to S14 are performed again.

(S15: Proceed to Error Assessment)

When the image group assessing processor 81 has determined in the step S13 that the quality of the image set is satisfactory (S14: Yes), the controller 7 executes a control to perform processing for assessing the quality (error) of the follow-up photography from which this image set was obtained. This control may be executed, for example, in the same manner as the step S5 in the first operation example. After the execution of the step S15, the present operation proceeds to the step S31 in FIG. 14.

In the case where this image set consists of one image group acquired by a single anterior segment scan, that is, in the case where a result of the determination executed by the step S14 has never been "No", yet in other words, in the case where the result of the determination obtained by the step S14 of the first time is "Yes", the operations of the steps S31 to S35 may be performed in the same manner as in the first operation example.

On the other hand, in the case where an image set is formed from two or more image groups acquired by two or more times of anterior segment scans, that is, in the case where a result of the determination executed by the step S14 has been "No" at least once, yet in other words, in the case where the result of the determination obtained by the step S14 of the first time is "No", the operations in the steps S31 to S35 may be performed, for example, according to any of the following aspect examples.

The first aspect example is operated to select an anterior segment scan from two or more times of anterior segment scans, and then perform the operations of the steps S31 to S35 for the selected anterior segment scan in the same manner as in the first operation example. The method of the anterior segment scan selection may be freely selected or designed. For example, the first anterior segment scan and/or the last anterior segment scan may be selected.

The second aspect example is operated to perform the operations of the steps S31 to S35 in the same manner as in the first operation example for each of two or more times of anterior segment scans, and then perform an error assessment of the follow-up photography on the basis of two or more results obtained by the operations of the steps S31 to S35 for the two or more times of anterior segment scans. This error assessment is executed, for example, by applying statistical processing to the two or more results. An example of the error assessment of the second aspect example is carried out by selecting one result from the two or more results (e.g., the assessment result with the largest error) and then executing the final process of the error assessment based on the result selected. Another example of the error assessment of the second aspect example is carried out by applying a predetermined statistical processing to two or more results obtained by the operations of the steps S31 to S35 for the two or more times of anterior segment scans, and then executing the final process of the error assessment based on data (e.g., average) obtained by the statistical processing.

(S31: Generate Misalignment Information)

After the execution of the step S15, the present operation proceeds to the step S31 of FIG. 14. In the step S31, the misalignment information acquiring processor 86 generates misalignment information between the follow-up image and the reference image by analyzing the image set and/or the one or more image groups determined in the step S14 to be of a satisfactory quality and the past images referred to in the follow-up photography, that is, by analyzing the follow-up images and the reference images.

(S32: Calculate Assessment Value)

Next, the assessment value calculating processor 87 calculates an assessment value of an error in the scan position of the follow-up photography based on the misalignment information acquired in the step S31.

(S33: Determine Acceptability of Follow-Up Photography)

Subsequently, the acceptability determining processor 88 determines whether or not the follow-up photography has been successfully performed, based on the assessment value calculated in the step S32.

(S34: Acceptable?)

In the case where the acceptability determining processor 88 has determined in the step S33 that the follow-up photography has been successfully performed (S34: Yes), the present operation proceeds to the step S35.

On the other hand, in the case where the acceptability determining processor 88 has determined in the step S33 that the follow-up photography had not been successfully performed (S34: No), the present operation returns to the step S16 of FIG. 13. The processing in this case is executed in conformity with the processing executed in the step S16 described above.

(S35: Output Image)

In the case where the acceptability determining processor 88 has determined in the step S33 that the follow-up photography has been successfully performed (S34: Yes), the controller 7 executes a control for outputting the image set. In the present example, the controller 7 controls the communication device 9 to transmit the image set to another apparatus.

The destination of the image set transmitted may be the same as or different from the destination of the image group in the first operation example. The image set output may include the background information, the misalignment information, the assessment value, the acceptability determination result, and other kinds of information described above. Alternatively, these pieces of information may be supplementary information attached to the image set. As in the case of the image group, the image set transmitted may include a series of images of the anterior segment of the subject's right eye and a series of images of the anterior segment of the subject's left eye. Furthermore, the subject's eye information may be attached to the series of images of the right eye and the subject's eye information may be attached to the series of images of the left eye. In addition, identification information of the subject may be transmitted together with the image set.

The image set transmitted from the slit lamp microscope 1 in the step S35 is sent directly or indirectly to an information processing apparatus. This information processing apparatus may be an image interpretation computer terminal and/or an image interpretation apparatus, for example.

According to the second operation example as described thus far, in the case where an image group of a satisfactory quality is acquired by the first scan, this image group can be provided for subsequent processing such as image interpretation. On the other hand, in the case where an image group of a satisfactory quality cannot be acquired by the first scan, the second operation example is capable of acquiring another image group and then forming an image set having a satisfactory quality by selecting a series of images from two or more image groups obtained up to that point of time. More generally, the second operation example can repeatedly perform photography until an image set with a satisfactory quality is obtained. Therefore, when an image group of a satisfactory quality is acquired by the first scan, this image group can be provided for subsequent processing. In addition, when the first scan yields no image group of a satisfactory quality, an image set of a satisfactory quality can be formed based on two or more image groups acquired by two or more times of scans and this image set can then be provided for subsequent processing. Therefore, processing such as image interpretation can be suitably performed.

Furthermore, according to the second operation example, in the case where the first follow-up photography is successfully performed, the image group acquired by the first follow-up photography may be provided for subsequent processing such as image interpretation. On the other hand, in the case where the first follow-up photography is unsuccessfully performed, the second operation example may be operated to perform follow-up photography again to acquire another image group and then form an image set from two or more image groups that include this another image group. More generally, the second operation example may be operated to repeat photography until an image set based on satisfactory follow-up photography is obtained. Therefore, the second operation example is capable of providing an image set or an image group (follow-up images) with a small positional error with respect to the images acquired in the past photography (reference images) for subsequent processing in either case where the first follow-up photography has been performed satisfactorily or unsatisfactorily (successfully or unsuccessfully). As a result, an image comparison in a follow-up can be performed in a suitable manner.

Thus, in the second operation example, the quality assessment of an image group, the quality assessment of an image set, and the quality assessment of follow-up photography can be performed. This makes it possible to suitably execute automatic image interpretation by means of an information processing apparatus (an image interpretation apparatus), and for a doctor (e.g., medical image interpreter) to conduct image interpretation in an appropriate manner. This also makes it possible to satisfactorily perform an image comparison in a follow-up. This completes the description of the second operation example.

The operations that can be performed by the slit lamp microscope 1 of the present aspect example are not limited to the two examples described above. In some examples, the slit lamp microscope 1 may be configured to perform an operation based at least on any one or two or more of the matters and items described in the present aspect examples, any modification thereof, and any known technique or technology.

In some examples, the slit lamp microscope 1 may be configured to directly or indirectly transmit, to an information processing apparatus, an image group collected in a single scan (a single follow-up photography) of the anterior segment of the subject's eye E without carrying out re-photographing as described in the two examples described above.

In addition, the slit lamp microscope 1 may be configured to apply analysis processing to a series of images (image group, image set) collected from a three dimensional region of the anterior segment of the subject's eye E to obtain analysis data (e.g., anterior segment parameter value), and then transmit the analysis data directly or indirectly to an information processing apparatus. Alternatively, the slit lamp microscope 1 may be configured to apply analysis processing to a series of images (image group, image set) collected from a three dimensional region of the anterior segment of the subject's eye E to obtain analysis data (e.g., anterior segment parameter value), and then transmit the analysis data and the series of images directly or indirectly to an information processing apparatus.

Advantageous Effects

Some features, some actions, and some advantageous effects of the slit lamp microscope of the aspect examples described above will now be described.

The slit lamp microscope 1 includes an image acquiring unit (the illumination system 2, the photography system 3, the movement mechanism 6, etc.), the memory 10, and the misalignment information acquiring processor 86. The image acquiring unit is configured to acquire an image by applying a scan with slit light to an anterior segment of a subject's eye E. The memory 10 stores the first image of the anterior segment of the subject's eye E together with the second image acquired by follow-up photography performed by the image acquiring unit with reference to the first image. The misalignment information acquiring processor 86 is configured to acquire misalignment information between the first image and the second image by analyzing the first image and the second image after the follow-up photography.

According to such a slit lamp microscope 1, follow-up photography can be performed with a modality that scans the anterior segment of the subject's eye E with slit light, and furthermore, misalignment information on an error in this follow-up photography can be acquired. This configuration enables the slit lamp microscope 1 to obtain information on the accuracy and precision of the follow-up photography. In other words, this configuration allows the slit lamp microscope 1 to obtain information on the error in the acquisition position (photography position, acquisition area, photography area, imaging area) of the follow-up. This makes it possible for the slit lamp microscope 1 to provide, to the user, information representing whether or not the follow-up photography has been performed properly, information representing the degree of accuracy and precision with which the follow-up photography has been performed, and like information. Therefore, it can be said that the slit lamp microscope 1 of the aspect example contributes to the improvement of the accuracy of diagnosis. Thus, the slit lamp microscope 1 of the aspect example is capable of providing a useful assessment on an error in follow-up photography.

The slit lamp microscope having the optical system shown in FIG. 10 is capable of acquiring a front image by performing photography of the anterior segment of the subject's eye E (a front image acquiring unit). The front photography of the anterior segment is performed by the moving image acquisition unit 40, for example. In this case, the front image acquiring unit includes the moving image acquisition unit 40. In another example, the front image of the anterior segment is constructed by synthesizing (composing) two or more anterior segment images acquired by two or more anterior segment cameras disclosed by Japanese Unexamined Patent Application Publication No. 2013-248376 filed by the present applicant. In this case, the front image acquiring unit includes such two or more anterior eye segment cameras and a processor (e.g., the data processor 8) configured to perform image synthesis (image composition).

The first image referred to in the follow-up photography of the slit lamp microscope of the present example may include the first front image acquired by performing photography of the anterior segment of the subject's eye E. The first front image may be acquired by the slit lamp microscope of the present example, or may be acquired (and constructed) by an apparatus other than the slit lamp microscope. Furthermore, the second image obtained by the follow-up photography performed with reference to the first front image may include the second front image acquired by the follow-up photography using the front image acquiring unit. The misalignment information acquiring processor 86 of the present example is capable of generating misalignment information based at least on the first front image and the second front image.

The slit lamp microscope of an aspect that can acquire a front image in this way is capable of presenting the scan position on the front image based on the misalignment information. To achieve this, the memory 10 further stores the first position information and the second position information. Here, the first position information represents a position in the first front image of an image acquired by the image acquiring unit together with the first front image, and the second position information represents a position in the second front image of an image acquired by the image acquiring unit together with the second front image. The first position information represents, for example, the application position (application area) of the anterior segment scan performed at the time of the acquisition of the first front image that has been referred to in the follow-up photography, using the coordinate system of the first front image. The second position information represents, for example, the application position (application area) of the anterior segment scan at the time of the follow-up photography performed with reference to the first front image, using the coordinate system of the second front image obtained by the front photography performed together with the anterior segment scan (or, obtained by another front photography).

Furthermore, the slit lamp microscope of the present example is capable of displaying the first front image and/or the second front image on a display device. In addition, the slit lamp microscope of the present example is capable of displaying the first position image corresponding to the first position information and the second position image corresponding to the second position information on the displayed first front image and/or the displayed second front image in an overlapping manner, based on the misalignment information acquired by the misalignment information acquiring processor 86. These display processes are executed by a display controller. In the slit lamp microscope of the example aspect, the controller 7 functions as the display controller.

A slit lamp microscope of an aspect configured to be capable of acquiring a front image or a slit lamp microscope of an aspect configured to be incapable of acquiring a front image may be configured in the following manner. The first image referred to in the follow-up photography may include the first scan image acquired by applying a scan with slit light to the anterior segment of the subject's eye E. The first scan image may be acquired by the slit lamp microscope of the present example, or may be acquired by an apparatus other than the slit lamp microscope of the present example. The second image acquired by the follow-up photography performed with reference to the first scan image may include the second scan image acquired, using the image acquiring unit, by the follow-up photography with reference to the first scan image. The misalignment information acquiring processor 86 of the present example may be configured to acquire the misalignment information based at least on the first scan image and the second scan image. According to the present example, since the misalignment information can be generated from a scan image obtained by an anterior segment scan, there is no need to provide a configuration for acquiring a front image (front image acquiring unit), and hence, the configuration can be simplified.

It should be noted that it is possible to combine the processing of determining misalignment from a front image and the processing of determining misalignment from a scan image. In some aspect examples, the slit lamp microscope may be configured to determine misalignment information in the XY direction from a front image (and a scan image) and determine misalignment information in the Z direction from a scan image.

The slit lamp microscope 1 of the aspect example may include the assessment value calculating processor 87. The assessment value calculating processor 87 is configured to calculate an assessment value of an error in a scan position of the follow-up photography based on the misalignment information acquired by the misalignment information acquiring processor 86. This configuration makes it possible to implement quantitative perception of the degree of the positional error in the follow-up photography.

The slit lamp microscope 1 of the aspect example may include the acceptability determining processor 88. The acceptability determining processor 88 is configured to determine acceptability of the follow-up photography (whether or not the follow-up photography has been carried out in an appropriate, suitable manner), based on the assessment value calculated by the assessment value calculating processor 87. This makes it possible to implement quantitative and automatic assessment of the degree of the positional error in the follow-up photography.

The slit lamp microscope 1 of the aspect example may include the communication device 9 (the first communication device). Further, the slit lamp microscope 1 is capable of performing transmission of an image(s) acquired by the follow-up photography to a predetermined external device under a condition that the acceptability determining processor 88 determines that the follow-up photography is acceptable. This configuration enables the slit lamp microscope 1 to provide an image obtained by satisfactory follow-up photography for image interpretation. Note that the condition used for judgment whether or not the image acquired by the follow-up photography is to be transmitted to the external device, may only include a condition on the basis of a result obtained by the acceptability determining processor 88 described here, or may further include a condition other than that.

In some aspect examples, the image acquiring unit includes a scanner configured to apply a scan with the slit light to the anterior segment of the subject's eye E to collect an image group. The scanner includes an illumination system (2), a photography system (3), and a movement mechanism (6). The illumination system is configured to project the slit light onto the anterior segment of the subject's eye E. The photography system is configured to perform photography of the anterior segment from a direction different from the illumination system. The movement mechanism is configured to move the illumination system and the photography system. The photography system is configured to perform repetitive photography in parallel with movement of the illumination system and the photography system performed by the movement mechanism. This repetitive photography is, for example, moving image photography at a predetermined acquisition rate (photographing rate).

According to such a configuration the slit lamp microscope 1 is capable of, first of all, acquiring an image group representing the anterior segment of the subject's eye E without contacting the subject's eye E, thereby requiring no application of an eye drop anesthesia or a corneal protective agent (ophthalmic gel) to the subject's eye E, which can reduce a burden on the patient. Further, unlike a conventional slit lamp microscope that provides an image of a single cross section, the slit lamp microscope of the aspect example is capable of acquiring an image group by performing application of a scan to a three dimensional region of the anterior segment of the subject's eye E. This makes it possible for the user to observe a desired site or part of the anterior segment in detail during a diagnosis conducted after photography (e.g., during image interpretation or other medical activities).

In addition, as described above, acquisition of satisfactory images using a conventional slit lamp microscope requires fine and complicated operations. However, with the remote operation techniques as disclosed in Patent Documents 3 and 4, such difficult operations have to be conducted from a remote location. Therefore, it is considered extremely difficult to obtain images of quality good enough for diagnosis (image interpretation) using a conventional slit lamp microscope with such a conventional remote operation function. Further, although a slit lamp microscope serves an effective role in screening, follow-ups, and like applications, it can be said, in view of the difficulties of remote operations, that it is practically impossible to use a conventional slit lamp microscope for telemedicine with conventional techniques.

In contrast, the slit lamp microscope of some aspect examples is configured to first perform a scan of the subject's eye E to collect an image group, and hence has an advantage of not requiring remote operations conducted by a doctor as in conventional cases. In other words, conventional methods require a doctor to conduct a medical examination and consultation while performing operations of a slit lamp microscope from a remote location. In the case of employing the slit lamp microscope 1, on the other hand, a doctor only needs to perform image interpretation of an image group acquired in advance. As a consequence, a doctor can be freed from the time and effort required for performing photography, and therefore concentrate on image interpretation. In this way, the present aspect example can contribute to diffusion of high quality slit lamp microscope examinations.

In some aspect examples, the movement mechanism 6 may be configured to perform the movement of the illumination system 2 and the photography system 3 in such a manner that the slit light projected onto the anterior segment of the subject's eye E by the illumination system 2 moves in a width direction of the slit light.

The slit lamp microscope 1 of some aspect examples may have a function as a Scheimpflug camera, for example, in order to acquire an image (two dimensional cross sectional image) in which an area from the anterior surface of the cornea to the posterior surface of the crystalline lens is in focus. For this purpose, the photography system 3 may include the optical system 4 and the image sensor 5. The optical system 4 is configured to direct light (return light) coming from the anterior segment of the subject's eye E onto which the slit light is projected. The image sensor 5 includes a light detecting plane and is configured to receive the light directed by the optical system 4 with the light detecting plane. In addition, the slit lamp microscope 1 may be configured in such a manner that the subject plane along the optical axis of the illumination system 2, the optical system 4, and the image sensor 5 (the light detecting plane) satisfy the Scheimpflug condition. With such a configuration, it becomes possible to perform photography in which the entire three dimensional region of the anterior segment is in focus and therefore obtain an image of a satisfactory quality.

In some aspect examples, the second image acquired by the follow-up photography may include at least one image included in an image group collected by the scanner during the follow-up photography. Each image included in this image group is typically a two dimensional cross sectional image.

In some aspect examples, the image acquiring unit may include a processed image constructing processor (85) configured to construct a processed image from the image group collected by the scanner during the follow-up photography. The processed image may be, for example, a three dimensional image constructed from the image group, or may be a rendered image constructed from the three dimensional image. The second image acquired by the follow-up photography may include a processed image thus configured.

As mentioned above, the second image acquired by the follow-up photography may include an image of various a type (modes, forms, kinds) such as an image included in the image group (two dimensional cross sectional image), a three dimensional image, a rendering image, or images of other types. The type(s) of image included in the second image may be freely selected or determined. Note that the process of constructing a processed image may be performed by means of an external device such as an image interpretation apparatus, an image interpretation computer terminal, or other information processing apparatuses.

The slit lamp microscope 1 of some aspect examples may include the image group processing processor 80 configured to execute processing of the image group collected by the scanner. This enables desired processing to be performed on the image group collected by the scanner.

In some aspect examples, the image group processing processor 80 may include the image group assessing processor 81 (first assessing processor). The image group assessing processor 81 is configured to execute an assessment of a quality of the image group collected by the scanner. With this configuration, the quality of the image group collected by scanning the anterior segment of the subject's eye E can be assessed by the slit lamp microscope itself. Thus, the quality of the image group can be checked before offering the image group to a doctor or an image interpretation apparatus.

For example, as described below, the present aspect example is capable of switching the control modes (contents of control) according to a result of the assessment of the quality of the image group obtained by the image group assessing processor 81. As a result, when an image group of a satisfactory quality is obtained, suitable processing can be executed accordingly, and when an image group of a satisfactory quality is not obtained, suitable processing can be executed accordingly, too.

The slit lamp microscope 1 of the present aspect example may perform transmission of the image group to a predetermined external device by means of the communication device 9 (second communication device) under a condition that the image group assessing processor 81 assesses that the quality of the image group collected by the scanner is satisfactory. Such a configuration makes it possible, upon acquisition of an image group of a satisfactory quality, to provide this image group to a doctor who is at a remote location or an image interpretation apparatus located at a remote location, for example. It should be noted that the condition for performing transmission of the image group acquired by the follow-up photography to an external device may only include the condition related to the quality of the image group described herein, or may further include a condition(s) of a different kind(s).

The slit lamp microscope 1 of the present aspect example may include the controller 7 (first controller) configured in the following manner. The controller 7 is configured to execute a control of the scanner to apply another scan to the anterior segment of the subject's eye E when the image group assessing processor 81 assesses that the quality of the image group is not satisfactory. The control mode for causing the scanner to conduct another scan may be any of the following controls, for example: a control for suggesting the user to carry out photography again; and a control for automatically performing photography again (a control for automatically shifting to re-photographing). According to this configuration, it is possible to smoothly shift to re-photographing (re-scanning) in the case where an image group of a satisfactory quality cannot be acquired by one time of scan.

In some aspect examples, the image group processing processor 80 may include the image set forming processor 82. The image set forming processor 82 is configured to execute a formation of an image set by selecting a series of images corresponding to a predetermined scan area from two or more image groups that include the image group acquired already by the scan applied to the anterior segment of the subject's eye E and another image group collected by another scan applied to the anterior segment of the subject's eye E. According to this configuration, in the case where two or more times of scans are applied to the subject's eye, an image set can be formed with a series of images selected from two or more image groups obtained by the two or more times of scans. This improves the possibility of obtaining an image set of a satisfactory quality. For example, even in the case where a satisfactory image cannot be obtained due to the occurrence of blinking or eye movements during execution of a scan, an image obtained through another scan can be used as a replacement for a corresponding unsatisfactory image.

In some aspect examples, the image group processing processor 80 may include the image set assessing processor 83 (second assessing processor) configured to execute an assessment of the quality of the image set formed by the image set forming processor 82. In some examples, the image set assessing processor 83 may be configured to be capable of performing an assessment of any of the following condition items for the series of images included in the image set: the arrangement order of the series of images; lack or omission of an image in the series of images; and misalignment of the series of images. This assessment may be executed by analyzing the series of images in the image set. For example, the image set assessing processor 83 may execute a quality assessment of the series of images based on a landmark in a series of frames. The landmark may be an image region corresponding to a tissue or a site such as the cornea, the iris, the pupil, or the corner angle. By performing such an assessment of an image set, it becomes possible to prepare an image set having a satisfactory quality that makes it possible for a doctor or an image interpretation apparatus to achieve effective performance of image interpretation.

The slit lamp microscope 1 of the present aspect example may perform transmission of the image set to a predetermined external device by means of the communication device 9 under a condition that the image set assessing processor 83 assesses that the quality of the image set is satisfactory. Such a configuration makes it possible, upon acquisition of an image set of a satisfactory quality, to provide this image set to a doctor who is at a remote location or an image interpretation apparatus located at a remote location, for example. It should be noted that the condition for performing transmission of the image set acquired by the follow-up photography to an external device may only include the condition related to the quality of the image set described herein, or may further include a condition(s) of a different kind(s).

The slit lamp microscope 1 of some aspect examples may include the controller 7 (second controller) configured in the following manner. The controller 7 is configured to execute a control of the scanner to apply another scan to the anterior segment of the subject's eye E when the image set assessing processor 83 assesses that the quality of the image set is not satisfactory. The control mode for causing the scanner to conduct another scan may be any of the following controls, for example: a control for suggesting the user to carry out photography again; and a control for automatically performing photography again (a control for automatically shifting to re-photographing). According to this configuration, it is possible to smoothly shift to re-photographing (re-scanning) in the case where an image set of a satisfactory quality cannot be acquired by two or more times of scans performed up to the current stage.

<Some Additional Matters and Items>

Some aspect examples described above are merely examples of the implementation of the present disclosure, and any modifications (e.g., omission, substitution, replacement, addition, etc.) may be made within the scope of the present disclosure to the above aspect examples.

The aspect example described above is configured to execute an assessment of an image group and/or an image set each time a single scan is performed. In some other aspect examples, the slit lamp microscope may be configured to first perform a plurality of times of scans in succession to collect a plurality of image groups, and then to execute a formation of an image set from the plurality of images groups collected. In other words, the slit lamp microscope of the present aspect example may be configured in the following manner: the scanner is configured to perform application of two or more times of scans to an anterior segment of the subject's eye to collect two or more image groups; and the image group processing processor (image set forming processor) is configured to execute a formation of an image set by executing selection of a series of images corresponding to a scan area from the two or more image groups collected. According to the present aspect example, a satisfactory image set can be obtained as long as no inconvenience (e.g., blinking, eye movement, etc.) occurs during all of the plurality of times of scans. Therefore, the present aspect example can increase the possibility of acquiring a satisfactory image set. It is possible to combine, with the present aspect example, any of the aspect examples relating to quality assessment of follow-up photography.

A slit lamp microscope according to any of the aspect examples may be used for any purpose, and may have a function for that purpose. In addition to the follow-up function described above, a slit lamp microscope of some aspect examples may have a statistical analysis function. These functions are used to execute an assessment of the state or condition of the subject's eye in a quantitative and objective manner. According to the slit lamp microscope of some aspect examples, non-contact anterior segment observation can be performed in detail and with reliability as described above, allowing follow-ups and statistical analysis to be performed effectively and suitably. Note that an apparatus other than the slit lamp microscope may have the same or similar functions (the same applies hereinafter). Examples of this apparatus include an information processing apparatus, an image interpretation computer terminal, an image interpretation apparatus, an ophthalmic apparatus, and so forth.

The slit lamp microscope configured in this way has a function of calculating a value of a predetermined parameter by analyzing an image acquired based on a scan applied to the anterior segment of the subject's eye. This function is referred to as a parameter calculating function. The image to be analyzed may be any kind of image, and may be any of the following examples: an image group collected by the scan; at least one image included in the image group; a three dimensional image constructed from at least one or more images of the image group; a rendered image of the three dimensional image; an image set obtained from two or more images; at least one image included in the image set; a three dimensional image constructed from at least one or more images of the image set; and a rendered image of this three dimensional image. The parameter to be calculated may be any kind of parameter, and may include, for example, any of the anterior segment parameters described above. Parameter calculation includes a process according to a parameter of interest. In some typical examples, parameter calculation may include segmentation, feature point detection, distance measurement, ratio calculation, angle calculation, and so forth.

Examples of a statistical analysis function include a comparison with data obtained from normal eyes and a comparison with data obtained from eyes with diseases. The former comparison function is referred to as a normative data comparison function and the latter comparison function is referred to as an affected eye data comparison function.

A slit lamp microscope that has the normative data comparison function includes a normal eye database (normative database) obtained by executing statistical processing of parameter values acquired from a large number of normal eyes. Alternatively, a slit lamp microscope that has the normative data comparison function may be configured to be capable of referring to a normative database stored in another apparatus. A typical normative database defines a normal range(s) for parameter values. The slit lamp microscope determines whether or not a parameter value obtained from the subject's eye falls within the normal range. If the parameter value obtained from the subject's eye belongs to the normal range, the subject's eye is determined to be normal (at least with respect to this parameter). If the slit lamp microscope determines that the parameter value obtained from the subject's eye does not belong to the normal range, the subject's eye is determined to be abnormal (at least with respect to this parameter).

A slit lamp microscope that has the affected eye data comparison function includes a database for a specific disease (affected eye database). Alternatively, a slit lamp microscope that has the affected eye data comparison function may be configured to be capable of referring to an affected eye database stored in another apparatus. An affected eye database is obtained by executing statistical processing of parameter values acquired from a large number of eyes diagnosed as having a specific disease (an eye with this disease, an affected eye). A typical affected eye database defines an abnormal range(s) for parameter values. The slit lamp microscope determines whether or not a parameter value obtained from the subject's eye falls within the abnormal range. If the parameter value obtained from the subject's eye does not belong to the abnormal range, the subject's eye is determined to be normal (at least with respect to this parameter). If the slit lamp microscope determines that the parameter value obtained from the subject's eye belongs to the abnormal range, the subject's eye is determined to be abnormal (at least with respect to this parameter).

In some typical examples, a slit lamp microscope with the follow-up function has a function of comparing time-series data (time course data, time-dependent change data, chronological data, or the like) of the same patient or a function of presenting time-series data of the same patient in a comparable manner. For example, the slit lamp microscope with the follow-up function has any of the following functions: a function of determining the amount of time-series change in a plurality of parameter values acquired on a plurality of dates and times for the same patient; a function of determining a trend of the plurality of parameter values; a function of comparing the time-series change in the plurality of parameter values with a standard change (standard change for normal eyes or standard change for affected eyes); and a function of estimating a future value based on the plurality of parameter values (and the standard change). Further, the slit lamp microscope has a function of presenting a result obtained by any of these functions. Any method and technique may be employed to present the result, such as a graph, histogram, map, color code, or other aspects.

The present disclosure provides a method of controlling a slit lamp microscope according to any of the aspect examples. A slit lamp microscope includes a processor, a storage, and an image acquiring unit. The image acquiring unit is configured to perform application of a scan with slit light to the anterior segment of the subject's eye to acquire an image. The control method according to the present aspect example includes the following steps: a step of causing the processor to execute a control of storing the first image of the anterior segment of the subject's eye into the storage; and a step of causing the processor to execute a control of storing the second image acquired by follow-up photography performed by the image acquiring unit with reference to the first image into the storage. In addition, the control method according to the present aspect example further includes a step of causing the processor to execute an analysis of the first image and the second image in order to obtain misalignment information between the first image and the second image. This step is performed by executing a control of the processor after the execution of the follow-up photography.

The present disclosure provides a program that causes a computer to execute the control method described above. In addition, the present disclosure provides a computer-readable non-transitory recording medium that stores such a program. The non-transitory recording medium may be in any form, and examples of the non-transitory recording medium include a magnetic disk, an optical disk, a magneto-optical disk, and a semiconductor memory.

The present disclosure provides an imaging method and data processing method according to any of the aspect examples. The imaging method according to the present aspect example includes a step of acquiring the first image of the anterior segment of the subject's eye and a step of storing the first image acquired. Further, the imaging method according to the present aspect example includes a step of performing follow-up photography with reference to the first image. This follow-up photography is performed by applying a scan with slit light to the anterior segment of the subject's eye. This follow-up photography yields the second image. Furthermore, the imaging method according to the present aspect example includes a step of storing the second image acquired by the follow-up photography. In addition, the imaging method according to the present aspect example includes a step of acquiring misalignment information between the first image and the second image by analyzing the first image and the second image after the execution of the follow-up photography.

The processing method according to the present aspect example includes a step of storing the first image of the anterior segment of the subject's eye and a step of storing the second image acquired by follow-up photography with reference to the first image. This follow-up photography is performed by applying a scan with slit light to the anterior segment of the subject's eye. Further, the processing method according to the present aspect example includes a step of acquiring misalignment information between the first image and the second image by analyzing the first image and the second image after the execution of the follow-up photography.

The present disclosure provides a program that causes a computer to execute such an imaging method and/or processing method. In addition, the present disclosure provides a computer-readable non-transitory recording medium in which such a program is stored.

Any matters and items described in the aspect examples described in the present disclosure may be combined with any of the control method of the slit lamp microscope of the aspect examples, the imaging method of some aspect examples, the processing method of some aspect examples, the program of some aspect examples, and the recording medium of some aspect examples.

While certain embodiments have been described, these embodiments have been presented by way of example only, and are not intended to limit the scope of the inventions. Indeed, the novel embodiments described herein may be embodied in a variety of other forms; furthermore, various omissions, substitutions, additions and changes in the form of the embodiments described herein may be made without departing from the spirit of the inventions. The accompanying claims and their equivalents are intended to cover such forms or modifications as would fall within the scope and spirit of the inventions.

What is claimed is:

1. A slit lamp microscope comprising:
    an image acquiring unit including a scanner and configured to acquire an image by applying a scan with slit light to an anterior segment of a subject's eye;
    a memory that stores a first image of the anterior segment and a second image that is acquired by follow-up photography performed by the image acquiring unit with reference to the first image; and
    a misalignment information acquiring processor configured to acquire misalignment information between the first image and the second image by analyzing the first image and the second image after the follow-up photography,
    wherein the image acquiring unit includes the scanner configured to apply the scan with the slit light to the anterior segment to collect an image group,
    wherein the scanner includes
        an illumination system configured to project the slit light onto the anterior segment,
        a photography system configured to perform photography of the anterior segment from a direction different from the illumination system, and
        a movement mechanism configured to move the illumination system and the photography system, and
    wherein the photography system is configured to perform repetitive photography in parallel with movement of the illumination system and the photography system performed by the movement mechanism.

2. The slit lamp microscope according to claim 1, further comprising a front image acquiring unit including a lens and configured to acquire a front image by performing photography of the anterior segment, wherein
    the first image includes a first front image acquired by performing photography of the anterior segment,
    the second image includes a second front image acquired by the front image acquiring unit during the follow-up photography with reference to the first front image, and
    the misalignment information acquiring processor is configured to acquire the misalignment information based at least on the first front image and the second front image.

3. The slit lamp microscope according to claim 2, wherein the memory further stores first position information and second position information, the first position information representing a position in the first front image of an image acquired by the image acquiring unit together with the first front image and the second position information representing a position in the second front image of an image acquired by the image acquiring unit together with the second front image,
    the slit lamp microscope further comprising a display controller configured to execute a control of a display device to display at least one front image of the first front image and the second front image and to display a first position image corresponding to the first position information and a second position image corresponding to the second position information on the at least one front image in an overlapping manner based on the misalignment information.

4. The slit lamp microscope according to claim 1, wherein
the first image includes a first scan image acquired by applying a scan with slit light to the anterior segment,
the second image includes a second scan image acquired by the image acquiring unit during the follow-up photography with reference to the first scan image, and
the misalignment information acquiring processor is configured to acquire the misalignment information based at least on the first scan image and the second scan image.

5. The slit lamp microscope according to claim 1, further comprising an assessment value calculating processor configured to calculate an assessment value of an error in a scan position of the follow-up photography based on the misalignment information.

6. The slit lamp microscope according to claim 5, further comprising an acceptability determining processor configured to determine acceptability of the follow-up photography based on the assessment value calculated by the assessment value calculating processor.

7. The slit lamp microscope according to claim 6, further comprising a first communication device, wherein the first communication device is configured to perform transmission of an image acquired by the follow-up photography performed by the image acquiring unit to a predetermined external device under a condition that the acceptability determining processor determines that the follow-up photography is acceptable.

8. The slit lamp microscope according to claim 1, wherein the photography system includes
an optical system configured to direct light coming from the anterior segment onto which the slit light is projected, and
an image sensor including a light detecting plane configured to receive the light directed by the optical system,
wherein a subject plane along an optical axis of the illumination system, the optical system, and the light detecting plane satisfy a Scheimpflug condition.

9. The slit lamp microscope according to claim 1, wherein the movement mechanism is configured to perform the movement of the illumination system and the photography system such that the slit light projected onto the anterior segment by the illumination system moves in a width direction of the slit light.

10. The slit lamp microscope according to claim 1, wherein the second image includes at least one image included in an image group collected by the scanner during the follow-up photography.

11. The slit lamp microscope according to claim 1, wherein the image acquiring unit further includes a processed image constructing processor configured to construct a processed image from the image group.

12. The slit lamp microscope according to claim 11, wherein the processed image constructing processor is configured to construct a three dimensional image as the processed image.

13. The slit lamp microscope according to claim 12, wherein the processed image constructing processor is configured to construct a rendered image of the three dimensional image as the processed image.

14. The slit lamp microscope according to claim 11, wherein the second image includes the processed image.

15. The slit lamp microscope according to claim 1, further comprising an image group processing processor configured to process the image group collected by the scanner.

16. The slit lamp microscope according to claim 15, wherein the image group processing processor includes a first assessing processor configured to execute an assessment of a quality of the image group.

17. The slit lamp microscope according to claim 16, further comprising a second communication device, wherein the second communication device is configured to perform transmission of the image group to a predetermined external device under a condition that the first assessing processor assesses that the quality of the image group is satisfactory.

18. The slit lamp microscope according to claim 16, further comprising a first controller configured to execute a control of the scanner to perform another scan on the anterior segment when the first assessing processor assesses that the quality of the image group is not satisfactory.

19. The slit lamp microscope according to claim 18, wherein the image group processing processor further includes an image set forming processor configured to execute a formation of an image set by selecting a series of images corresponding to a scan area from at least two image groups that include the image group and another image group collected by the another scan.

20. The slit lamp microscope according to claim 15, wherein
the scanner is configured to perform collection of at least two image groups by applying at least two times of scans to the anterior segment, and
the image group processing processor includes an image set forming processor configured to execute a formation of an image set by selecting a series of images corresponding to a scan area from the at least two image groups.

21. The slit lamp microscope according to claim 19, further comprising a second assessing processor configured to execute an assessment of a quality of the image set formed by the image set forming processor.

22. The slit lamp microscope according to claim 21, further comprising a third communication device, wherein the third communication device is configured to perform transmission of the image set to a predetermined external device under a condition that the second assessing processor assesses that the quality of the image group is satisfactory.

23. The slit lamp microscope according to claim 21, further comprising a second controller configured to execute a control of the scanner to perform another scan on the anterior segment when the second assessing processor assesses that the quality of the image set is not satisfactory.

24. The slit lamp microscope according to claim 20, further comprising a second assessing processor configured to execute an assessment of a quality of the image set formed by the image set forming processor.

25. The slit lamp microscope according to claim 24, further comprising a third communication device, wherein the third communication device is configured to perform transmission of the image set to a predetermined external device under a condition that the second assessing processor assesses that the quality of the image group is satisfactory.

26. The slit lamp microscope according to claim 24, further comprising a second controller configured to execute a control of the scanner to perform another scan on the anterior segment when the second assessing processor assesses that the quality of the image set is not satisfactory.

* * * * *